(12) United States Patent
Draper et al.

(10) Patent No.: US 7,756,904 B2
(45) Date of Patent: Jul. 13, 2010

(54) NESTED CONDITIONAL RELATIONS (NCR) MODEL AND ALGEBRA

(75) Inventors: Denise L. Draper, Seattle, WA (US); Gary Horen, Seattle, WA (US); Tim Wagner, Seattle, WA (US)

(73) Assignee: Actuate Corporation, San Mateo, CA (US)

( * ) Notice: Subject to any disclaimer, the term of this patent is extended or adjusted under 35 U.S.C. 154(b) by 0 days.

(21) Appl. No.: 09/921,446

(22) Filed: Aug. 1, 2001

(65) Prior Publication Data

US 2002/0133497 A1 Sep. 19, 2002

Related U.S. Application Data

(60) Provisional application No. 60/222,070, filed on Aug. 1, 2000.

(51) Int. Cl.
*G06F 17/30* (2006.01)

(52) U.S. Cl. .................. 707/803; 707/808; 707/804; 707/807

(58) Field of Classification Search .............. 707/100, 707/102, 103, 3, 4, 103 R, 103 Z, 10
See application file for complete search history.

(56) References Cited

U.S. PATENT DOCUMENTS

| | | | |
|---|---|---|---|
| 4,014,004 A | 3/1977 | Fuller | |
| 4,947,320 A * | 8/1990 | Crus et al. | 707/201 |
| 5,421,001 A * | 5/1995 | Methe | 707/1 |
| 5,572,583 A | 11/1996 | Wheeler, Jr. et al. | |
| 5,826,258 A | 10/1998 | Gupta et al. | |
| 5,852,825 A | 12/1998 | Winslow | |
| 5,909,225 A * | 6/1999 | Schinnerer et al. | 345/545 |
| 5,913,214 A | 6/1999 | Madnick et al. | |
| 5,956,720 A | 9/1999 | Fernandez et al. | |
| 5,970,490 A | 10/1999 | Morgenstern | |
| 5,983,232 A | 11/1999 | Zhang | |
| 6,012,098 A | 1/2000 | Bayeh et al. | |
| 6,016,497 A * | 1/2000 | Suver | 707/103 R |
| 6,052,693 A | 4/2000 | Smith et al. | |

(Continued)

FOREIGN PATENT DOCUMENTS

WO WO 01/17286 3/2001

OTHER PUBLICATIONS

Colby, Latha S., "A Recursive Algebra and Query Optimization for Nested Relations," Department of Computer Science, Indiana University, Bloomington, IN, pp. 273-283, SIGMOND '95.

(Continued)

*Primary Examiner*—Baoquoc N To
(74) *Attorney, Agent, or Firm*—Weaver Austin Villeneuve & Sampson LLP

(57) ABSTRACT

A method and system for providing data integration of multiple data stores with diverse formats. The data integration engine accepts queries using a standard query language such as XML-QL, executes those queries against the multiple data stores, and returns the results. The data stores may include relational databases, hierarchical databases, file systems, application data available via APIs, and so on. A query may reference data that resides in different data stores. The data integration engine allows operations such as joins across multiple data stores.

40 Claims, 21 Drawing Sheets

U.S. PATENT DOCUMENTS

| | | | |
|---|---|---|---|
| 6,076,087 | A | 6/2000 | Suciu |
| 6,094,649 | A | 7/2000 | Bowen et al. |
| 6,154,738 | A | 11/2000 | Call |
| 6,263,332 | B1 | 7/2001 | Nasr et al. |
| 6,269,368 | B1 | 7/2001 | Diamond |
| 6,279,006 | B1 | 8/2001 | Shigemi et al. |
| 6,308,179 | B1 | 10/2001 | Petersen et al. |
| 6,339,776 | B2 | 1/2002 | Dayani-Fard et al. |
| 6,343,287 | B1 | 1/2002 | Kumar et al. |
| 6,356,906 | B1 | 3/2002 | Lippert et al. |
| 6,356,920 | B1 | 3/2002 | Vandersluis |
| 6,389,429 | B1 | 5/2002 | Kane et al. |
| 6,418,448 | B1 | 7/2002 | Sarkar |
| 6,449,620 | B1 | 9/2002 | Draper et al. |
| 6,487,566 | B1 | 11/2002 | Sundaresan |
| 6,507,856 | B1 | 1/2003 | Chen et al. |
| 6,507,857 | B1 | 1/2003 | Yalcinalp |
| 6,516,321 | B1 * | 2/2003 | De La Huerga ............ 707/102 |
| 6,535,896 | B2 | 3/2003 | Britton et al. |
| 6,539,378 | B2 | 3/2003 | Gupta et al. |
| 6,581,062 | B1 * | 6/2003 | Draper et al. ............... 707/100 |
| 6,594,653 | B2 * | 7/2003 | Colby et al. .................... 707/3 |
| 6,601,071 | B1 * | 7/2003 | Bowker et al. ............ 707/102 |
| 6,604,100 | B1 | 8/2003 | Fernandez et al. |
| 6,678,269 | B1 * | 1/2004 | Michels et al. ............. 370/389 |
| 6,697,818 | B2 | 2/2004 | Li et al. |
| 6,714,939 | B2 | 3/2004 | Saldanha et al. |
| 6,754,648 | B1 | 6/2004 | Fittges et al. |
| 6,799,184 | B2 | 9/2004 | Bhatt et al. |
| 6,826,553 | B1 | 11/2004 | DaCosta et al. |
| 7,124,144 | B2 | 10/2006 | Christianson et al. |
| 7,152,062 | B1 | 12/2006 | Draper et al. |
| 2002/0120630 | A1 | 8/2002 | Christianson et al. |
| 2002/0133497 | A1 | 9/2002 | Draper et al. |

OTHER PUBLICATIONS

Fegaras, Leonidas and Maier, David, "Towards an Effective Calculus for Object Query Languages," Department of Computer Science and Engineering, Oregon Graduate Institute of Science & Technology, Portland, Oregon, pp. 47-58, SIGMOND'95.

Breazu-Tannen, Val et al., "Naturally Embedded Query Languages," Database Theory—ICDT '92, 4th International Conference, Berlin, Germany, Oct. 14-16, 1992 Proceedings.

Abiteboul, Serge, et al., "Foundations of Databases," Chapter 20, pp. 508-541, Addison-Wesley Publishing Company, Inc., 1995.

U.S. Appl. No. 09/718,228, filed Nov. 21, 2000, Draper et al.

Goldman, Roy and Widom, Jennifer, "DataGuides: Enabling Query Formulation and Optimization in Semistructured Databases," Proceedings of the 23rd VLDB Conference, Athens, Greece, 1997 (10 pp).

Florescu, Daniela, et al, "A Performance Evaluation of Alternative Mapping Schemes for Storing XML Data in a Relational Database," an Experience Paper, pp. 1-22.

Shanmugasundaram, Jayavel, et al, "Relational Databases for Querying XML Documents: Limitations and Opportunities," Proc. Of the 25th VLDB Conf., Edinburgh, Scotland, 1999, 13 pp.

Accessing Data Using Visual Basic, Copyright 2001 Microsoft Corporation http://msdn.microsoft.com/library/en-us/vbcon98/html/vbconaccessingdata.asp?frame=tru pp. 1-3 [Accessed: Nov. 11, 2001].

Forms and Data-Aware Controls, Copyright 2001 Microsoft Corporation http://msdn.microsoft.com/library/en-us/vbcon98/.../vbcondataawarecontrols.asp?frame=tru pp. 1-6 [Accessed: Nov. 11, 2001].

Oracle8 Concepts, Release 8.0 Procedures and Packages, Copyright 1997 Oracle Corporation http://www.-wnt.gsi.de/oragsidoc/doc_804/database.804/a58227/ch14.html pp. 17-19 [Accessed Nov. 11, 2001].

Reilly, Douglas, "Using Stored Procedures in Active Server Pages" http://www.ddj.com/documents/s=875/ddj0065e/ pp. 1-8, [Accessed: Nov. 11, 2001].

Nimble Technology Home Page, Jul. 17, 2000.

Nimble Technology, "The Nimble Integration Suite™" White Paper, Sep. 11, 2000 pp. 1-10.

Stored Procedures Overview http://www.va/pubnix.com/man/xdb/sqlref/Overview_413.html pp. 1-34 [Accessed: Nov. 11, 2001].

"W3C XML-QL: A Query Language for XML," Submission to the World Wide Web Consortium, Aug. 19, 1998 http://www.w3.org/TR/1998/NOTE-xml-ql-19980819/ [Accessed: Nov. 11, 2001].

W3C Architecture Domain, XML Schema http://www.w3.org/XML/Schema.html [Accessed: Nov. 11, 2001].

W3C Document Formats Domain, The Extensible Stylesheet Language (XSL) http://www.w3.org/Style/XSL [Accessed: Nov. 11, 2001].

Konopnicki, et al., A Comprehensive Framework for Querying & Integrating WWW Data and Services, IEEE Proceedings Cooperative Information Systems, Sep. 1999, pp. 172-183.

Deutsch, Alin et al., "A Query Language for XML," Computer Networks 31, May 17, 1999 pp. 1155-1169.

Bonifati, Angela et al., "Comparative Analysis of Five XML Query Languages," SIGMOD Record, vol. 29, No. 1, Mar. 2000, pp. 68-79.

Chamberlin, Don., "A Complete Guide to DB2 Universal Database," Morgan Kaufmann Publishers, Inc., 1998, pp. 1-35.

Kasukawa et al., A New Method for Maintaining Semi-Structured Data Described in XML, Communications, Computers and Signal Processing, 1999 IEEE Pacific Rim Conference on Aug. 22-24, 1999, pp. 258-261.

Lowry, XML Data Mediation and Collaboration: A Proposed Comprehensive Architecture and Query Requirements for Using XML to Mediate Heterogeneous Data Sources and Targets, 2001. Proceedings of the 34th Hawaii Inter. Conf. On System Sciences, Jan. 3, 2001, pp. 1-9.

International Search Report for International Application No. PCT/US01/06755, Nimble Technology, Inc., Nov. 28, 2003, pp. 1-3.

International Search Report for International Application No. PCT/US01/45046, Nimble Technology, Inc., Dec. 22, 2003, pp. 1-6.

W3C XSL Transformation (XSLT) Version 1.0, Nov. 16, 1999; XP-002189938 http://www.w3.org/Style/XSL/translations.html (11 pp.).

Draper et al., "Techniques for Encapsulating a Query Definition," U.S. Appl. 09/718,228, filed Nov. 21, 2000.

Draper et al., "Method and Apparatus for Generating Information Pages Using Semi-Structured Data Stored in a Structured Manner," U.S. Appl. No. 09/517,468, filed Mar. 2, 2000.

Draper et al., "Method and Apparatus for Storing Semi-Structured Data in a Structured Manner," U.S. Appl. No. 09/517,131, filed Mar. 2, 2000.

U.S. Appl. No. 09/921,010, filed Aug. 1, 2001, Draper.

U.S. Appl. No. 09/517,468, filed Mar. 2, 2000, Draper.

U.S. Appl. No. 09/517,131, filed Mar. 2, 2000, Draper.

\* cited by examiner

Select    1.1:1 as c1
          1.1:2 as c2
          1.1:3 as c3
          1.1:4 as c4
          null as  c5
          . . .
          null as  c16
From Table 1.1
Where *

2

Select    1.1:1 as c1
          1.1:2 as c2
          1.1:3 as c3
          1.1:4 as c4
          2.1:1 as c5
          2.1:2 as c6
          2.1:3 as c7
          2.1:4 as c8
          null as  c9
          . . .
          null as  c16
From Table 1.1, Table 2.1
Where 1.1:3=2.1:1

3

Select    1.1:1 as c1
          1.1:2 as c2
          1.1:3 as c3
          1.1:4 as c4
          2.1:1 as c5
          2.1:2 as c6
          2.1:3 as c7
          2.1:4 as c8
          3.1:1 as c9
          3.1:2 as c10
          3.1:3 as c11
          3.1:4 as c12
          null as  c13
          . . .
          null as  c16
From Table 1.1, Table 2.1, Table 3.1
Where 1.1:3=2.1:1 and 2.1:4=3.1:1

*Fig. 12*

Select        1.1:1 as c1
              1.1:2 as c2
              1.1:3 as c3
              1.1:4 as c4
              null as c5
              . . .
              null as c12
              2.2:1 as c13
              2.2:2 as c14
              2.2:3 as c15
              2.2:4 as c16

*Fig. 12 (cont)*

From Table 1.1, Table 2.2
Where 1.1:4=2.2:1

NESTED CONDITIONAL RELATIONS (NCR) MODEL AND ALGEBRA

CROSS-REFERENCE TO RELATED APPLICATIONS

This application claims the benefit of U.S. Provisional Application No. 60/222,070 filed Aug. 1, 2000 and is related to U.S. patent application Ser. No. 09/718,228 filed Nov. 21, 2000, U.S. patent application Ser. No. 09/517,131 filed Mar. 2, 2000 and U.S. patent application Ser. No. 09/517,468 filed Mar. 2, 2000, which are hereby incorporated by reference.

BACKGROUND

The described technology relates generally to accessing data and particularly to accessing data from data sources with diverse formats.

Large organizations may have their digital data stored in various data stores, such as databases and file systems, in diverse and incompatible formats. Different groups within the large organizations may have created their own data stores to meet the needs of the group. Each group would typically select its own type of data storage system and format to meet its particular needs. Traditionally, these data stores were created independently of any other data stores within the organization. As a result, the various data stores of an organization often contained duplicate and inconsistent data.

Recently, these large organizations have adopted standards such as the extensible markup language ("XML") for representing data in a uniform format. The use of XML by each group within an organization increases the compatibility of the data stores. It is, however, difficult for organizations to provide an XML interface to each of its existing data stores. The organizations would need to expend considerable resources to provide a mapping between their existing data stores or other sources of data and the XML formats.

It would be desirable to have a system that would facilitate the integrating of data stores with incompatible formats.

BRIEF DESCRIPTION OF THE DRAWINGS

FIG. 11 illustrates the results of the sorted outer union for the tables of FIG. 10.

FIG. 12 illustrates the SQL query for each of the tables of FIG. 10 paid to generate the sorted outer union.

DETAILED DESCRIPTION

Figure 1:
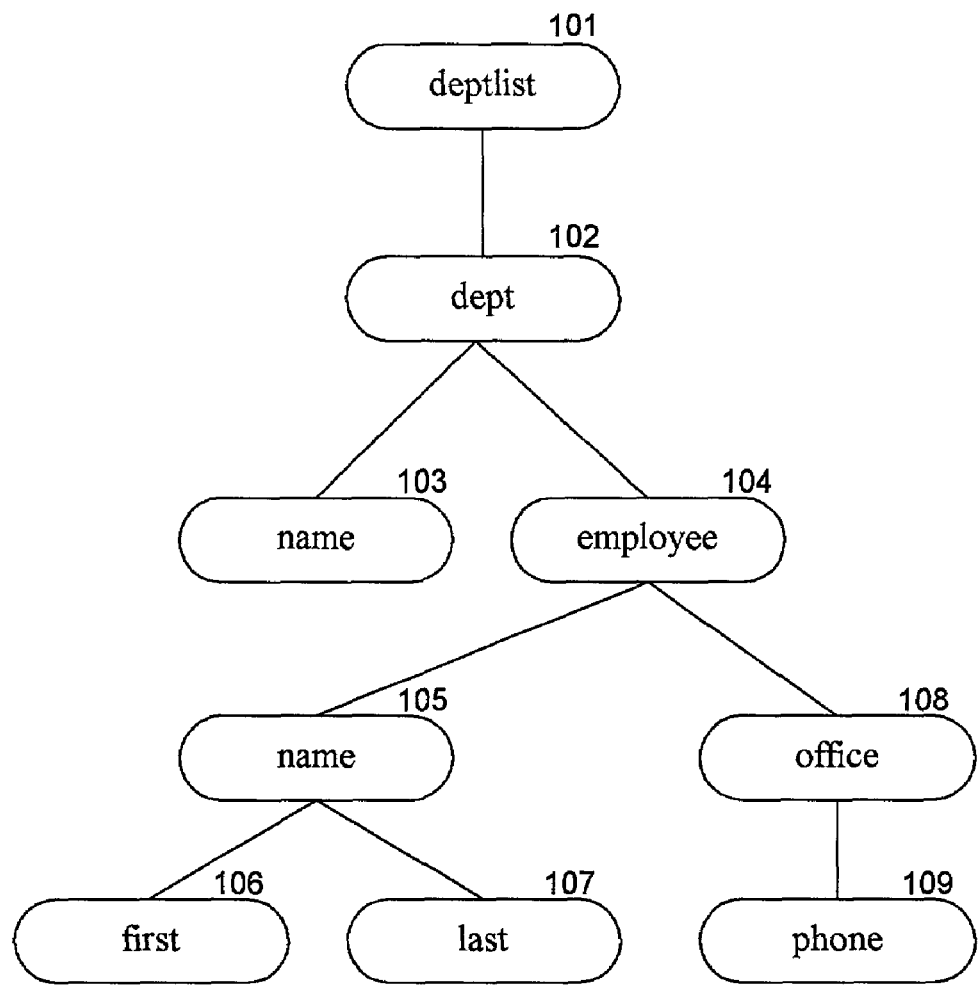
FIG. 1 illustrates the schema of this XML document.

A method and system for providing data integration of multiple data stores with diverse formats is provided. In one embodiment, the data integration engine accepts queries using a standard query language such as XML-QL, executes those queries against the multiple data stores, and returns the results. The data stores may include relational databases, hierarchical databases, file systems, application data available via APIs, and so on. A query may reference data that resides in different data stores. The data integration engine allows operations such as joins across multiple data stores. In one embodiment, the data integration engine uses XML as the data model in which the data from the various data stores is represented. The data integration engine processes a query by parsing the query into an internal representation, compiling and optimizing the internal representation into a physical execution representation, and then executing the execution representation. By providing a uniform and data model, the data integration engine allows access to data stores in diverse formats.

In one embodiment, the data integration engine executes a query on a data store by first providing a mapping of the data store format into an XML format. The query for the data store is based on XML format. The data integration engine upon receiving a query, generates a native query for the data store from the received query using the provided mapping. The data integration engine then executes the native query to generate data in a native format needed to generate the results of the received query. The data integration engine then converts the data in the native format into data in a format referred to as nested conditional relations ("NCR"). The data integration engine then applies various operators (e.g., joins and unions) to the data in NCR format to generate the query results in an NCR format. The data integration engine then converts the results in the NCR format into an XML format. In this way, the integration engine can provide access to various data sources in different formats.

A nested conditional relation is a table in which each row may have a different schema and each column is either a primitive type or a nested NCR. The schema of each row in an NCR is indicated by a tag, which can be considered to be the zero column of the row. For example, certain rows of the table may represent employees of a company and have columns named "first name," "last name," "phone number," and so on. Other rows in the table may represent departments within the company and have columns named "department name," "department head," and so on. The tag for a row indicates whether the row is an employee or a department row. A column for a certain type of row may itself contain a nested conditional relation. For example, an employee row may include a column named "skills" that contains a table with sub-rows containing information relating to computer skills and accounting skills of the employee. The table may itself be a nested conditional relation in that each sub-row may include a tag indicating whether the row represents a computer skill or an accounting skill. The nesting of nested conditional relations may occur to an arbitrary level. The NCR format is described below in detail.

The following example illustrates a data store, a mapping for the data store, a query, an LMatch representation for the query, a JoinIn graph for the query, and an SQL query used to retrieve the data from the data source. Tables 1-3 illustrate an example of data that is stored in a data store such as a relational database. The relational database contains three tables: DEPARTMENTS table, EMPLOYEES table, and BUILDINGSDOCS table.

TABLE 1

DEPARTMENTS

| Name | Contact |
|---|---|
| Finance | E1247 |
| Engineering | E3214 |

TABLE 2

EMPLOYEES

| ID | Fname | Lname | Dept | Bldg | Office | Manager |
|---|---|---|---|---|---|---|
| E0764 | Bobby | Darrows | Finance | B | 102 | E1247 |
| E0334 | Alice | LeGlass | Finance | B | 103 | E1247 |
| E1247 | David | Winston | Finance | B | 110 | NULL |
| E3214 | David | McKinzie | Engineering | L | NULL | E1153 |
| E0868 | Misha | Niev | Engineering | L | 15 | E1153 |
| E0012 | David | Herford | Engineering | M | 332 | E1153 |
| E1153 | Charlotte | Burton | Engineering | M | 330 | E0124 |
| E0124 | David | Wong | Engineering | L | 12 | NULL |

TABLE 3

BUILDINGSDOCS

| Building | Office | Phone | MaintContact |
|---|---|---|---|
| B | 102 | x1102 | E0764 |
| B | 103 | x1103 | E0764 |
| B | 110 | x1110 | E0764 |
| L | lobby | x0001 | E3214 |
| L | 12 | x0120 | E3214 |
| L | 15 | x0150 | E3214 |
| M | 330 | x2330 | E3214 |
| M | 332 | x2332 | E3214 |

The DEPARTMENTS table contains one row for each department of an organization. As illustrated by Table 1, the organization has a finance and an engineering department. The DEPARTMENTS table contains two columns: name and contact. The name column contains the name of the department, and the contact column contains the employee identifier of the contact person for the department. For example, the first row of the table indicates that the department is "finance" and that the contact employee is "E1247." The EMPLOYEES table contains a row for each employee in the organization. Each row includes seven is columns: ID, Fname, Lname, Dept, Bldg, Office, and Manager. The ID column uniquely identifies the employee, the Fname column contains the first name of the employee, the Lname column contains the last name of the employee, the Dept column identifies the employee's department, the Bldg column identifies the building in which the employee is located, the Office column identifies the employee's office within the building, and the Manager column identifies the employee's manager. The Dept column contains one of the values from the Name column of the DEPARTMENTS table. The BUILDINGSDOCS table contains a row for each office within each building of the organization. The BUILDINGSDOCS table contains four columns: Building, Office, Phone, and MaintContact. The Building column identifies a building, the Office column identifies an office within the building, the Phone column contains the phone number associated with that office, and the MaintContact column identifies the employee who is the maintenance contact for the office. The combination of the Building and Office columns uniquely identifies each row. The Bldg and Office columns of the EMPLOYEES table identifies a row within the BUILDINGSDOCS table.

Table 4 is an example of data stored as an XML document.

TABLE 4

```
<deptlist>
    <deptname="Finance">
        <employee>
            <name><first>Bobby</first><last>Darrows</last></name>
            <office phone="x1102"/>
        </employee>
        <employee>
            <name><first>Alice</first><last>LeGlass</last></name>
            <office phone="x1103"/>
        </employee>
        ...
    </dept>
    <dept name="Engineering">
        <employee>
            <name><first>David</first><last>McKinzie</last></name>
        </employee>
        <employee>
            <name><first>Misha</first><last>Niev</last></name>
            <office phone="x0150"/>
        </employee>
        ...
    </dept>
</deptlist>
```

The XML document includes the root element <deptlist> that has a name attribute and that contains a <dept> element corresponding to each department within an organization. Each <dept> element contains an <employee> element for each employee within the department. Each <employee> element contains a <name> element and optionally an <office> element. The <name> element includes a <first> element and <last> element. The <office> element includes a phone attribute. The schema of an XML document may be represented by an XML data type definition ("DTD") of the document. FIG. 1 illustrates the schema of this XML document. As this figure illustrates, the schema is specified as a tree-like hierarchy with the nodes of the tree having parent-child relationships. For example, node 104 is the parent of nodes 105 and 108, which are children of node 104. Node 101 corresponds to the <deptlist> element and has one child node 102, which corresponds to the <dept> element. Node 102 has two child nodes, 103 and 104. Node 104 corresponds to the name attribute of the <dept> element and node 104 corresponds to the <employee> element. Node 104 has two child nodes 105 and 108. Node 105 corresponds to the <name> element and has two child nodes 106 and 107. Node 106 corresponds to the <first> element, and node 107 corresponds to the <last> element. Node 108 corresponds to the <office> element and has one child node 109, which corresponds to the phone attribute.

The mapping technique is particularly useful in situations where a legacy database, such as the example database of Tables 1-3, is to be accessed using queries designed for XML data, such as the example of Table 4. The XML schema may be previously defined and many different applications for accessing data based on that XML schema may have also been defined. For example, one such application may be a query of the data. An example query for semi-structured data may be an XML transform that is designed to input data in XML format and output a subset of the data in XML format. For example, a query for the database of Tables 1-3 may be a request to list the ID of each employee in the "Finance" department. The subset of that data that is output corresponds to the results of the query represented by the XSL transform. One skilled in the art would appreciate that queries can be represented in other formats such as XML-QL. When a legacy database is to be accessed, the data is not stored using XML format. Thus, in one embodiment, a query system inputs a semi-structured query and uses a mapping table to generate a structured query, such as an SQL query, that is appropriate for accessing the legacy database. The mapping technique for generating that mapping table is described in the following.

Table 5 is a portion of the mapping table generated in accordance with the mapping technique that maps the XML schema of Table 4 to the legacy database of Tables 1-3.

parent key column contains the name of the column that identifies the parent of the parent-child relationship. The child key column contains the name of the column that identifies the child of the parent-child relationship. For example, in row 3, the parent is identified by the "dept" column and the child is identified by the "ID" column in the EMPLOYEES table. Thus, to generate the structured query to retrieve the ID of an employee within the finance department, the query that uses a select clause of EMPLOYEES.dept="Finance" would be used. Table 5 also includes a column named "A/E" to indicate whether the row corresponds to an element within the semi-structured data or an attribute of an element with semi-structured data. As illustrated by rows 7 and 8, some of the parent and child keys actually consist of multiple columns that uniquely identify a row in the corresponding table. For example, the rows of the BUILDINGSDOCS table are uniquely identified by a combination of the Building and Office columns.

The query system maps the selections within the semi-structured query to selections within a structured query. The following illustrates the basic format of that mapping when the structured query is an SQL format.

TABLE 5

| Row | ParentName | A/E | ChildName | Table | Pkey | Ckey |
|---|---|---|---|---|---|---|
| 1 | deptlist | E | dept | DEPARTMENTS | | Name |
| 2 | dept | A | name | DEPARTMENTS | Name | Name |
| 3 | dept | E | employee | EMPLOYEES | Dept | ID |
| 4 | employee | E | name | EMPLOYEES | ID | ID |
| 5 | name | E | first | EMPLOYEES | ID | Fname |
| 6 | name | E | last | EMPLOYEES | ID | Lname |
| 7 | employee | E | office | EMPLOYEES | ID | {Bldg,Office} |
| 8 | office | A | phone | BUILDINGSDOCS | {Building,Office} | phone |

The mapping table contains one row for each parent-child relationship of the XML schema. The mapping is further described in U.S. patent application entitled "Method and Apparatus for Storing Semi-Structured Data in a Structured Manner." As shown in FIG. 1, the XML schema defines eight parent-child relationships such as the relationship between node 102 and node 104. Thus, the mapping table contains eight rows. Each row uniquely identifies a parent-child relationship using the ParentName and ChildName columns. For example, the parent-child relationship of node 102 and node 104 is represented by row 3 as indicated by the ParentName of "dept" and the ChildName of "employee." Each row maps the parent-child relationship to the table in the legacy database that corresponds to that relationship. In the example of row 3, the Table column indicates that the "dept-employee" relationship maps to the EMPLOYEES table. The query system could use only the ParentName, ChildName, and Table columns of the mapping table to generate a structured query from a semi-structured query. For example, if the legacy database had used the same column names as defined by the elements of the XML schema (e.g., "employee" rather than "ID"), then only these three columns would be needed to generate the structured query. For example, if the semi-structured query requested an identifier of all employees within the finance department and the DEPARTMENTS table contained an "employee" column rather than an "ID" column, then the query system could input a semi-structured query with only these three columns and generate a structured query. In the more general case where the columns of the legacy database are arbitrarily named, the mapping table includes a parent key column ("PKey") and a child key column ("CKey"). The

```
SELECT {TABLE}.{CKEY}
FROM {TABLE}
WHERE {TABLE}.{PKEY} = pkey
```

The TABLE, CKEY, and PKEY parameters are replaced by the corresponding values from the row in the mapping table for the parent-child relationships specified by the selection. In other words, this query will find all the children given the key for the parent. The following illustrates the format of the mapping when the query represents the identification of the idea of all employees within the finance department.

```
SELECT EMPLOYEES.ID
FROM EMPLOYEES
WHERE EMPLOYEES.Dept = "Finance"
```

The query system also allows chaining of keys to effectively navigate through the hierarchy defined by the semi-structured data. The query system uses the joint concept of relationship databases to effect this chaining of keys. The following illustrates chaining:

```
SELECT {TABLE2}.{CKEY2}
FROM {TABLE1}, {TABLE2}
WHERE {TABLE1}.{PKEY1} = pkey && {TABLE1}.{CKEY1}=
{TABLE2}.{PKEY2}
```

The TABLE1, PKEY1, and CKEY1 parameters are derived from the first parent-child relationship in the chain, and the TABLE2, PKEY2, and CKEY2 parameters are derived from the second parent-child relationship in the chain. The child key associated with the first parent-child relationship matches the parent key associated with the second parent-child relationship. The following is an example of the chaining to identify the building for the employees of the finance department.

```
SELECT BUILDINGSDOCS.BUILDING
FROM EMPLOYEES, BUILDINGSDOCS WHERE
EMPLOYEES = "Finance" &&
    EMPLOYEES.BLDG = BUILDINGDOCS.BUILDING &&
    EMPLOYEES.OFFICE = BUILDINGDOCS.OFFICE
```

In one embodiment, the mapping table also contains the value rows corresponding to each leaf node, that is a node that is not a parent node. The leaf nodes of FIG. 1 are nodes 103, 106, 107, and 109. In one embodiment, each value row identifies an XML element or attribute, the table in the legacy database that contains an element, and the name of the column in the table that contains the value for that element or attribute. Table 6 illustrates the four value rows for the mapping associated with Tables 1-3 and Table 4.

TABLE 6

| Row | A/E | Name | Table | Key | Value |
|---|---|---|---|---|---|
| 9 | A | name | DEPARTMENTS | Name | Name |
| 10 | E | first | EMPLOYEES | Fname | FName |
| 11 | E | last | EMPLOYEES | Lname | LName |
| 12 | A | phone | BUILDINGSDOCS | Phone | Phone |

The "A/E" column identifies whether the row is an attribute or element; the "Name" column identifies the name of the element and attributes; the "Table" column identifies the legacy table; the "Key" column identifies the key for that table; and the "Value" column identifies the name of the column where the value is stored.

Table 7 illustrates a query that is to be applied to the data of Tables 1-3. The query indicates to return the first and last names and phone number of each employee in the engineering department.

TABLE 7

```
WHERE
    <deptlist>
        <dept name="Engineering">
            <employee>
                <name><first>$first</first><last>$last</last></name>
                <office phone="$ph"/>
            </employee>
        </dept>
    </deptlist>
CONSTRUCT
    <employee><name>$last, $first</name><phone>$ph</phone>
    </employee>
```

The data integration engine generates a "match expression" for a logical match operation ("LMatch") for the query when compiling the query. The logical match operation supports operations for performing XML navigation. The match expression defines a tree of navigations. Each node of the tree indicates a navigation type (e.g., child, parent, or sibling), a navigation condition (e.g., a condition on the name of the child), whether the navigation is required, whether there should be a binding to the target of the navigation (i.e., a value returned with the specified name), and whether the result should be nested.

Table 8 illustrates a match expression for the XML of Table 4 for the query of Table 7. Each row of Table 8 represents a different navigation path. For example, the first row represents a navigation path from the root of the deplist element to its child element of the dept element and then to the name attribute of the dept element. The remaining rows represent different branches on the tree. For example, the second row represents the branch of root(deplist), child(dept), child(employee), child(name), and child(first). The symbols prefixed with "$" represent bindings.

TABLE 8

| root(deptlist) | child(dept) | child(name,$auto1) | | |
|---|---|---|---|---|
| | | child(employee) | child(name) | child(first, $first) |
| | | | | child(last, $last) |
| | | | child(office) | child(phone, $ph) |

Figure 2:
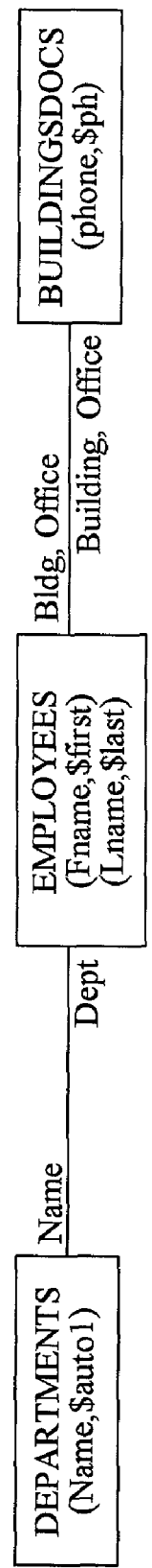
FIG. 2 represents a JoinIn graph (JIG) for the match expression of Table 8.

FIG. 2 represents a JoinIn graph (JIG) for the match expression of Table 8. The JoinIn graph is a data structure that facilitates the optimization of the query to be executed against the data store. This JIG indicates that the Departments, Employees, and Buildingdocs tables of the data store are to be joined together. This JIG also indicates the bindings (e.g., $first) and the join columns (e.g., Name and Dept). The format of the JIG is described below in detail. The JIG is generated from the match expression using the mapping. The data integration engine then generates the query to be executed. The following query is generated.

```
SELECT EMPLOYEES.Fname, EMPLOYEES.Lname,
BUILDINGSDOCS.phone
FROM DEPARTMENTS, EMPLOYEES, BUILDINGSDOCS
WHERE DEPARTMENTS.Name = EMPLOYEES.Dept AND
    EMPLOYEES.Bldg = BUILDINGDOCS.Building AND
    EMPLOYEES.Office = BUILDINGDOCS.Office AND
    DEPARTMENTS.NAME = "Engineering"
```

Figure 3:
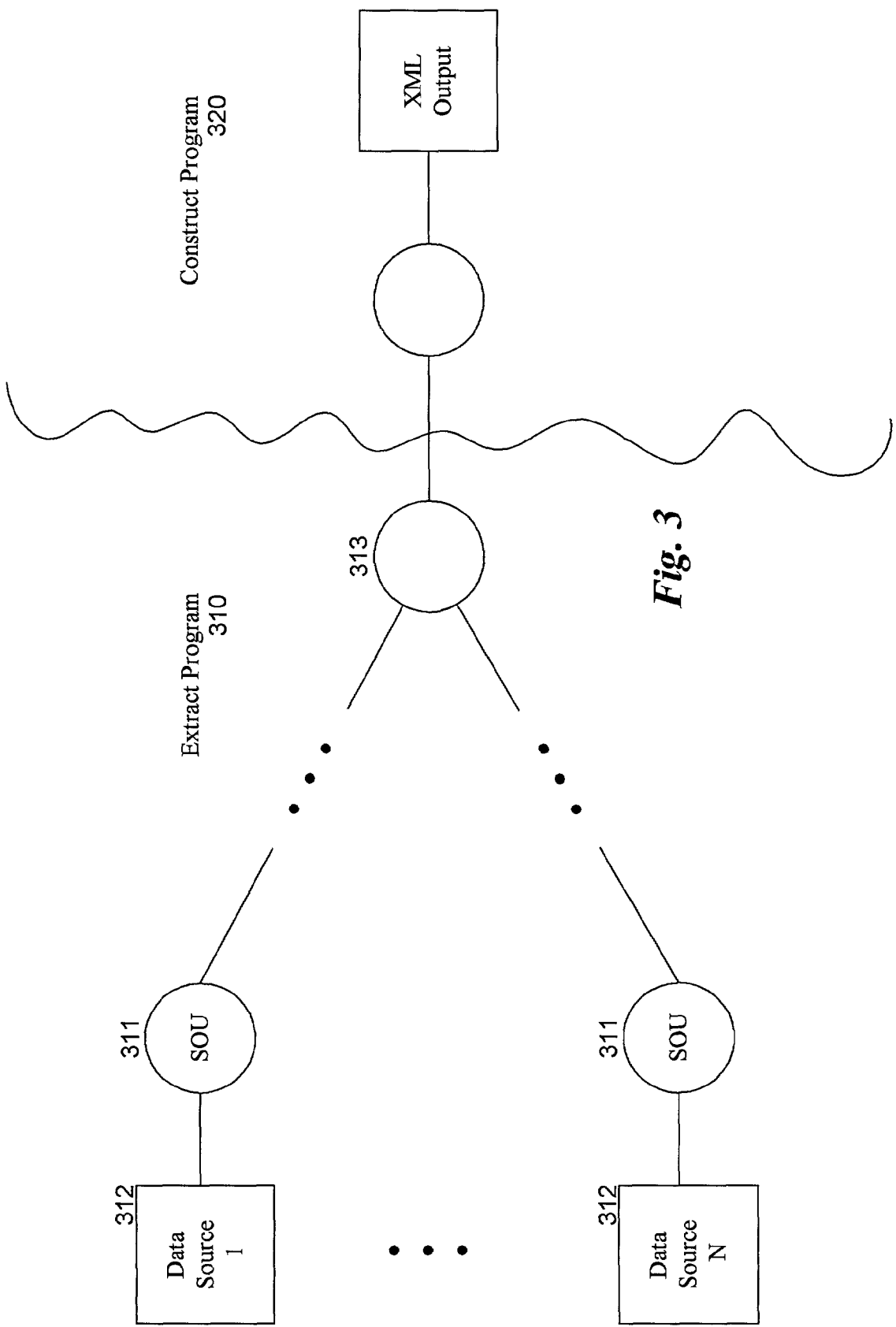
FIG. 3 is a block diagram illustrating the overall organization of an execution program generated by the data integration engine.

FIG. 3 is a block diagram illustrating the overall organization of an execution program generated by the data integration engine. An execution program consist of an extract program 310 and a construct program 320. A compiler of the data integration engine generates the execution program during a compilation phase. The extract program is a series of operations on a data extracted from the data sources. The extract program represents a graph of the operations. The leaf nodes 311 of the extract program represents a sorted outer union operation applied to the data stores 312. The compiler generates a query for each data store in the native query language of the data store to retrieve the results of the sorted outer union.

The compiler generates the sorted outer union using the LMatch operation, JoinIn graph, and mapping. During execution of the extract program, the generated query is applied to each data store. The construct program accesses the root node 313 of the extract program which retrieves the results generated by the extract program. The construct program collects the data and formats it into an XML output. As discussed below in more detail, the output of each operation of the extract program is in a nested conditional relation format.

Figure 4:
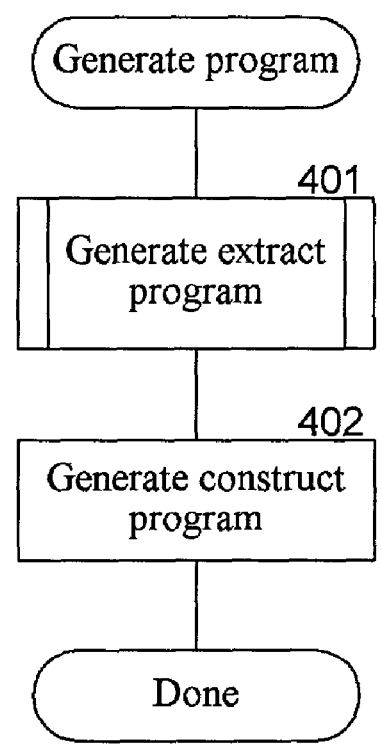
FIG. 4 is a block diagram illustrating the function to generate an execution program.

FIGS. 4-9 are flow diagrams illustrating processing of the compiler of the data integration engine in one embodiment. FIG. 4 is a block diagram illustrating a function to generate an execution program. The function first generates the extract program and then generates the construct program. In block 401, the function invokes a generate extract program function to generate an extract program for the specified query against the specified data stores. In block 402, the function invokes the generate construct program function to generate a construct program to generate the results from the extracted data.

Figure 5:
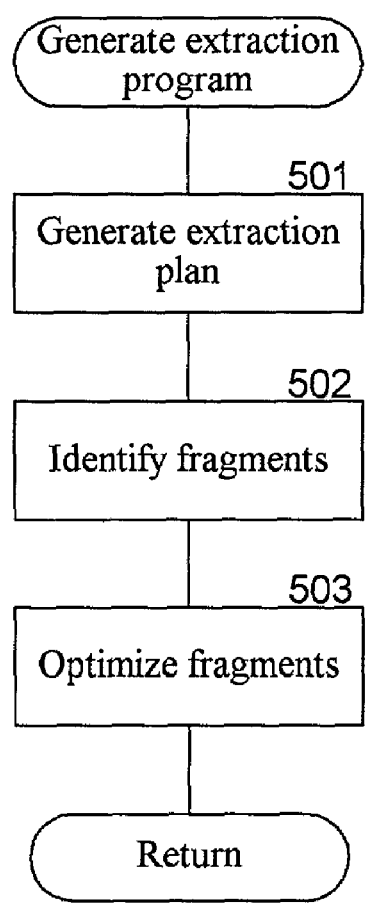
FIG. 5 is a flow diagram illustrating processing of the generate extract program function in one embodiment.

FIG. 5 is a flow diagram illustrating processing of the generate extract program function in one embodiment. In block 501, the function generates an extract plan. In block 502, the function identifies fragments of the extract plan. A fragment of an extract plan are the set of operations that are applied to data derived from a single data source. Operations that apply to data from multiple data sources are grouped into one fragment. In block 503, the function optimizes the operations of the fragments and then returns.

Figure 6:
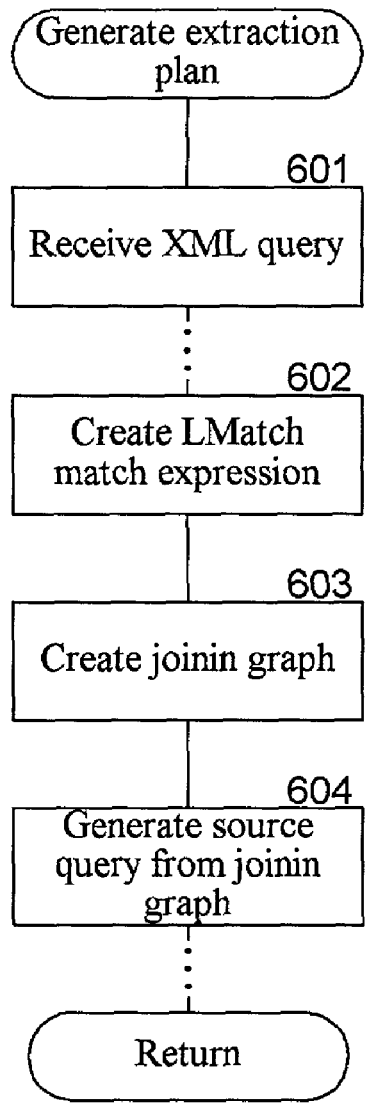
FIG. 6 is a flow diagram illustrating the processing of the generate extract plan function in one embodiment.

FIG. 6 is a flow diagram illustrating the processing of the generate extract plan function in one embodiment. In block 601, the function receives the XML query. In block 602, the function generates a match expression for the logical match associated with the data store. In block 603, the function creates the JoinIn graph from the match expression using the mapping for the data store. In block 604, the function generates the native query from the JoinIn graph. The function indicates additional processing to generate the extract plan from the JoinIn graph. Blocks 602-604 illustrate the generation of the native query for the sorted outer union of the leaf nodes of the extract plan. The ellipses indicate other processing performed by the function. The function then returns.

Figure 7:
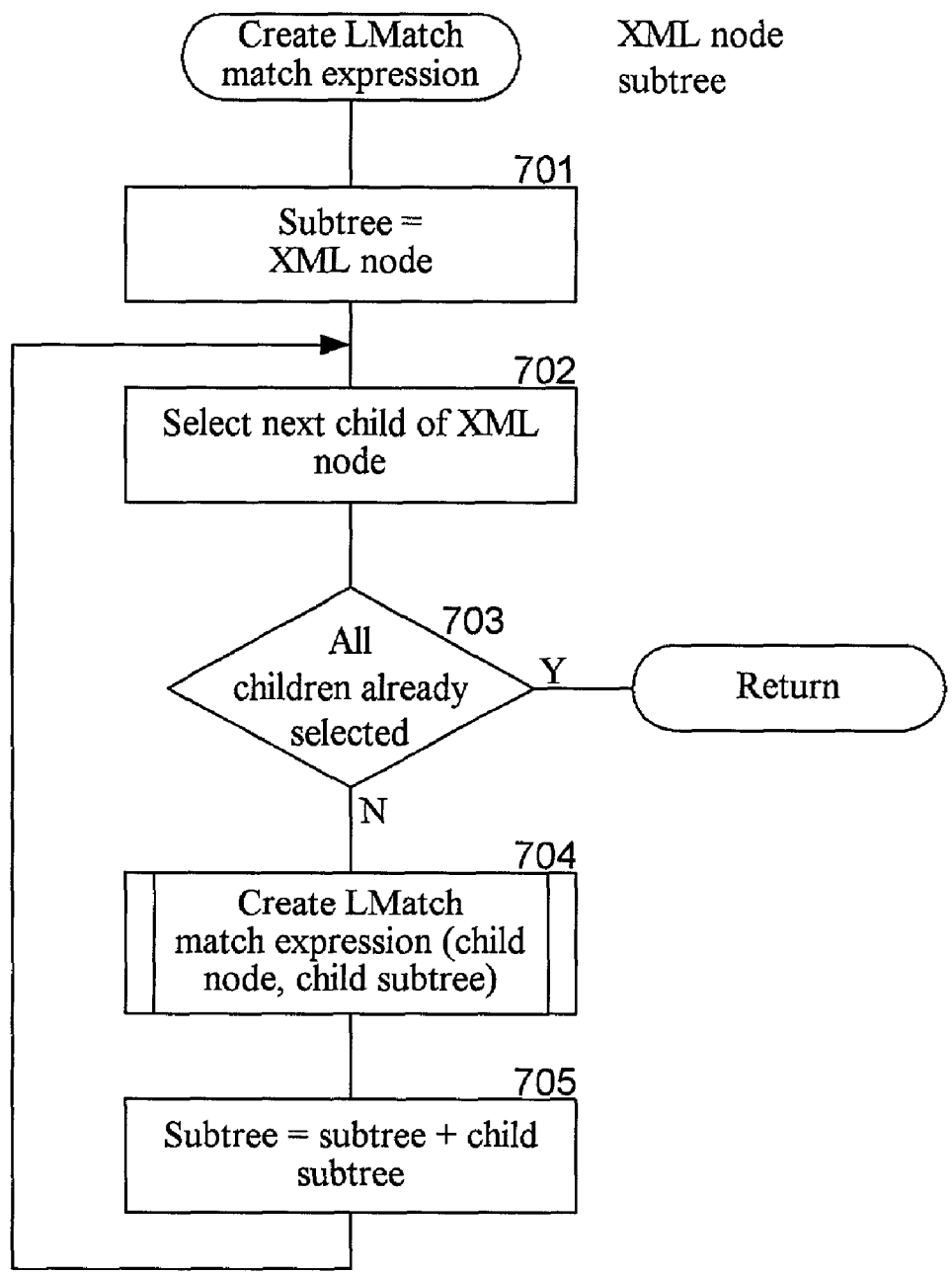
FIG. 7 is a flow diagram illustrating processing of the match expression function in one embodiment.

FIG. 7 is a flow diagram illustrating processing of the match expression function in one embodiment. This function is passed an XML node representing the data store and returns the match expression. This function is recursively invoked for each child node of the passed XML node. In block 701, the function initializes the sub-tree to the XML node. In block 702-705, the function loops creating a match expression for each child node. In a block 702, the function selects the next child node of the XML node. In decision block 703, if all the child nodes have already been selected, then the function returns, else the function continues at block 704. In block 704, the function recursively invokes the create match expression function passing the child node and receiving a child sub-tree in return. In block 705, the function adds the child sub-tree to the sub-tree and then loops to block 702 to select the next child.

Figure 8:
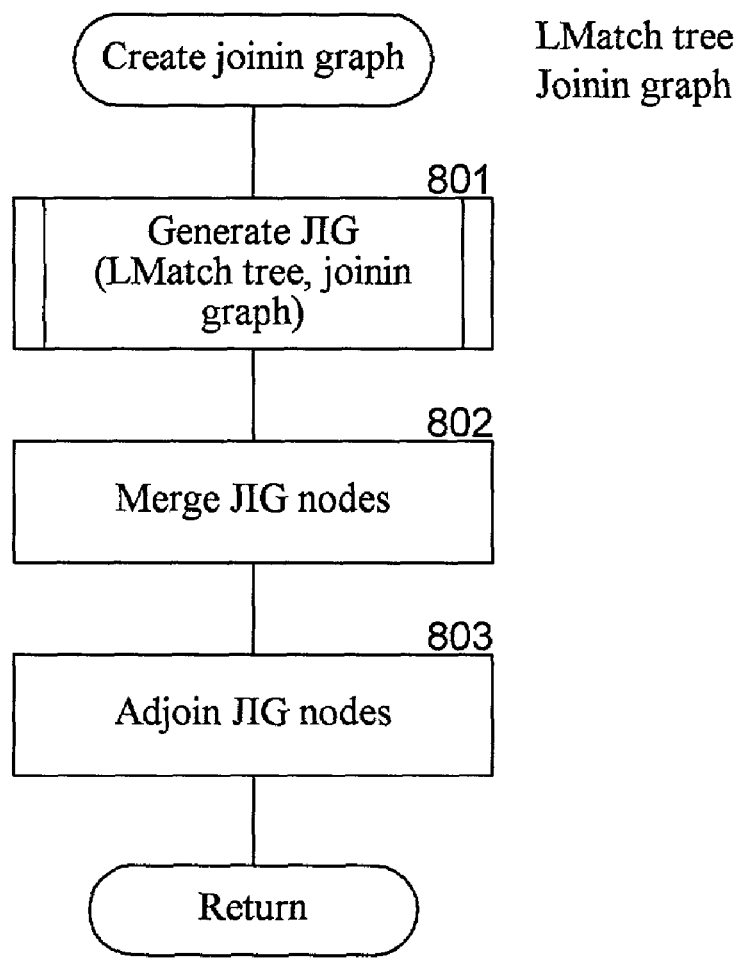
FIG. 8 is a flow diagram illustrating the processing of the create JoinIn graph function in one embodiment.

FIG. 8 is a flow diagram illustrating the processing of the create JoinIn graph function in one embodiment. In block 801, the function invokes the generate JoinIn graph passing the match expression and receiving the JoinIn graph in return. In block 802, the function merges nodes of the JoinIn graph. In block 803, the function processes merging of adjoining nodes of the JoinIn graph and then returns.

Figure 9:
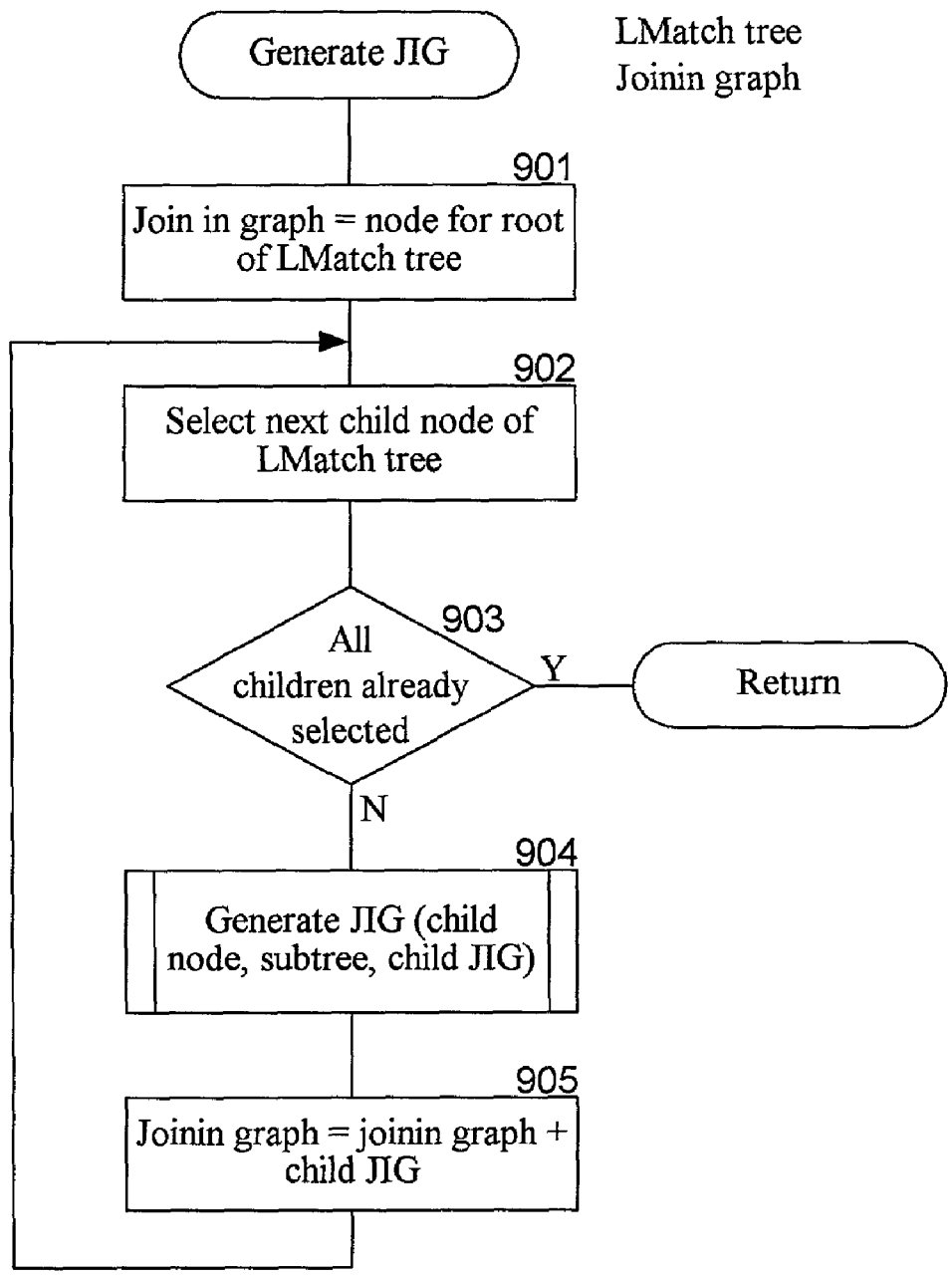
FIG. 9 is a flow diagram illustrating processing of the generate JoinIn graph into one embodiment.

FIG. 9 is a flow diagram illustrating processing of the generate JoinIn graph function into one embodiment. This function is passed a match expression and returns a JoinIn graph. The function is recursively invoked for each child node of the passed match expression. In block 901, the function sets the JoinIn graph to a node corresponding to the root of the match expression. The function retrieves the mapping rows that can further the path from the root. In block 902, the function selects the next child node of the match expression. In decision block 903, if all the children have already been selected, the function returns, else the function continues at block 904. In block 904, the function recursively invokes the generate JoinIn graph function passing the selected child node of the match expression and receiving a child JoinIn graph in return. In block 905, the function adds the child JoinIn graph to the JoinIn graph and then loops to block 902 to select the next match expression.

Figure 10:
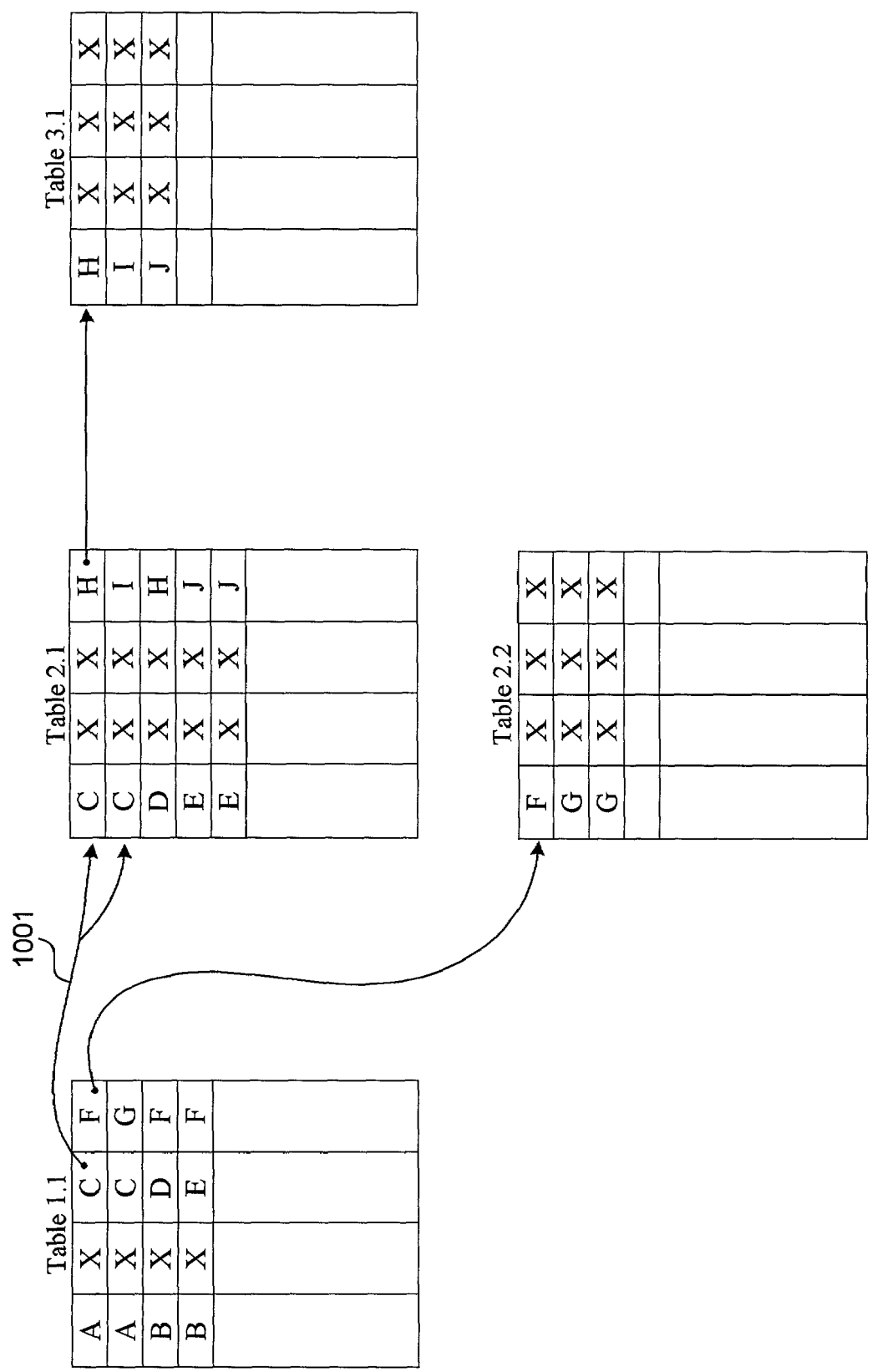
FIG. 10 illustrates the tables of the data store.
Figure 11:
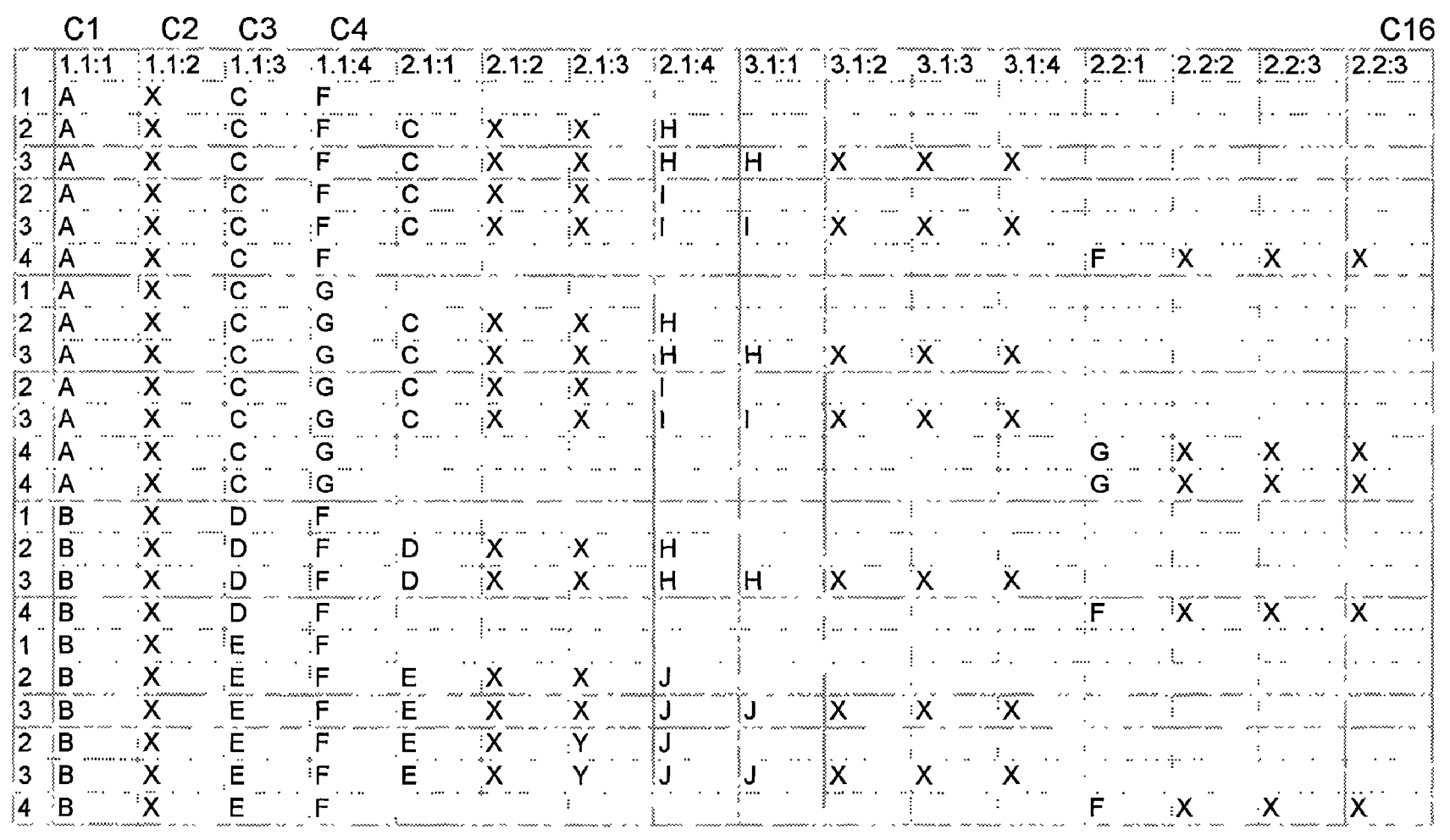

FIGS. 10-15 illustrate the generation of an SQL query for a sorted outer union node of an extract program. FIG. 10 illustrates the tables of the data store. The arrows between the tables illustrate joins between tables. For example, arrow 1001 represents a join between the third column of table 1.1 and the first column of table 2.1. FIG. 11 illustrates the results of the sorted outer union for the tables of FIG. 10. FIG. 12 illustrates the SQL query for each of the tables of FIG. 10 that are used to generate the sorted outer union.

Figure 13:
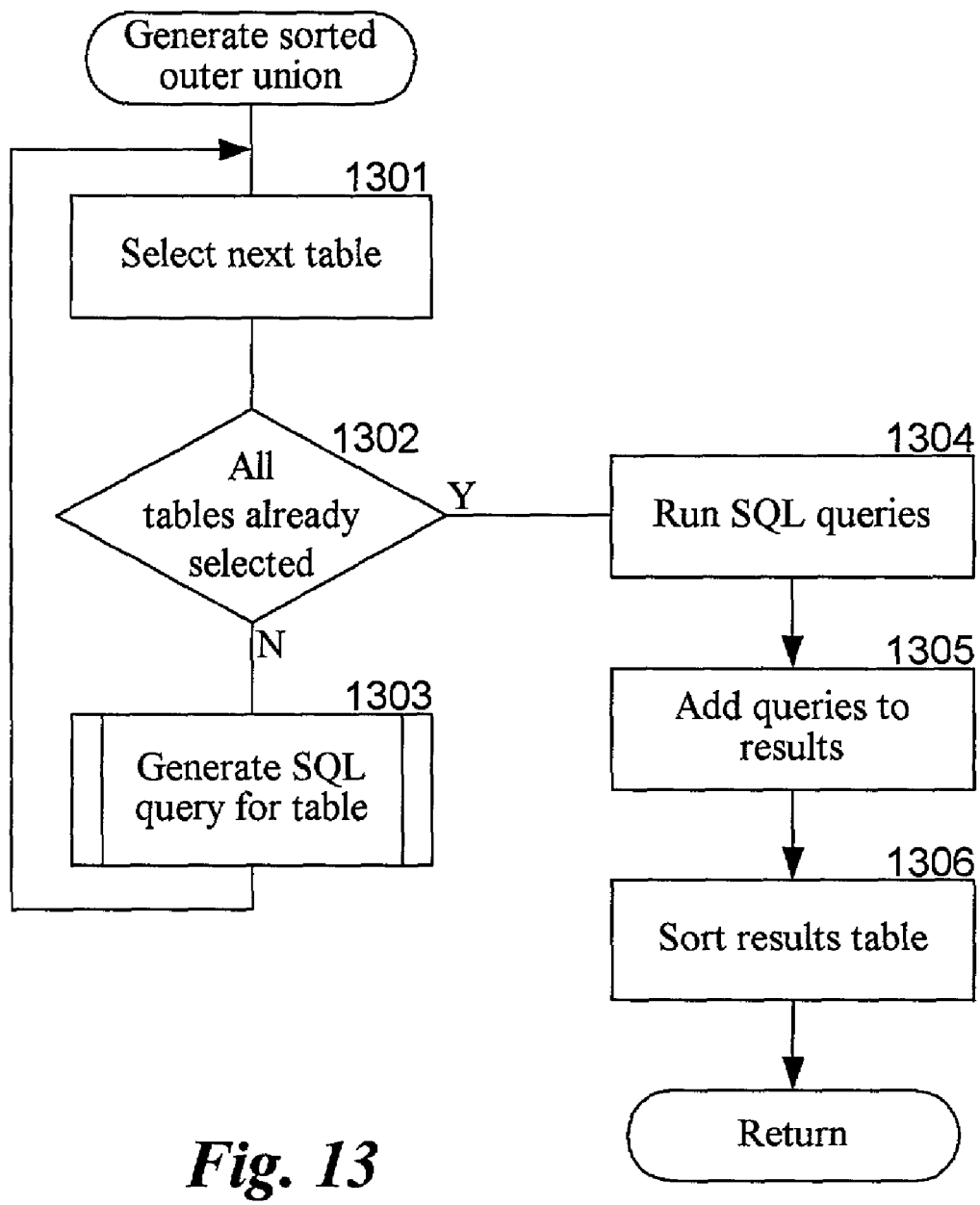
FIG. 13 is a flow diagram illustrating the processing of generating a sorted outer union.

FIG. 13 is a flow diagram illustrating the processing of a function to generate a sorted outer union. In block 1301, the function selects the next table of the source data store. In decision block 1302, if all the tables have already been selected, the function continues at block 1304, else the function continues at block 1303. In block 1303, the function invokes the generate SQL query for the selected table and then loops to block 1301 to select the next table. In block 1304, the function executes the generate SQL queries against the tables. In block 1305, the function aggregates of the result of the queries into a table. In block 1306, the function sorts the results and then returns.

Figure 14:
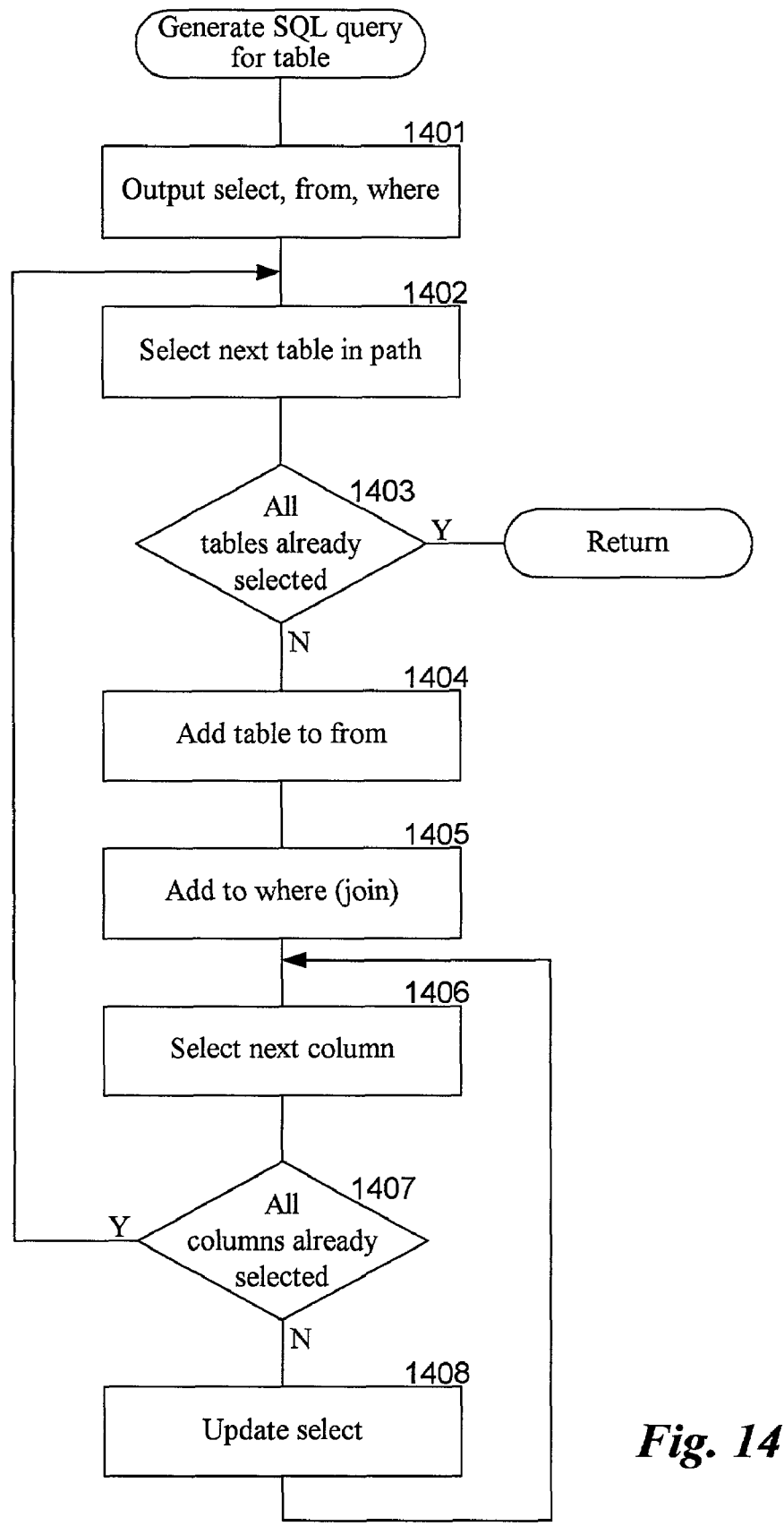
FIG. 14 is a flow diagram illustrating processing of a generate SQL query function in one embodiment.

FIG. 14 is a flow diagram illustrating processing of a generate SQL query function in one embodiment. In block 1401, the function outputs a select, from, and where clause for the query. In blocks 1402-1408, the function loops selecting each table in a join path of the data store. In block 1402, the function selects the next table in the path. In decision block 1403, if all the tables have already been selected, then the function returns, else the function continues at block 1404. In block 1404, the function adds the table to the from clause. In block 1405, the function adds the table to the where clause. In block 1406-1408, the function loops selecting each column of the selected table. In block 1406, the function selects the next column. In decision block 1407, if all the columns have already been selected, then the function loops to block 1402 to select the next table of the path, else the function updates the select clause with the column and then loops to block 1406 to select the next column. Columns of tables not in the selected path are set to null.

Figure 15:
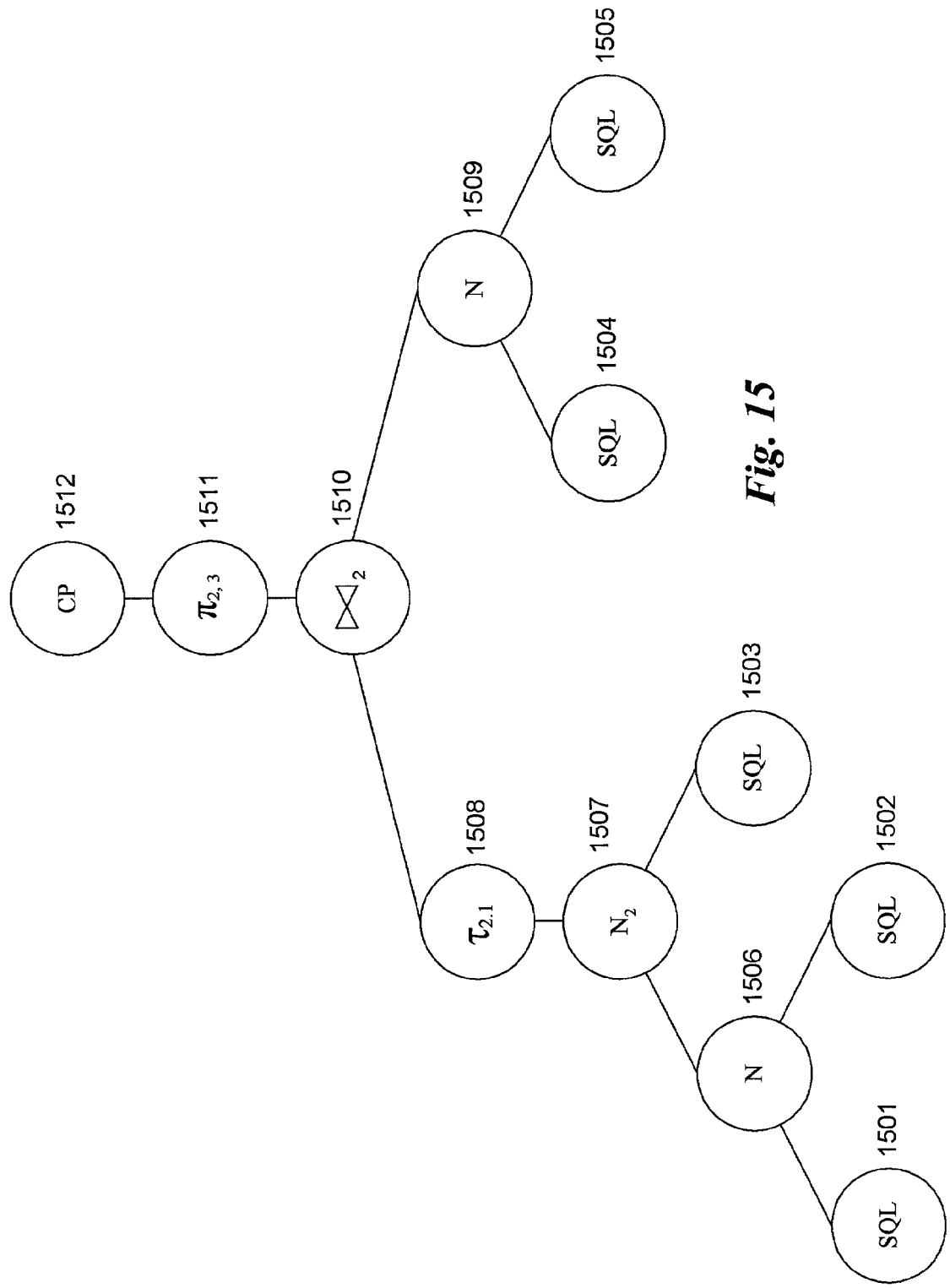
FIG. 15 is a block diagram illustrating an extract program.

FIG. 15 is a block diagram illustrating an extract program. Each of the leaf nodes 1501-1505 represent SQL queries that are applied to a data source. Node 1506 represents a nesting of the results of nodes 1501 and 1502. Node 1507 represents a nesting of the results of nodes 1506 and 1503. Node 1508 represents a selection on the results of node 1507. Node 1509 represents a nesting of the results of nodes 1504 and 1505. Node 1510 represents a join of the results of nodes 1508 and 1509. Node 1511 represents a projection of the results of node 1510. Node 1512 represents the construct program that accesses the extract program.

Figure 16:
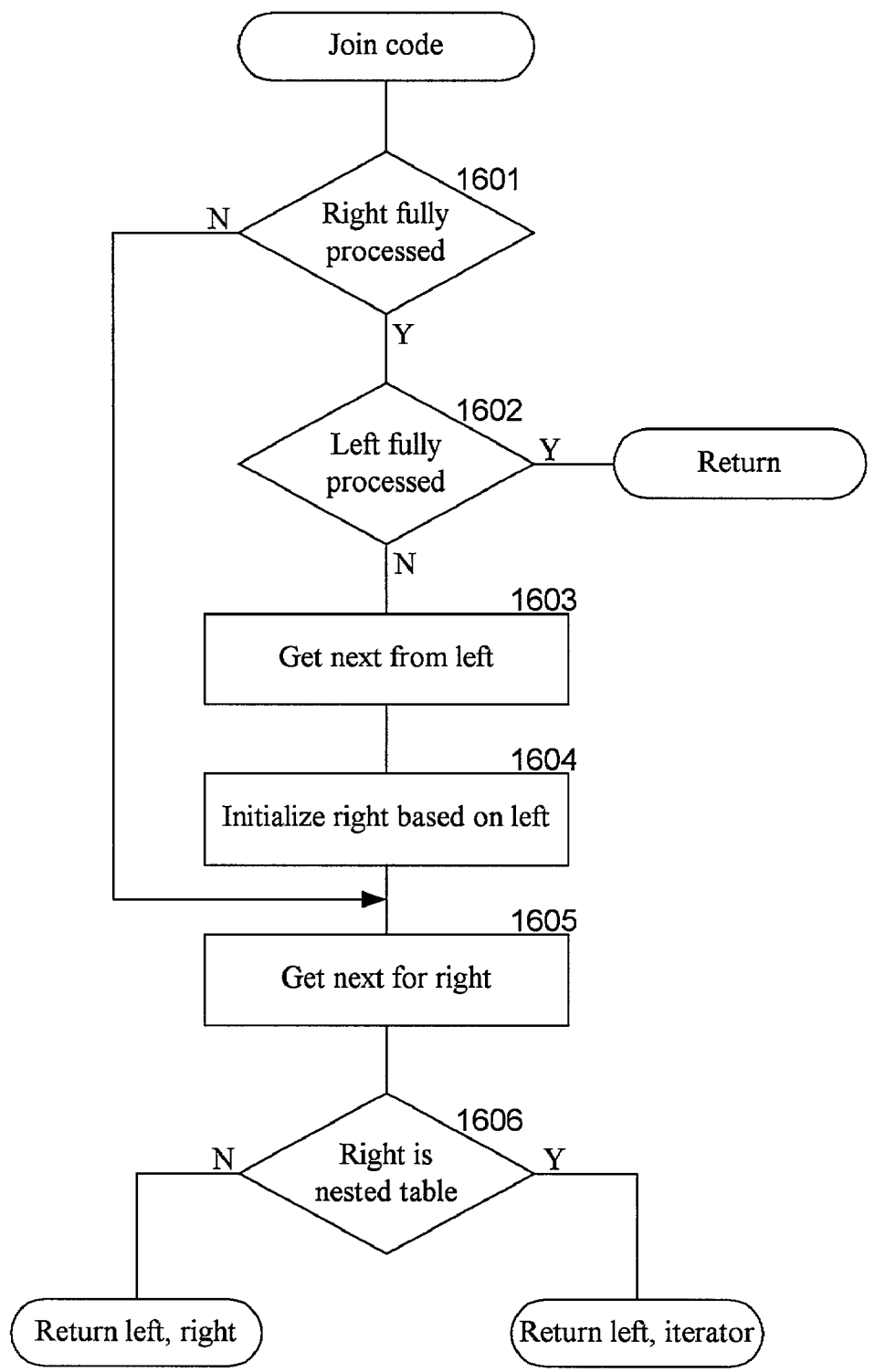
FIG. 16 is a flow diagram that illustrates code of a join node of an extract program in one embodiment.

FIG. 16 is a flow diagram that illustrates code of a join node of an extract program in one embodiment. In one embodiment, the processing of each node of extract program is performed a pipeline manner, that is each node returns only the data needed to satisfy the next request from the construct program. In decision block 1601, if the right node is a fully processed, then the function continues at block 1602, else the function continues at block 1605. In decision block 1602, if the left node of the join is fully processed, then the function returns, else the function continues at block 1603. In block 1603, the function retrieves at the next results from the left node. In block 1604, the function initializes the right node based on the results returned from the left node. In block 1605, the function retrieves the next results from the right node. In decision block 1606, if the results returned from the right node are contained in nested table, then the function returns an iterator for that table, else the function returns the results. The iterator for a table is an optimization that allows nodes higher in the extract program to retrieve subsequent rows of the nested table without having to invoke lower-level nodes in the extract program.

Figure 17:
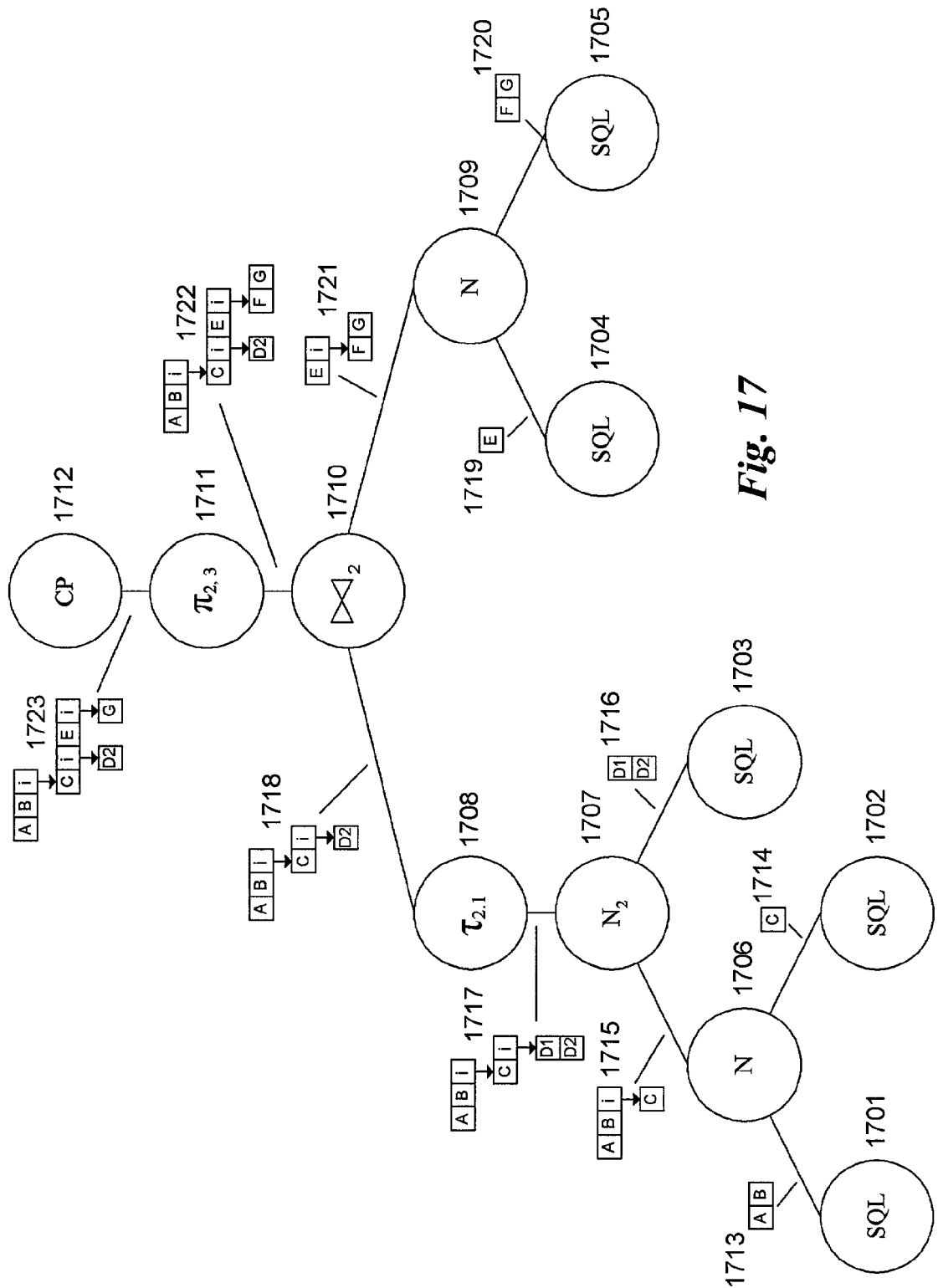
FIG. 17 illustrates the output of the nodes of the extraction plan to FIG. 15.

FIG. 17 illustrates the output of the nodes of the extraction plan to FIG. 15. When the construct program 1712 invokes root node 1711 of the extract program, that invocation is propagated down to the leaf nodes. The SQL query of node 1701 returns result 1713, and the SQL query of node 1702 returns result 1714. Node 1706 indicates to nest results of nodes 1701 and 1702. In this case, result 1714 is nested within result 1713 as indicated by result 1715. Node 1703 returns result 1716. Node 1707 nests result 1716 within result 1715. The subscript within node 1707 specifies a target for the nesting. In this case, the subscript 2 indicates to nest within the third column of result 1715. (Columns are identified starting with column 0.) Result 1717 represents the result of the nesting. Node 1708 represents selection on the result 1717. The target represented by subscript 2.1 indicates to select the third column and the first row within the third column. The result of the selection is result 1718. Results 1719-1723 illustrates the results of the other nodes of the extract program.

LMatch Operation

The LMatch operator performs navigation-based selection over XML input. The following example illustrates an XMLQL syntax fragment and the LMatch instance that is created to model it inside the compiler:

<a><b><c>$c</></></> ELEMENT_AS $a

LMatch($results, "self(a,$a)—child(b,--)—child(c,$c)")

The "self(a,$a)—child(b,--)—child(c,$c)" is a match expression. In this example, the match expression is a tree with three nodes. The general structure of the XMLQL pattern is translated into an isomorphic pattern within the match expression. The XMLQL variables become "bindings" within the navigations. The LMatch operator is one of the logical operators of the internal language of the data integration engine. The LMatch operator is generally the "first" operator that is applied to input data and is responsible for converting XML input in to NCRs that are then further processed by the query engine. The LMatch operator is a logical operator only in that one of the actions of the Compiler is to convert LMatch operators into a data source-dependent form (e.g., SQL for relational databases, or QLL for QL-Lite data sources).

The LMatch operator defines a match against XML data. The pattern is defined by the "match expression," which is a tree of navigation steps. Each navigation step describes a "movement" from a source element or attribute to a target element or attribute. The parameters of the navigation step that govern navigation are as following:

The type of movement or navigation (child, parent, descendant etc.) The navigation types are based on XPath axes.

The name of the target element or attribute, which may be a wild card.

Whether the target should be an element, an attribute, or either.

Whether the navigation is optional or not.

LMatch matching is top-down on the tree of navigation steps. That is, the match begins at the root of both the XML document and the root of the match expression. Matches for the first navigation step are sought in the entire XML document. If the first navigation is a root navigation, then it matches the root of the XML document (where we interpret root to be the root element, not the document item, as defined in DOM). If the first navigation step is something other than root, it is as a navigation from the root.

Once a node or set of nodes have been identified for the first navigation, the algorithm proceeds recursively: given a matched node, attempt each of the child navigations from the navigation tree (where child here means "child in the navigation tree," rather than child type node). Each attempted navigation will itself yield a new set of zero or more matches, which are then continued in the next level of the recursion, and so forth. While the recursion proceeds down the navigation tree, the navigations do not necessarily proceed "down" the XML tree; navigation types can move in arbitrary directions within the XML document (e.g., ancestor or preceding_sibling).

If an attempted navigation yields zero matches from some source node, then that navigation is said to have failed. If the navigation was not marked as optional=true, then the failure of the naviagation causes the source node to be "unmatched." The following match expression illustrates the failure of a navigation;

self(a,$a)—child(b,$b)—child(c,$c)

The first navigation step may yield a single element <a>. The second step may yield a set of <b> elements, some of which contain <c> elements and some of which do not. When the final navigation is evaluated, it will, for some <b> elements, yield no results. If the navigation is optional (optional=true), then all the <b> elements are included in the result. If, however, the navigation is required (optional=false), then those <b> elements that contain no <c> elements are removed from the set of matches for child(b) from the root <a> element. The result contains only <b> elements that actually contain <c> elements. If no <b> elements remain after this process, then the failure propagates upward, "unmatching" the <a> elements (unless the child(b) navigation was optional).

The evaluation of an LMatch operator is a three stage process: first, match the pattern within the LMatch operator against some source of XML; second, connect columns in the LMatch pattern with their associated items in the information set of the XML source; and thirs, structure those connected columns (the extracted information) into an NCR as indicated by the nesting settings on individual navigations. That is, an LMatch operator specifies a structural pattern that is sought after in a document, specifies which parts of that pattern should be returned, and specifies how the returned parts should be organized. The output of an LMatch operator is an NCR that contains the returned parts, organized as specified.

The parameters of the LMatch that govern how results are constructed are these:

The set of columns returned. An NCR column "names" some piece of information returned from an element or attribute node that has been matched. There are several kinds of columns:

value: the contents of a simple element or attribute subtree: the entire element (not applicable to attributes)

name: the name of the element or attribute text: the text value of an element (used to extract text from mixed-content elements; in a simple element it is equivalent to 'value')

table: the table column gives a name to the entire set of results when nested=true Whether or not the results of the navigation should be nested.

Each navigation step may have one or more of the column types present. The type of the column is derived from the type of the corresponding contents of the XML document (except for the table column).

These columns are structured into an NCR based on the nested flag and the table column: If nested true, then the table column was specified, and the navigation creates a nested NCR. This NCR contains all the other columns for this navigation step, as well as all the columns generated by the subtree of navigations beneath it. For example:

self(a,--)—$_N$child(b,$b,$btable)—child(c,$c)
—child(d,$d)

Figure 18:
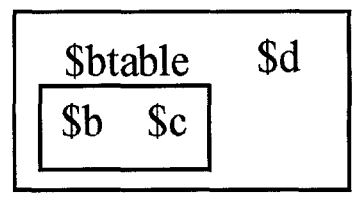
FIG. 18 illustrates a final NCR structure.

The root (top-level) navigation may also be nested or unnested. In addition, the LMatch operator, like other operators, provides an additional column that names the its entire schema. The child(b) navigation is a nested navigation that results in a nested NCR, named $btable, in the result. This NCR will contain columns $b (because $b is a column on the child(b) navigation) and $c (because $c is a column on a navigation in child(b)'s subtree). FIG. 18 illustrates a final NCR structure.

A depth-first traversal of the match expression of an LMatch operator is used to construct the columns of the output NCR. As a result, the LMatch operator also defines an ordering of the columns as well as their structure and names.

When a navigation matches multiple times, then the results differ based on whether the navigation is nested. If the navigation is a nested navigation, then a nested NCR is created, which will contain the matches. But if the navigation is not nested, then the results are combined via a cross-product with all the other columns in the same table. So, if one <b> element contained multiple <c> elements, the $btable would contain the corresponding <b>-<c> pairs. Navigations that are not nested can be treated as a special case of nested navigations. Thus, an LMatch operator can be evaluated as if all navigations are nested. Then, for each navigation that is actually nested, a an LFlatten operation can be used to remove the table corresponding to the nesting.

A subtree column results in the entire XML subtree, tags and all, being returned as an atomic value. (This corresponds to the ELEMENT_AS notation in XML-QL.) The compiler transforms this column into a more complex LMatch expression that "pulls apart" the entire subtree contents and modifies the rest of the execution unit to reconstruct the result back into a subtree when needed. As a result, subtree columns exist initially, but they are replaced with more complex patterns. Before they are rewritten, the subtree columns are modeled in the NCR schema as a single, static column. After the rewrite, they begin with a table-valued column containing the nested results.

Advantages of the LMatch operator being a single, complex operation include:

1. When queries are generated for query languages which themselves contain some form of matching operations, then mapping onto those operations is enabled.
2. Certain optimizations that may be done on navigational matching are better enabled by capturing succinctly the navigation that is being done. In particular, reasoning about substitution of a descendant relation with a union of paths, and vice versa. Also, also reasoning about document order relations.
3. The LMatch operator combines two kinds of capabilities into a single operator: navigational operations and composition of the results into a complex structure (the NCR). This allows a concise representation of a very common idiom.

The LMatch operator can be matched against a tree that represents an XML generator, rather than the actual XML document. For example, The XML RDB Map can be interpreted as a generator of an XML document from a relational database. Matching the LMatch operator against an XML RDB Map is a fundamental step in converting the XML query into SQL.

The Construct Program of a query can be interpreted as a generator of an XML document from an NCR. Matching the LMatch operator against a Construct Program is a fundamental step in composing views.

The algorithm for matching against tree-structured XML generators is very similar to the algorithm for matching against XML input directly. One difference is that where matching against an XML document generates tuples of output, matching against a generator generally produces a Correspondence Tree, which encodes all the potential correspondence points between the nodes of the generator and the navigation steps of the LMatch.

An XML generator is a tree (actually, a forest suffices) where the nodes in the tree represent the generation of XML elements or attributes or their values, and arcs between nodes represent inclusion. For example:

element("person")—attribute("ssn")—value( )
—element("name")—value( )
—element("address")—value( )

The XML generator also indicates the arity of each arc. The values for arity are optional (0 or 1), singular (exactly one) and multiple (0 or more). If an arc is marked multiple, then the generator can generate more than one instance of the child node for each parent instance. In the above example, if the arc between "person" and "name" were marked multiple, then a person could have zero or more names. The arity of an arc is indicated by a subscript on the arc as shown in the following:

element("person")—$_S$attribute("ssn")—value( )
—$_M$element("name")—value( )
—$_O$element("address")—value( )

When no arity is indicated, singular is assumed. If it is not possible to derive arity information from the generator, then multiple is assumed, since it is the most general case.

Figure 19:
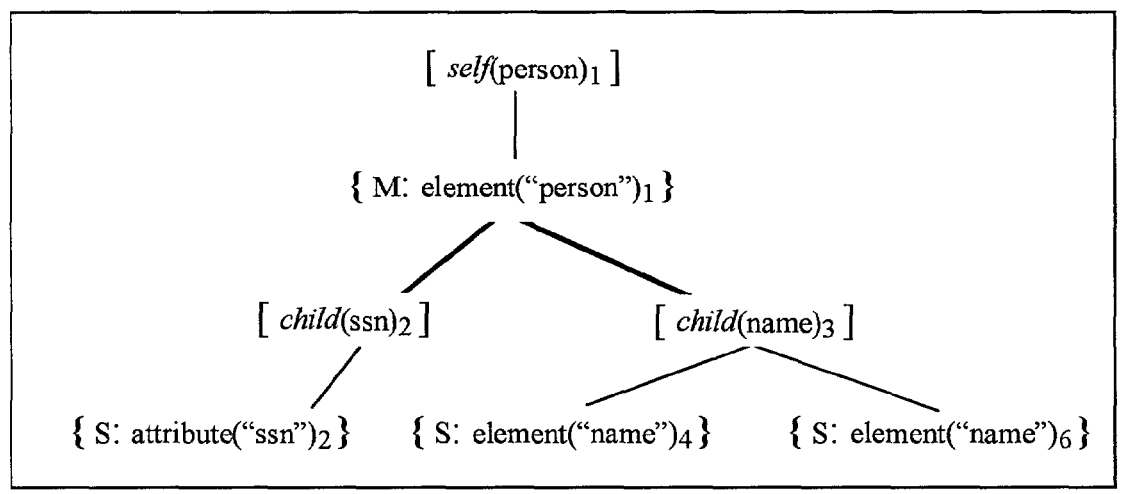
FIG. 19 illustrates the Correspondence Tree.

The Correspondence Tree tracks which navigation steps in the LMatch operator correspond with which nodes in the XML generator. The Correspondence Tree would be isomorphic to the LMatch navigation graph except for one thing: any given navigation step might match against multiple nodes in the generator. The following is an example of an XML generator, an LMatch operator, and the corresponding Correspondence Tree:

The XML generator:
element("person")$_1$—attribute("ssn")$_2$—value( )$_3$
—element("name")$_4$—value( )$_5$
—element("name")$_6$—value( )$_7$ The LMatch:
self(person)$_1$—child(ssn)$_2$
—child(name)$_3$ FIG. 19 illustrates the Correspondence Tree.

The subscripts on nodes in the generator and LMatch distinguish otherwise identical nodes when they appear in the Correspondence Tree. The Correspondence Tree is "read" as: "The root navigation has a single match, namely the element ("person")$_1$ node of the XML generator. From this generator node, the next LMatch navigation, child(name)$_3$, is matched against two different generator nodes, and so on.

The Correspondence Tree is a bipartite graph. A bipartite graph is one in which nodes come in two different alternating types. In this case, the node types are called navigation nodes (which reference navigation steps, and are pictorially indicated with brackets [ ]) and choice nodes (which reference generator nodes, and are pictorially indicated with braces { } ). A bipartite graph is interpreted as having two different kinds of arcs, which are indicated by lines of different weights: light lines are choice arcs (arcs from navigation to choice nodes, choosing amongst multiple correspondences) and heavy lines are navigation arcs (arcs from choice to navigation nodes, following the navigation relationships in the LMatch operator).

A correspondence is a (navigation step, generator node) pair of a correpondence tree. A correspondence is derived from a choice node by including the navigation step from the parent. For example, the following subgraph of a correspondence tree yields the following correspondence:

subtree: [child(name)$_3$]—{S: element("name")$_4$}
correspondence: {child(name)$_3$, element("name")$_4$}

The following matching algorithm generates the Correspondence Tree, given an LMatch operator and an XML generator as input. The algorithm is a top-down recursion over the LMatch navigation graph.

The XML generator has the following operations:

```
XMLGenerator.root() → ordered list of GeneGeneratorNode
GeneratorNode.type() → { "element" | "attribute" | "value" }
GeneratorNode.name() → GName
GeneratorNode.genChildren() → list of GeneratorNode
GeneratorNode.arity(childNode) → { "S" | "M" | "O" }
```

In this example, the LMatch operator is limited to the following navigation types: root, child, self. The nested flag on LMatch navigation steps is irrelevant to matching. The LMatch operator provides the following pseudo code for accessing the match expression:

```
LMatch.root() → NavStep
NavStep.type() → { "root" | "child" | "self" }
NavStep.ea() → { "element" | "attribute" | "either" }
NavStep.name() → NName
NavStep.navChildren() → list of NavStep
NavStep.optional() → boolean
```

There is also a function, nameMatch(GName, NName)→ boolean, that returns true or false as the name from a generator node matches the name of an LMatch navigation. The Correspondence Tree provides the following operations:

```
CorrespondenceTree.root() → NavigationNode
CorrespondenceTree.createRoot( NavStep )
NavigationNode.new( NavStep )
NavigationNode.navStep() → NavStep
  // Model .navStep() . type ()
NavigationNode.type() → { "root" | "child" | "self" }
  // And .navStep () .name ()
NavigationNode.name () → NName
```

-continued

```
NavigationNode.choiceChildren() → list of ChoiceNode
NavigationNode.addChoiceChild( ChoiceNode )
ChoiceNode.new( GeneratorNode, arity )
ChoiceNode.generatorNode() → GeneratorNode
ChoiceNode.type() → { "element" | "attribute" | "value" } // ditto
ChoiceNode.name() → GName    // ditto
ChoiceNode.arity() → { "S" | "M" | "O" }    // ditto
ChoiceNode.navChildren() → list of NavigationNode
ChoiceNode.addNavChild( NavigationNode )
```

The following illustrates the BuildCorrespondence function that is invoked to build a Correspondence Tree for an XML generator and an LMatch operator:

```
// Assume a rooted LMatch match expression;
// normalize the LMatch to make this true if necessary.
BuildCorrespondence( XMLGenerator g, LMatch lm )
{
    // create the correspondence tree
    ct ← new CorrespondenceTree
    nn ← new NavigationNode( lm.root() )
    // bootstrap the first level of expansion,
    // matching root against roots
    ct.addRoot( nn )
    foreach( gn in g.getRoot() ) {
        cn ← new ChoiceNode( gn, "M" )
        if ( addNavs( nn, cn ) )
            nn←addChoiceChild( cn )
    {
    return ct
{
```

The form of the algorithm is mutual recursion between two functions, each of which extends the graph by one level, or fails to do so (because there is no match). The subroutines return boolean values indicating whether or not they were successful; this value is then used to determine whether or not to continue and whether or not to actually add nodes to the graph. The following is the pseudo code for the addNavs function:

```
// From a given corresponding navigation and choice node pair,
// extend the choice node for each child navigation of the
// navstep.
boolean addNavs ( NavNode nn, ChoiceNode cn )
{
    foreach ( step in nn.navStep() .navChildren() ) {
        stepnavnode ← new NavigationNode( step )
        success ← addChoices( cn, stepnavnode )
        // if a navigation is optional, we include the navNode,
        // even if it failed (the navNode will have no choice children)
        if ( success || step.optional() )
            cn←addNavChild( stepnavnode )
        else // failure of a required navigation; abort
            return false
    {
    // if no required navigation failed, return true
    return true
{
```

The following is the pseudo code for the addChoices function:

```
// Given a location in the generator and a requested
// navigation, "follow" the navigation in the generator tree,
// finding a new layer of correspondences.
```

-continued

```
boolean addChoices( ChoiceNode cn, NavNode nn )
{
    success ← false
    foreach( gn in follow( cn.generatorNode(), nn.navStep() ) {
        choicenode ← new ChoiceNode( gn,
            cn.generatorNode() .arity(gn) )
        thissuccess ← addNavs( nn, choicenode )
        if ( thissuccess ) {
            nn←addChoiceChild( choicenode )
            success ← true
            {
        {
    // return true if at least one choice worked out
    return success;
    {
```

The following is the pseudo code for the follow function:

```
// Implement the actual navigation; this would be extended
// with more types of navigation as the LMatch is extended
// (and would probably require the generator to support more
// powerful navigations as well, at least parent()).
List<GeneratorNode> follow( GeneratorNode gn, NavStep nav )
{
    List<GeneratorNOde> result ← ();
    switch( nav.type() ) {
    case "self" :
        if ( nameMatch( gn.name(), nav.name() )
            result.add( gn )
    case "child" :
        foreach ( gnkid in gn.genChildren() )
            if ( (nav.ea() == "element" || nav.ea() == "either")
                && gnkid.type() == "element"
                && nameMatch( gn.name(), nav.name() ) ) {
                result.add( gn )
            else if ( (nav.ea() == "attribute" || nav.ea() == "either")
                && gnkid.type() == "attribute"
                && nameMatch( gn.name(), nav.name() ) ) {
                result.add( gn )
    case "root" :
        foreach ( r in xmlGenerator.root() ) // [1]
            if ( namematch( r.name(), nav.name() )
                result.add( r )
        {
    return result
{
```

The BuildCorrespondence algorithm presented above does not match against actual XML data. However, an XML document may be considered a degenerate XML generators with singular-arity arcs and constant value nodes and and NCR is built rather than a Correspondence Tree. The relationship between a Correspondence Tree and an NCR is as follows:

The values for any particular navigation are the concatenation of the values for each choice below that navigation; the result is a list of data.

For nested navigations, the rows of the nested table are that list of data.

For an unnested navigation that is at most singular, then the list of data can contain only 0 or 1 rows. In this case, the NCR column is essentially a field that is filled in the by value.

In general for unnested navigations, the list of data is "joined against" the existing rows of the containing table. If the navigation is optional, the join is an outer join, if required, an inner join. If the list has multiple entries, the effect is a cross product against the other contents of the table.

Because navigations can result in failure that propagates recursively upwards, matches to the leaves are evaluated before committing to any results. Alternatively, the LMatch operation could contain only optional navigations or only required navigations in cases where the data will be present. Similarly, it is possible to eliminate the need to handle joins or cross products by limiting the LMatch operator to only allow unnested navigations when the data is at most singular.

Two type of normalization that can be performed on LMatch operators are removal of (non-root) self navigations and removal of implicit cross-products. The normalized LMatch operator would consist only of a single root self navigation and following child navigations, where for each child navigation, nested=true. Alternatively, the normalization could cover either (nested=true) or (nested=false and optional=false and the child is known to exist in a strict 1:1 relationship with the parent). Additional normalizations, such as requiring optional=true on all nested child steps, may also possible.

To normalize the LMatch operator, additional operators are inserted to the Logical Extract Program to compensate for the changes to the LMatch operator. These logical operators include the LSelect, LFlatten, and LBox operators. The LSelect operator removes tuples from a table based on some condition. The LFlatten operator flattens a nested table within an NCR. The operator is applied to a single nested table, and the process of flattening removes that table. The LFlatten operator has a boolean parameter "outer" indicating whether the flattening operation should behave like an inner or left outer join—that is, if the nested table is empty, does flattening remove the containing row or not. The LBox operator serves to introduce an artificial level of nesting within a table.

A singular relationship between a child navigation and its parent navigation is identified by examining the XML schema of the data that the LMatch operates against. Initially, the matching algorithm has been run. After that, it can be determined, for each navigation step, which place(s) in the schema the LMatch operator could match. From that information, and from the cardinality information available in the schema, it can be identified whether the singular condition holds.

The first version of the algorithm generates an LMatch that contains a single, top-level self navigation and otherwise contains only child navigations. All navigations (including the self at the top) have nested=true. The resulting navigations may have optional=true or optional=false. The implementation can be styled in a bottom-up or top-down traversal, but note that in either case compensating operators are to be inserted at both the bottom and top of the chain.

The table below illustrates the various cases that can arise. The right-hand column has examples of the transformations. Here is a sample XML document this can be tested against:

```
<a>a1<b>b1</b>
    <c>c1<d>d1</d></c></a>
<a>a2<b>b1</b><b>b2</b>
    <c>c1<d>d1</d></c>
    <c>c2<d>d2</d></c></a>
<a>a3
    <c>c1<d>d1</d></c>
<c>c2<d>d2</d><d>d3</d></c></a>
<a>a4<b>b1</b></a>
```

FIGS. 20–25 illustrate normalization.

Figure 20:
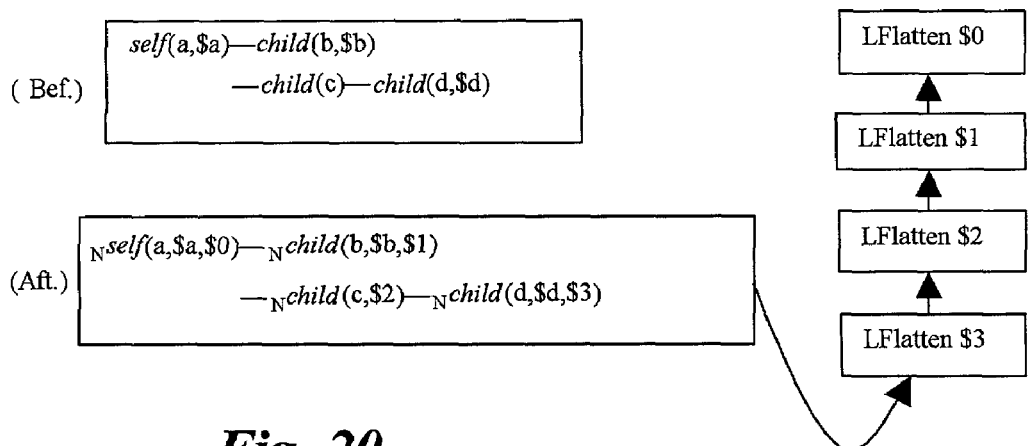
FIGS. 20-25 illustrate normalization.
Figure 21:
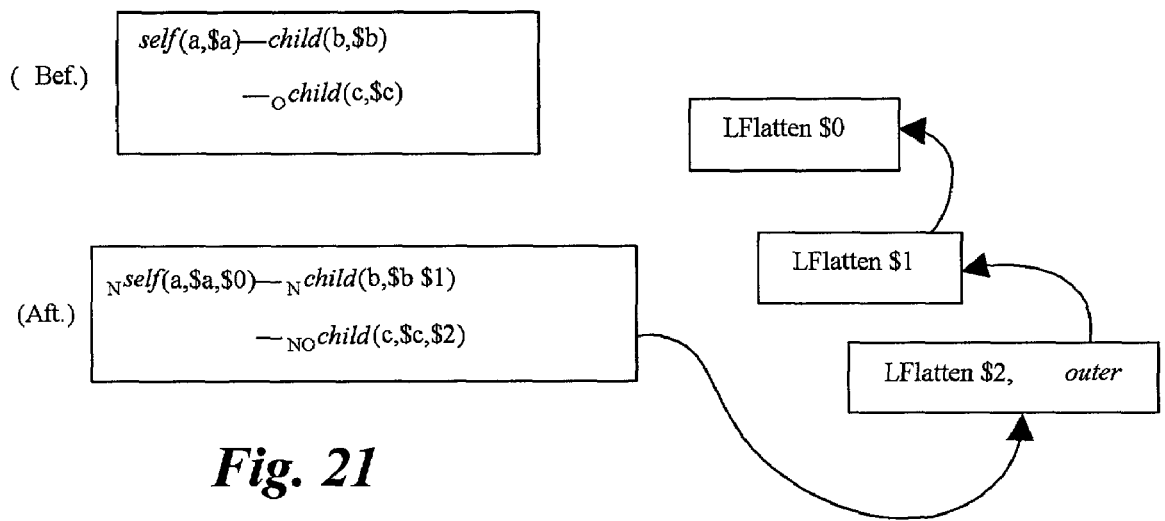
Figure 22:
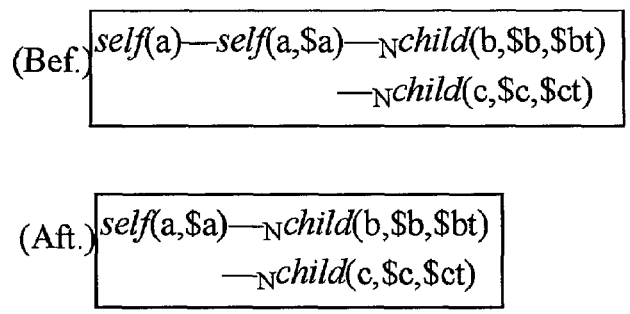
Figure 23:
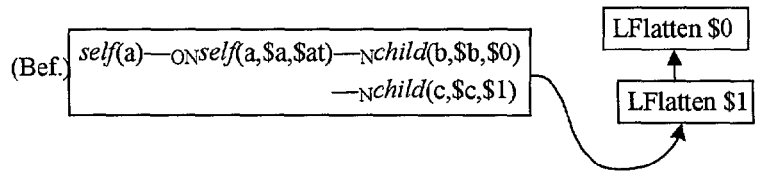
Figure 23:
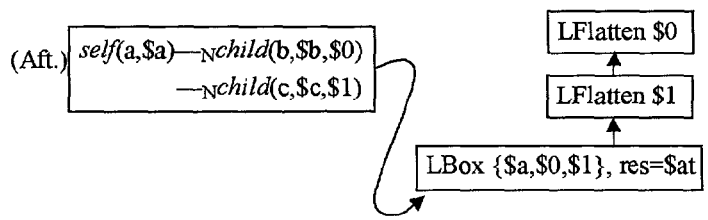
Figure 24:
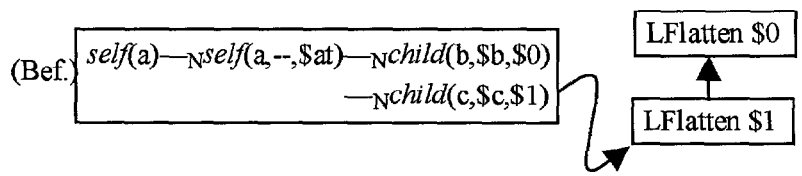

| | |
|---|---|
| If the step is the root self step of the navigation tree, and has nested = false, treat it the same way as a child step with nested = false (see below). | FIG. 20 |
| If the step is a child step with nested = true, do nothing. | |
| If the step is a child step with nested = false, set nested = true, | FIG. 20 |

-continued

FIGS. 20–25 illustrate normalization.

| | |
|---|---|
| autogenerate a table column for the new nested table, and add an LFlatten operator to compensate. The LFlatten target is set to the nested table that this step generates. | |
| If the child step has optional = true, the LFlatten must be an "outer" LFlatten. | FIG. 21 |
| If the step is a self step with optional = false, and nested = false, remove the step, migrating the children of the self step to the parent. If the self step had columns on anything, add those columns to the parent step. If one of the migrated columns is a duplicate of an existing column of the parent step, use renaming to remove one of the columns from the entire LEP. | FIG. 22 |
| If the step is a self step with optional = true and nested = true, remove the step, migrating the children of the self step to the parent. If the self step had columns on anything other than its table column, add those columns to the parent step, unless it would clash with an existing column on the parent step. In that case, add an LDup operator to make a new copy of the self step's column. Determine the total set of columns that 'belong to' the self step (including the result of the LDup, if any), and insert an LBox operator to nest those columns, giving the result the original table name from the omitted self. The LBox operator is inserted after the LDup, if there is one, but before all other steps. | FIG. 23 |
| If the step is a self step with optional = false and nested = true, proceed as in the case above. Then add an LSlelect operator to test for emptiness of nested table created by the LBox. Unlike other operator additions, this LSelect operator must be added to the end of the chain of operators that have been added, so that it operates only after any flattenings have been done at deeper levels of nesting. | FIG. 24 |
| If the step is a self step with optional = true and nested = false, proceed as in the case above, except instead of an LSelect step at the end, insert an LFlatten with outer = true. | |

Figure 25:
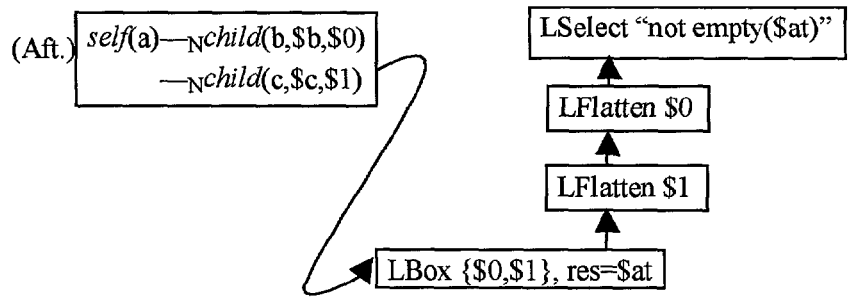
Figure 25:
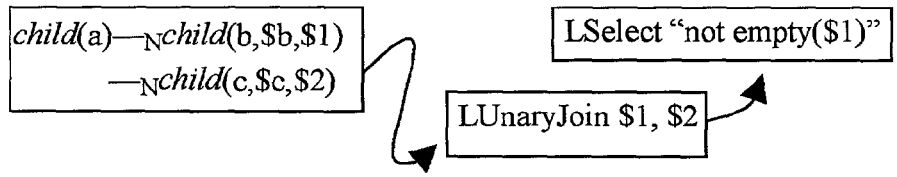

In one embodiment, the following optimization may be applied. If an LBox is followed by the flattening of all its columns, the nested tables can be joined with a sequence of LJoin operators (as cross products) instead. This optimization could be performed either during this algorithm, or as a post-processing step. To illustrate, the last example above could be rewritten as shown in FIG. 25.

Alternatively, the normalization can be modified to state that only nested=true are added to child steps that can have multiple (or, possibly, optional) values. This normalization is may be easier for inputs to create NCR' in which 1:1 elements are listed as flat columns of a row; any nesting on these columns may need to be added by an explicit LBox operator. In the case of a child step that has nested=false, and the step has been marked as singular without changing the value of the nested flag and without adding an LFlatten operation. The other steps do not change; in particular elision of a self step in the general case may result in adding an LBox, possibly followed by a LSelect or LFlatten operation. However, if all child navigations of a self navigation are singular, then the LBox and corresponding LFlatten can be omitted. The corresponding LSelect needs to be changed to a test on the NULL-ness of the columns, rather than a test on the emptiness of a nested table. This condition can be detected in a post-processing step, but it would require information from both the LMatch (the singularity of steps) and correlated information from the logical extraction program (the presence of LBox and LFlatten/LSelect); thus, this optimization may be implemented as an integral part of the recursive algorithm.

Nested Conditional Relations (NCR) Model and Algebra

NCR extends relational algebra in two ways. First, it makes relations *heterogeneous* (*i.e.*, allows them to contain records of different types). Each record is accompanied by a tag, describing its type, hence the term *conditional relation*. Second, relations can be nested. The value of an attribute can be either atomic (*e.g.*, int, float, string) or another NCR.

1.1 Relational Algebra

Traditional relational data models have tables that are homogeneous and flat and selection and projection operators select a subset of rows and fields in a table. A homogenous table is one that has rows of the same type. A flat table has atomic fields, that is fields in the first normal form. The following table is a traditional relational data model.

Depts

| Name | ID | Phone | Floor |
|---|---|---|---|
| Payroll | P | 2345 | 3 |
| Payroll-Temps | P2 | 2244 | 1 |
| Payroll-NJ | P3 | 2345 | 4 |
| Engineering | E | 7654 | 6 |
| ReEngineering | E2 | 2244 | 3 |
| Marketing-US | MU | 1818 | 4 |
| Marketing-Europe | ME | 9876 | 2 |

Each row in the table is a record of the same type:

[Name : string, ID : string, Phone : int, Floor : int]

Each field in the row is an atomic type. The table is a *set* of such rows. Its type is:

Depts: {[Name : string, ID : string, Phone : int, Floor : int]}

The following selection operation ($\sigma$):

$\sigma_{Floor>3}$ (Depts)

results in a subset of the original table, consisting of the highlighted rows below:

| Name | ID | Phone | Floor |
|---|---|---|---|
| Payroll | P | 2345 | 3 |
| Payroll-Temps | P2 | 2244 | 1 |
| Payroll-NJ | P3 | 2345 | 4 |
| Engineering | E | 7654 | 6 |
| ReEngineering | E2 | 2244 | 3 |
| Marketing-US | MU | 1818 | 4 |
| Marketing-Europe | ME | 9876 | 2 |

The following projection operation ($\Pi$):

$\Pi_{Name, Phone}$ ($\sigma_{Floor>3}$ (Depts))

results in a subset of the original table, consisting of the highlighted rows below:

| Name | ID | Phone | Floor |
|---|---|---|---|
| Payroll | P | 2345 | 3 |
| Payroll-Temps | P2 | 2244 | 1 |
| Payroll-NJ | P3 | 2345 | 4 |
| Engineering | E | 7654 | 6 |
| ReEngineering | E2 | 2244 | 3 |
| Marketing-US | MU | 1818 | 4 |
| Marketing-Europe | ME | 9876 | 2 |

The *Nested Conditional Relation* model (NCRs) has tables that are heterogeneous and nested and have generalized version of selection and projection the select a subset of the fields.

1.2 Conditional Relations

A heterogeneous collection, or *conditional relation* is a relation which may have rows of different types. The Dept and Persons persons tables below are of the traditional relational model.

Depts

| Name | ID | Phone | Floor |
|---|---|---|---|
| Payroll | P | 2345 | 3 |
| Payroll-Temps | P2 | 2244 | 1 |
| Payroll-NJ | P3 | 2345 | 4 |
| Engineering | E | 7654 | 6 |
| ReEngineering | E2 | 2244 | 3 |
| Marketing-US | MU | 1818 | 4 |
| Marketing-Europe | ME | 9876 | 2 |

Persons

| SSN | Name | Salary |
|---|---|---|
| 123456789 | Smith | 44444 |
| 234567890 | John | 55555 |
| 111111111 | Sue | 66666 |

A heterogeneous table consisting of departments and persons is obtained by interleaving the rows of the Depts and Persons tables as shown below:

DepartmentsPersons

| | Name | ID | Phone | Floor |
|---|---|---|---|---|
| Dept: | Payroll | P | 2345 | 3 |
| | Name | ID | Phone | Floor |
| Dept: | Payroll-Temps | P2 | 2244 | 1 |
| | SSN | Name | Salary | |
| Pers: | 123456789 | Smith | 44444 | |
| | SSN | Name | Salary | |
| Pers: | 234567890 | John | 55555 | |
| | Name | ID | Phone | Floor |
| Dept: | Payroll-NJ | P3 | 2345 | 4 |
| | Name | ID | Phone | Floor |
| Dept: | Engineering | E | 7654 | 6 |
| | SSN | Name | Salary | |
| Pers: | 111111111 | Sue | 66666 | |
| | Name | ID | Phone | Floor |
| Dept: | ReEngineering | E2 | 2244 | 3 |
| | Name | ID | Phone | Floor |
| Dept: | Marketing-US | MU | 1818 | 4 |
| | Name | ID | Phone | Floor |
| Dept: | Marketing-Europe | ME | 9876 | 2 |

The Departments rows have four fields and the Persons rows have only three fields. To represent such a table, a *tag* is added to each row. The value of the tag can be either Dept or Pers. Each row has a structure that depends on this tag. The type of such a row is called a *tagged union type*, and is denoted as:

<Dept: [Name : string, ID : string, Phone : int, Floor : int] |
  Pers: [SSN : int, Name: string, Salary: int]>

A value of this type is either a record of type [Name : string, ID : string, Phone : int, Floor : int] preceded by the tag Dept, or a record of type [SSN : int, Name: string, Salary: int] preceded by a tag Pers.

The type of the entire table DepartmentsPersons is a set of a tagged union type:

DepartmentsPersons: {<Dept: [Name : string, ID : string, Phone : int, Floor : int] |
  Pers: [SSN : int, Name: string, Salary: int]>}

The following selection operator selects rows with all departments above the 3$^{rd}$ floor:

$\sigma$ $_{<Dept/(Floor>3)>}$ (DepartmentsPersons)

The "Dept" tag in the condition (*i.e.*, "Dept/(Floor>3)") indicates to select rows with a Dept tag. The "Floor>3" indicates to select rows that have Floor>3. All rows that do not have the Dept tag are selected intact. Thus, the type of the result is:

{<Dept: [Name : string, ID : string, Phone : int, Floor : int] |
  Pers: [SSN : int, Name: string, Salary: int]>}

The result is the highlighted rows as shown below:

| | | | | |
|---|---|---|---|---|
| Dept: | Name | ID | Phone | Floor |
| | Payroll | P | 2345 | 3 |
| Dept: | Name | ID | Phone | Floor |
| | Payroll-Temps | P2 | 2244 | 1 |
| Pers: | SSN | Name | Salary | |
| | 123456789 | Smith | 44444 | |
| Pers: | SSN | Name | Salary | |
| | 234567890 | John | 55555 | |
| Dept: | Name | ID | Phone | Floor |
| | Payroll-NJ | P3 | 2345 | 4 |
| Dept: | Name | ID | Phone | Floor |
| | Engineering | E | 7654 | 6 |
| Pers: | SSN | Name | Salary | |
| | 111111111 | Sue | 66666 | |
| Dept: | Name | ID | Phone | Floor |
| | ReEngineering | E2 | 2244 | 3 |
| Dept: | Name | ID | Phone | Floor |
| | Marketing-US | MU | 1818 | 4 |
| Dept: | Name | ID | Phone | Floor |
| | Marketing-Europe | ME | 9876 | 2 |

The following selection operation selects departments above the 3$^{rd}$ floor AND people earning more than 50000:

$\sigma$ <Dept/(Floor>3) | Pers/(Salary>50000)> (DepartmentsPersons)

The condition applies to both Dept rows and Pers rows. For Dept rows, the condition specifies Floor>3; for Pers rows, the condition specifies Salary>50000. The result consists of the highlighted rows below:

DepartmentsPersons

| | | | | |
|---|---|---|---|---|
| Dept: | Name | ID | Phone | Floor |
| | Payroll | P | 2345 | 3 |
| Dept: | Name | ID | Phone | Floor |
| | Payroll-Temps | P2 | 2244 | 1 |
| Pers: | SSN | Name | | Salary |
| | 123456789 | Smith | | 44444 |
| Pers: | SSN | Name | | Salary |
| | 234567890 | John | | 55555 |
| Dept: | Name | ID | Phone | Floor |
| | Payroll-NJ | P3 | 2345 | 4 |
| Dept: | Name | ID | Phone | Floor |
| | Engineering | E | 7654 | 6 |
| Pers: | SSN | Name | | Salary |
| | 111111111 | Sue | | 66666 |
| Dept: | Name | ID | Phone | Floor |
| | ReEngineering | E2 | 2244 | 3 |
| Dept: | Name | ID | Phone | Floor |
| | Marketing-US | MU | 1818 | 4 |
| Dept: | Name | ID | Phone | Floor |
| | Marketing-Europe | ME | 9876 | 2 |

The same result can be achieved by applying the two selections in sequence, that is:

$$\sigma_{<Dept/(Floor>3) \mid Pers/(Salary>50000)>}(\textbf{DepartmentsPersons}) =$$
$$= \sigma_{<Dept/(Floor>3)>}(\sigma_{<Pers/(Salary>50000)>}(\textbf{DepartmentsPersons}))$$
$$= \sigma_{<Pers/(Salary>50000)>}(\sigma_{<Dept/(Floor>3)>}(\textbf{DepartmentsPersons}))$$

The following projection operation projects out the Name and Phone fields for the Dept rows and the Name field for the Pers rows:

$$\Pi_{<Dept:[Name,Phone] \mid Pers:[Name]>}(\sigma_{<Dept/(Floor>3) \mid Pers/(Salary>50000)>}(\textbf{DepartmentsPersons}))$$

The type of the result is:

{<Dept: [Name : string, Phone : int] | Pers: [Name: string]>}

The results consist of the highlighted fields below:

DepartmentsPersons

| | | | | |
|---|---|---|---|---|
| Dept: | Name | ID | Phone | Floor |
| | Payroll | P | 2345 | 3 |
| Dept: | Name | ID | Phone | Floor |
| | Payroll-Temps | P2 | 2244 | 1 |
| Pers: | SSN | Name | Salary | |
| | 123456789 | Smith | 44444 | |
| Pers: | SSN | Name | Salary | |
| | 234567890 | John | 55555 | |
| Dept: | Name | ID | Phone | Floor |
| | Payroll-NJ | P3 | 2345 | 4 |
| Dept: | Name | ID | Phone | Floor |
| | Engineering | E | 7654 | 6 |
| Pers: | SSN | Name | Salary | |
| | 111111111 | Sue | 66666 | |
| Dept: | Name | ID | Phone | Floor |
| | ReEngineering | E2 | 2244 | 3 |
| Dept: | Name | ID | Phone | Floor |
| | Marketing-US | MU | 1818 | 4 |
| Dept: | Name | ID | Phone | Floor |
| | Marketing-Europe | ME | 9876 | 2 |

If only a subset of the tags are mentioned in the projection operator, then all rows tagged with the other tags are left unchanged in the result. Thus, the expression above is equivalent to:

$\Pi_{<Dept:[Name,Phone] \mid Pers:[Name]>} (\sigma_{<Dept/(Floor>3) \mid Pers/(Salary>50000)>}(\text{DepartmentsPersons}))$ $= \Pi_{<Dept:[Name,Phone]>}(\Pi_{<Pers:[Name]>}(\sigma_{<Dept/(Floor>3)>}(\sigma_{<Pers/(Salary>50000)>}(\text{DepartmentsPersons}))))$ $= \Pi_{<Dept:[Name,Phone]>}(\sigma_{<Dept/(Floor>3)>}(\Pi_{<Pers:[Name]>}(\sigma_{<Pers/(Salary>50000)>}(\text{DepartmentsPersons}))))$

1.3 Nested Conditional Relations

The following table illustrates NCRs. The Pers rows have an Assignments field that is a non-atomic field. The field contains a nested condition relation in that its sub-rows can be of type Project or Committee.

DepartmentsPersons

| | Name | ID | Phone | Floor | | |
|---|---|---|---|---|---|---|
| Dept: | Payroll | P | 2345 | 3 | | |
| | *Name* | *ID* | *Phone* | *Floor* | | |
| Dept: | Payroll-Temps | P2 | 2244 | 1 | | |
| | *SSN* | *Name* | *Assignments* | | | |
| Pers: | 123456789 | Smith | Project: | *Name* | *Lang* | |
| | | | | Compiler | C++ | |
| | | | Project: | *Name* | *Lang* | |
| | | | | Optimizer | C++ | |
| | | | Committee: | *Name* | | |
| | | | | Awards | | |
| | | | Project: | *Name* | *Lang* | |
| | | | | Wrapper | Java | |
| | *SSN* | *Name* | *Assignments* | | | |
| Pers: | 234567890 | John | Project: | *Name* | *Lang* | |
| | | | | Compiler | C++ | |
| | | | Project: | *Name* | *Lang* | |
| | | | | Wrapper | C++ | |
| | | | Committee: | *Name* | | |
| | | | | Awards | | |
| | | | Committee: | *Name* | | |
| | | | | Promotion | | |
| | | | Committee: | *Name* | | |
| | | | | Disciplinary | | |
| | *Name* | *ID* | *Phone* | *Floor* | | |
| Dept: | Payroll-NJ | P3 | 2345 | 4 | | |
| | *Name* | *ID* | *Phone* | *Floor* | | |
| Dept: | Engineering | E | 7654 | 6 | | |
| | *SSN* | *Name* | *Assignments* | | | |
| Pers: | 111111111 | Sue | Project: | *Name* | *Lang* | |
| | | | | Compiler | Java | |
| | | | Project: | *Name* | *Lang* | |
| | | | | Optimizer | C++ | |
| | | | Committee: | *Name* | | |
| | | | | Promotions | | |
| | | | Project: | *Name* | *Lang* | |
| | | | | Wrapper | Java | |
| | *Name* | *ID* | *Phone* | *Floor* | | |
| Dept: | ReEngineering | E2 | 2244 | 3 | | |
| | *Name* | *ID* | *Phone* | *Floor* | | |
| Dept: | Marketing-US | MU | 1818 | 4 | | |
| | *Name* | *ID* | *Phone* | *Floor* | | |
| Dept: | Marketing-Europe | ME | 9876 | 2 | | |

The type of this table is:

{<Dept: [Name : string, ID : string, Phone : int, Floor : int] |
    Pers: [SSN : int, Name: string,
        Assignments: {<Project:[Name:string, Lang:string] |
            Committee: [Name: string]>}]>}

Rows tagged with Dept are flat records. The rows tagged with Pers have an Assignments field with its value as another NCR, with its rows tagged either with Project or with Committee. In this example, there is only one level of nesting, in general, however, there may be arbitrary levels.

The following projection operation select the Name and Phone fields of the Dept rows and the Name field of the Pers rows.

$\Pi_{<Dept\,[Name,Phone],Pers\,[Name]>}$ (DepartmentsPersons)

The result is a flat relation of type:

{<Dept: [Name : string, Phone : int] | Pers: [Name: string]>}

Projections and selections can be combined and applied to the inner relations. This is done with combined operator, called Combo, that does both the selection and the projection. A combo operator takes an argument p, called a *p-former*, that describes what selections and projections are to be done. The p-former generalizes both the argument in a selection, $\sigma_p$, and that in a projection $\Pi_p$. The following is an example of a p-former:

p = <Dept/(Floor>3):[Name,Floor] |
    Pers/(Name like "S%"):
        [Name, Assignments:{<Project/(Lang="C++"):[Name]|
            Committee/(Name="Promotions")[Name]>}]>

Then the combo operator is written as:
    $\Sigma_p$(DepartmentsPersons)
This combo operator applies the selection condition (Floor > 3) and projects on the Name and Floor fields for the Dept rows. The combo operator also selects on the condition (Name like "S%") then projects on Name and Assignments fields on the Pers row. Furthermore, this combo operator processes Assignments recursively as follows. This combo operator applies the selection condition (Lang = "C++") and projects on the Name on Project rows and selects on (Name = "Promotions") and projects on the Name field on Committee rows. The type of the result of this combo operator is:

{<Dept: [Name : string, Floor : int] |
    Pers: [Name: string, Assignments: {<Project:[Name:string] |
        Committee: [Name: string]>}]>}

The results of this combo operator is the highlighted fields below:

DepartmentsPersons

| | Name | ID | Phone | Floor | |
|---|---|---|---|---|---|
| Dept: | Payroll | P | 2345 | 3 | |

| | Name | ID | Phone | Floor | |
|---|---|---|---|---|---|
| Dept: | Payroll-Temps | P2 | 2244 | 1 | |

| | SSN | Name | Assignments | | | |
|---|---|---|---|---|---|---|
| Pers: | 123456789 | Smith | Project: | Name | Lang | |
| | | | | Compiler | C++ | |
| | | | Project: | Name | Lang | |
| | | | | Optimizer | C++ | |
| | | | Committee: | Name | | |
| | | | | Awards | | |
| | | | Project: | Name | Lang | |
| | | | | Wrapper | Java | |

| | SSN | Name | Assignments | | | |
|---|---|---|---|---|---|---|
| Pers: | 234567890 | John | Project: | Name | Lang | |
| | | | | Compiler | C++ | |
| | | | Project: | Name | Lang | |
| | | | | Wrapper | C++ | |
| | | | Committee: | Name | | |
| | | | | Awards | | |
| | | | Committee: | Name | | |
| | | | | Promotion | | |
| | | | Committee: | Name | | |
| | | | | Disciplinary | | |

| | Name | ID | Phone | Floor | |
|---|---|---|---|---|---|
| Dept: | Payroll-NJ | P3 | 2345 | 4 | |

| | Name | ID | Phone | Floor | |
|---|---|---|---|---|---|
| Dept: | Engineering | E | 7654 | 6 | |

| | SSN | Name | Assignments | | | |
|---|---|---|---|---|---|---|
| Pers: | 111111111 | Sue | Project: | Name | Lang | |
| | | | | Compiler | Java | |
| | | | Project: | Name | Lang | |
| | | | | Optimizer | C++ | |
| | | | Committee: | Name | | |
| | | | | Promotions | | |
| | | | Project: | Name | Lang | |
| | | | | Wrapper | Java | |

| | Name | ID | Phone | Floor | |
|---|---|---|---|---|---|
| Dept: | ReEngineering | E2 | 2244 | 3 | |

| | Name | ID | Phone | Floor | |
|---|---|---|---|---|---|
| Dept: | Marketing-US | MU | 1818 | 4 | |

| | Name | ID | Phone | Floor | |
|---|---|---|---|---|---|
| Dept: | Marketing-Europe | ME | 9876 | 2 | |

The Combo operator selects a submatrix via a combination of selections (on tags and predicates) and projections (on fields).

2 Operands and Typing

An NCR is *strongly typed* which will allow type inference and type checking. The basic manipulable types are tables and single-valued attributes. The basic types are primitives or sets which are defined as:

*Base or primitive types:*
        b ::= integer | long integer | string | float | decimal[precision.accuracy] | ...

*Manipulable types:*
    t ::= b          *Member of base type*
    t ::= {u}                                  *Set (table) of tuples from "union type"*

Record (*i.e.*, row), variant, and union types are defined as:

*Record type:*
        r ::= [$a_1$: $t_1$, $a_2$: $t_2$, ..., $a_n$: $t_n$]
where $a_1$, $a_2$ ... $a_n$ are distinct labels called *attributes*, or *fields*, or just *labels*.

*Variant type:*
        v ::= tag:r
where tag is a label, called the *tag of the variant type*.

*Union type:*
        u ::= <$v_1$ | $v_2$ | ... | $v_n$>
where $v_1$, $v_2$, ..., $v_n$ are variant types having distinct tags.

In the following example, a table is defined that includes both People(name:String, ssn:int) rows and Employees(name:String, ssn:int, salary: float) rows. The record types for People and Employees are defined as follows:

$r_{people}$     ::= [name: String, ssn:int]
    $r_{employees}$   ::= [name: String, ssn:int, salary:float]

The variants are defined as:

$v_{people}$ ::=People: [name:String, ssn:int]
    $v_{employees}$ ::= Employees: [name:String, ssn:int, salary:float]

and the union type is:

$u_{peopleEmployee}$ ::=<People:[name:String,ssn:int] |
                        Employees:[name:String,ssn:int,salary:float]>

The NCR type describing a table consisting of both people and employees is:

$t_{people|employees} ::= \{<$People$:$ [name:String, ssn:int] $|$
            Employees: [name:String, ssn:int, salary:float]$>\}$

Operators

A formal algebra using these types is defined using the following general principles.

- Each operator should support tables with heterogeneous rows (*i.e.*, a table of union types).
- A different action can be specified for an operator for each unique row type.
- Operators focus on the common case and a generalized map operator handles complex cases.

2.1 Project

The Project operator returns a different subset of the attributes from each variant type. The project operator, denoted $\Pi_p$, is parameterized by a list, p, of elements of the form tag:[set of attributes]. "P" is called a *projection p-former*. It determines both the type of the project operator and its semantics (which columns are being projected out).

Defn. projection p-former:

Given a union type with $u = <tag_1: t_1| \ldots |tag_m: t_n>$, where $t_1 = [a_{11}: t_{11}, a_{12}: t_{12},\ldots,a_{1n_1}: t_{1n_1}]$, $\ldots$, $t_n = [a_{m1}: t_{m1}, a_{m2}: t_{m2},\ldots,a_{mn_m}: t_{mn_m}]$, a projection p-former with input u is an expression:

$$p = <tag_{i_1}[a_{1i_{11}}, a_{1i_{12}},\ldots,a_{1i_{1p_1}}], tag_{i_2}[a_{2i_{21}}, a_{2i_{22}},\ldots,a_{2i_{2p_2}}], \ldots, tag_{i_q}[a_{qi_{q1}}, a_{qi_{q2}},\ldots,a_{qi_{qp_q}}]>$$

where the indexes satisfy:
$\quad 1 \leq i_1 < i_2 < \ldots < i_q \leq m,$
$\quad 1 \leq i_{11} < i_{12} < \ldots < i_{1p_1} \leq n_{i_1}$
$\quad \ldots$
$\quad 1 \leq i_{q1} < i_{q2} < \ldots < i_{qp_q} \leq n_{i_q}$ The "type" of the projection p-former is:
$\quad p :: u \to u'$
where u' is defined as follows. Let $t_j'$, $j=1,\ldots,m$ be:

$t'_{i_1} = [a_{1i_{11}}: t_{1i_{11}}, a_{1i_{12}}: t_{1i_{12}},\ldots,a_{1i_{1p_1}}: t_{1i_{1p_1}}]$ $\ldots$ $t'_{i_q} = [a_{qi_{q1}}: t_{qi_{q1}}, a_{qi_{q2}}: t_{qi_{q2}},\ldots,a_{qi_{qp_q}}: t_{qi_{qp_q}}]$ $t'_j = t_j$, when $j \notin \{i_1,...,i_q\}$ The output type is $u' = <tag_1: t'_1| \ ... \ |tag_m: t'_n>$.

Defn. Project Operator:

Let p, u, u' be as above, and let $t=\{u\}$, $t'=\{u'\}$. The projection operator is:

$\Pi_p(t) = t'$

The project operator only affects tuples with tags that are mentioned in p. Tuples with other tags are simply copied to the output, unaffected. The following table shows the results of applying a project operator. The input table is an EmpsDeptsSites NCR with Emp, Dept, and Site tags.

| | name | ssn | sal | phone |
|---|---|---|---|---|
| Emp: | Bob | 123-45-6789 | 83000 | 123-4567 |
| Dept: | name | loc | mgr | |
| | Payroll | HQ | Bob | |
| Emp: | name | ssn | sal | phone |
| | Marilyn | 321-54-9876 | 78000 | 487-0128 |
| Site: | name | city | | |
| | HQ | San Jose | | |
| Emp: | name | ssn | sal | phone |
| | Qing | 673-82-3845 | 39000 | 674-3834 |
| Dept: | name | loc | mgr | |
| | Quality Ctrl | HQ | Marilyn | |
| Emp: | name | ssn | sal | phone |
| | Betsy | 233-23-6352 | 75000 | 234-3473 |
| Emp: | name | ssn | sal | phone |
| | Brian | 341-69-0323 | 33000 | 236-5325 |
| Dept: | name | loc | mgr | |
| | Sales | HQ | Betsy | |
| Emp: | name | ssn | sal | phone |
| | Sam | 356-02-6743 | 43000 | 672-7832 |

The following projection operator is applied to the EmpsDeptsSites table:

$\Pi_{<Emp:[name] | Dept:[name,mgr] | Site:[name,city]>}$(EmpsDeptsSites)

The result is the following table:

Emp: 
| name |
|---|
| Bob |

Dept:
| name | mgr |
|---|---|
| Payroll | Bob |

Emp:
| name |
|---|
| Marilyn |

Site:
| name | city |
|---|---|
| HQ | San Jose |

Emp:
| name |
|---|
| Qing |

Dept:
| name | mgr |
|---|---|
| Quality Ctrl | Marilyn |

Emp:
| name |
|---|
| Betsy |

Emp:
| name |
|---|
| Brian |

Dept:
| name | mgr |
|---|---|
| Sales | Betsy |

Emp:
| name |
|---|
| Sam |

The project operator is equivalent to $\Pi_{<Emp:[name] | Dept:[name,mgr]>}$(EmpsDeptsSites). The Site records are included in the result by default.

2.2 Select

The Select operator returns a different subset of records for each variant type. The select operator, denoted $\sigma_p$, is parameterized by a list, p, of elements of the form tag/condition. "P" is called a *selection p-former*. It determines both the type of the select operator and its semantics. In the following, conditions and expressions are defined.

Defn. Expressions:

Given k record types $r_1, \ldots, r_k$, and a type t, an expression e of type t with arguments $r_1, \ldots, r_k$, in notation:

$$e : r_1 \times \ldots \times r_k \to t$$

is defined inductively below. Expressions occur in a *context*, which is defined to be a sequence of record types, $(r_1', r_2', \ldots, r_n')$; unless specified, the context is empty, n=0.

1. Attribute: if $r_i = [\ldots, a : t, \ldots]$, then \$i.a is an expression of type t.
2. Context: if $r_j' = [\ldots, a : t, \ldots]$, then \$[j].a is an expression of type t.
3. Scalar operator: if $e_1, e_2$ are two expressions of base types $b_1, b_2$ respectively, then $e_1$ op $e_2$ is an expression of type b, where op is an operator:

$$op : b_1 \times b_2 \to b$$

op is one of (+, -, *, /), or a string operator (concat, substr), or any user-defined function on scalar values.

4. NCR expression: if $e_1, e_2, \ldots$ are expressions of types $t_1, t_2, \ldots$, then $f(e_1, e_2, \ldots)$ is an expression of type $t$, where $f$ is an NCR expression $f: t_1 \times t_2 \times \ldots \to t$.

When $k=1$, then only $\$1$ can occur (*i.e.*, not $\$2, \$3, \ldots$) and $\$1.a$ is abbreviated with $a$.

Contexts are not used in selections, but are used later in the combo operator.

Defn. Conditions (predicates) on records:

Given $k$ record types $r_1, \ldots, r_k$, a condition with arguments $r_1, \ldots, r_k$, in notation:

$c : r_1 \times \ldots \times r_k \to$ bool is defined inductively as follows:
1. if $e_1, e_2$ are expressions of base types $b_1, b_2$ respectively, both with arguments $r_1, \ldots, r_k$, then $e_1$ oprel $e_2$ is a condition with arguments $r_1, \ldots, r_k$, where oprel is $<, <=, >, >=$ or string operations such as substr, prefix, suffix, like, etc.
2. if $e$ is an expression of type $\{<\ldots | \text{tag}:[a_1:t_1,\ldots,a_n:t_n] | \ldots>\}$ and $e_1, \ldots, e_n$ are expressions of types $t_1, \ldots, t_n$ respectively, then:

$<\text{tag}:[a_1:e_1, \ldots, a_n:e_n]>$ IN $e$ is condition.
3. if $e$ is an expression of type $\{\ldots\}$, then:

exists($e$)

is a condition.
4. true, false are conditions.
5. if $c1, c2$ are conditions, then so are $c_1$ and $c_2$, $c_1$ or $c_2$, not $c_1$.

Defn. Selection p-former:

A selection p-former is an expression:

$$p = <\text{tag}_{i_1}/c_1 | \ldots | \text{tag}_{i_k}/c_k>$$

and its "type" is:

$$p :: <\text{tag}_1:r_1 | \ldots | \text{tag}_n:r_n> \to <\text{tag}_{i_1}:t_{i_1} | \ldots | \text{tag}_{i_k}:t_{i_k}>$$

where $i_1,\ldots,i_k \in \{1,\ldots,n\}$, and $c_j$ is a condition, $c_j : r_{i_j} \to$ bool, for $j=1,\ldots,k$.

Defn. Selection operator:

Let $p$ be a selection p-former. The selection operator is:

$\sigma_p(\{t\}) = \{t\}$

The selection condition(s) only apply to tuples with tags mentioned in p. Tuples with other tags are simply copied to the output, unaffected.

When the following select operator is applied to the EmpsDeptsSites table described above $\sigma_{<Emp\ /\ (sal>50000)\ |\ Dept\ /\ (mgr="Betsy")\ |\ Site\ /\ (true)>}$ (EmpsDeptsSites)

the result is:

Emp:

| Name | ssn | sal | Phone |
|------|-----|-----|-------|
| Bob | 123-45-6789 | 83000 | 123-4567 |

Emp:

| Name | ssn | sal | Phone |
|------|-----|-----|-------|
| Marilyn | 321-54-9876 | 78000 | 487-0128 |

Site:

| Name | city |
|------|------|
| HQ | San Jose |

Emp:

| Name | ssn | sal | Phone |
|------|-----|-----|-------|
| Betsy | 233-23-6352 | 75000 | 234-3473 |

Dept:

| Name | loc | mgr |
|------|-----|-----|
| Sales | HQ | Betsy |

The same operator can be expressed as:

$\sigma_{<Emp\ /\ (sal>50000)\ |\ Dept\ /\ (mgr="Betsy")>}$ (EmpsDeptsSites)

The select operator operates only on the top level, in that it decides for each top level record whether to keep it or toss it. However, the condition c can look deep inside the current record (*e.g.*, by using existential/universal quantifiers).

2.3 Rename

The rename operator (ρ) renames tags and/or attributes. It is a generalization of the rename operator in the relational algebra:

Defn. Renaming p-former:

A renaming p-former is an expression:

p = <tag$_1$→tag$_1$':[a$_{11}$→a$_{11}$', a$_{12}$→a$_{12}$', ... ] | tag$_2$→tag$_2$':[a$_{21}$→a$_{21}$', a$_{22}$→a$_{22}$', ... ] | ... >

Defn. Renaming operator:

Given a renaming p-former p, the renaming operator is:

$\rho_p(\{t\}) = \{t'\}$.

This operator renames tag$_1$ to tag$_1$', and renames the fields in the record of type tag$_1$ by changing a$_{11}$ to a$_{11}$', ...; renames tag$_2$ to tag$_2$', and so on. All tags and/or labels that are not mentioned are left unchanged. The output type is "isomorphic" to the input type:

only the variant and record labels at the top level have changed. The "identity" mapping $a_i \to a_i$ can be abbreviated to $a_i$ in specifying a renaming.

2.4 Extend

The extend operator ($\varepsilon$) adds new fields to a record, each computed by some expression from other fields.

Defn. Extension p-former:

Given union types $u = \langle tag_1:r_1,\ldots,tag_n:r_n \rangle$ and $u' = \langle tag_1:r_1',\ldots,tag_n:r_n' \rangle$, an extension p-former of type $u \to u'$ is an expression:

$p = \langle tag_1:[c_{11}:e_{11}, c_{12}:e_{12}, \ldots ] | \ldots | tag_n:[c_{n1}:e_{n1}, c_{n2}:e_{n2}, \ldots ] \rangle$ where the expressions $e_{ij}, \ldots$ have types $e_{ij} : r_i \to t_{ij}'$, and $r_i'$ is a record type obtained by adding the fields $[c_{i1}:t_{i1}', c_{i2}:t_{i2}',\ldots]$ to $r_i$.

Defn. Extension operator:

Given an extension p-former p, the extension operator is:

$\varepsilon_p(\{t\}) = \{t'\}$.

The meaning is that new labels $c_{11}, c_{12}, \ldots$ are added to the corresponding records, and their values are computed by the exrepssions $e_{11}, e_{12}, \ldots$ The values of all the other labels are copied into the output unchanged. As for the other operators, not all tags need to be mentioned: the missing ones are copied to the output.

2.5 Combo

The Combo operator ($\Sigma$) combines Project, Select, Rename, and Extend, and does this to arbitrary nesting levels. The Combo operator is parameterized by an argument that is a deeply structured expression combining arguments of Project ($\Pi$), Select ($\sigma$), Rename ($\rho$), and Extend ($\varepsilon$). Such an expression is called a p-former. Unlike the other operators, combo does not implicitly copy "the other" tags and labels to the output, but deletes them. This allows both copying and deleting. (For convenience, another version of the combo operator may also be defined that copies by default.)

The rules below define a p-former inductively. A p-former, $p$, has an input type $t$ and an output type $t'$, and the p-former is denoted by:

$p :: t \to t'$

The p-former takes an input value of type t and returns either an output value of type t' or "nothing." When used in a Combo operator, $\Sigma_p$, the type of the Combo operation is $\{t\} \to \{t'\}$. Consider a selection in the relational algebra, $\sigma_{age<20}$, (age<20) is a p-former: it takes a record and returns either the same record (if age<20) or nothing (otherwise).

For each p-former, there is a *context* (which, recall, is a sequence of record types, $(r_1, ..., r_n)$). Inner p-formers have a context consisting of all record types of the surrounding records. The top-level p-former has an empty context.

1. The "identity p-former":

$:: t \rightarrow t$    for every type $t$ returns its input, unchanged

2. The "record p-former":

if $p_1 :: t_{i_1} \rightarrow t'_1, ..., p_k :: t_{i_k} \rightarrow t'_k$, are p-formers, $\{i_1, ..., i_k\} \subseteq \{1, 2, ..., n\}$ and $e_1: [a_1:t_1,...,a_n:t_n] \rightarrow t_1'', ..., e_p: [a_1:t_1,...,a_n:t_n] \rightarrow t_p''$ are expressions, then $[(a_{i_1} \rightarrow b_1): p_1,...,(a_{i_k} \rightarrow b_k): p_k, c_1: e_1,...,c_p: e_p] :: r \rightarrow r'$, where $r =$ $[a_1:t_1,...,a_n:t_n]$ and $r' = [b_1:t_1',..., b_k:t_k',c_1:t_1'', ..., c_p:t_p'']$.

The $(a \rightarrow b) : p$ components rename an attribute a to b, and apply recursively the p-former p on the value of that attribute. The c:e components introduce a new attribute (c) whose value is computed by the expression e over r. If the context of p is $(r_1, ..., r_n)$, then the context for each of $p_1, ..., p_k$ is $(r_1, ..., r_n, r)$.
    The following condition applies to p-formers in Combo operators:

(*) $a_{i_1},...,a_{i_k}$ *are distinct and* $e_1, ..., e_p$ *are scalar expressions*

(The b's and c's are also distinct, which follows implicitly from their use in the type $[b_1:t_1', ..., b_k:t_k',c_1:t_1'',...,c_p:t_p'']$). The restriction ensures that every complex value is copied to the output at most once, and new values being produced are scalar: this enables simple, pipeline computation.
    Given an input value $[a_1:v_1, ..., a_n : v_n]$, the p-formers $p_1, ..., p_k$ first apply to the values $v_{i1}, ..., v_{ik}$ respectively. If any of them returns "nothing," then the record p-former returns "nothing." Otherwise, let $v_1', ..., v_k'$ be the values returned by the p-formers, and let $w_1, ..., w_p$ be the values returned by the expressions $e_1, ..., e_p$: the record p-former returns the record $[b_1:v_1', ..., b_k : v_n',c_1:w_1,...,c_p:w_p]$.

3. The "variant p-former" is parameterized by a selection condition, c:

if $c : r \rightarrow bool$ and $p :: r \rightarrow r'$
    then $(tag/c \rightarrow tag'):p :: tag:r \rightarrow tag':r'$ The condition c is checked first. If it returns false, then the p-former returns "nothing." Otherwise, it returns whatever p returns, but changes the tag to tag'. The c may use existential/universal quantifiers on the set fields of r.

4. The "union" p-former is:

if $p_1::v_{i1} \rightarrow v_1', ..., p_k :: v_{ik} \rightarrow v_k'$ and $\{i_1, ..., i_k\} \subseteq \{1, 2, ..., n\}$
    then $<p_1 | ... | p_k> :: <v_1 | ... | v_n> \rightarrow <v_1'| ... | v_k'>$ Given a value of type $<v_1 | \ldots | v_k>$, union p-former checks that it is of one of the variant types $v_{i1}, \ldots, v_{ik}$: if not, it returns "nothing," otherwise it returns whatever the corresponding p-former returns. Neither the variant types $v_1, \ldots, v_k$ nor the variant types $v_1', \ldots, v_k'$ are disjoint: however identical tags in the latter correspond to identical types, i.e., $<v_1'| \ldots | v_k'>$ are a correctly formed type.

5. The "set" p-former is:

if $p :: u \rightarrow u'$
then $\{p\} :: \{u\} \rightarrow \{u'\}$

Given a set $\{x_1, \ldots, x_n\}$, the set p-former first applies the p-former p to each element in the set. Let $y_1, \ldots, y_k$ be all values returned by p (i.e., excluding "nothing"), then the set p-former returns $\{y_1, \ldots, y_k\}$

Defn. Combo operator: if $p$ is a p-former, $p :: t \rightarrow t'$, then:
$\Sigma p (\{t\}) = (\{t'\})$
Given a set $\{x_1, \ldots, x_n\}$, the operator first applies the p-former p to each element in the set. Let $y_1, \ldots, y_k$ be all values returned by p (i.e., excluding "nothing"). Then $\Sigma p$ returns $\{y_1, \ldots, y_k\}$ The following p-former is defined for the EmpsDeptsSites table:

p = <Emp/(sal>50000)      →HighEarner:[name→name:_] |
    Dept/(mgr= "Betsy")   →BetsyManages:[name→name:_] |
    Site/(true)           →Site:[name→name:_,city→city:_]>

The following combo operation is applied to the table:

$\Sigma_p$ (EmpsDeptsSites)

If (a → a) is abbreviated with a, p:_ with p, and tag/(true) with tag, then combo operator can then be abbreviated as:

$\Sigma_{<Emp/(sal>50000) \rightarrow HighEarner:[name] | Dept/(mgr="Betsy") \rightarrow BetsyManages:[name] | Site:[name,city]>}$ (EmpsDeptsSites)

The results of this combo operator is:

HighEarner:

| name |
|------|
| Bob |

HighEarner:

| name |
|------|
| Marilyn |

Site:

| name | City |
|------|------|
| HQ | San Jose |

HighEarner:

| name |
|------|
| Betsy |

BetsyManages:

| name |
|------|
| Sales |

This example illustrates the use of contexts. The following relation (base types omitted) is used.

Pers:{<a:[name, birthday, projects:{<b:[title, deadline, modules:{<c:[id,date]}>}]>}

Each person has a set of projects, each project has a set of modules.

a. The combo $\Sigma_{p2}(\mathbf{Pers})$ returns all persons that work on a project whose deadline is on their birthday. Its definition needs two p-formers:
     p1 = <b/($1.deadline=$[1].birthday):_>
     p2 = <a/(Exists($\Sigma_{p1}$($1.projects))):_>

The context expression $[1].birthday in p1, which retrieves the birthday from one level higher up, is used in the "context" of p2, which defines the outer context to be a record of type [name, birthday, project].

b. The combo $\Sigma_{p3}(\mathbf{Pers})$ deletes from every person all projects whose deadline is on the person's birthday:
     p3 = <a:[name:_, birthday:_, projects: {<b/($1.deadline != $[1].birthday):_>}]> c. This illustrates the use of a $[2] context. The combo $\Sigma_{p4}(\mathbf{Pers})$ operates as before, but in addition it deletes all modules whose dates are on the person's birthday:
     p4 = <a:[name:_,
              birthday:_,
              projects: {<b/($1.deadline != $[1].birthday):
                         [title:_,
                          deadline:_,
                          modules:{<c/($1.date != $[2].birthday):_ >}
                         ]>}
             ]>

1. A Projection operator is a particular case of the Combo operator. For example
   $\Pi_{<Emp:[name] | Dept: [name,mgr] | Site: [name,city]>}$(EmpsDeptsSites) is the same as
   $\Sigma_{<Emp:[name] | Dept: [name,mgr] | Site: [name,city]>}$(EmpsDeptsSites)
2. A Selection operator is a particular case of the Combo operator. For example
   $\sigma_{<Emp / (sal>50000) | Dept / (mgr="Betsy") | Site / (true)>}$ (EmpsDeptsSites) is the same as
   $\Sigma_{<Emp / (sal>50000) | Dept / (mgr="Betsy") | Site / (true)>}$(EmpsDeptsSites)

3. A Renaming operator is a particular case of the Combo operator. For example, given the renaming p-former:

p = <Emp→Employee:[name→person,ssn,sal,phone→contact]] |
       Dept→Depart:[name→teammember,loc→place,mgr] |
       Site→Site:[name,city]> the renaming operator $\rho_p(\text{EmpsDeptsSites})$ is the same as $\Sigma_p(\text{EmpsDeptsSites})$.

4. The most general form of a Combo operator is like a submatrix selection. There is no copying and no unnesting involved.
5. Combo can be used to homogenize a collection. For example, in EmpsDeptsSites there are three different kinds of records, and all share a name attribute. The following Combo operator extracts all names and constructs a homogeneous collection:

$\Sigma_{<\text{Emp}\rightarrow\text{Res:[name]} | \text{Dept}\rightarrow\text{Res: [name]} | \text{Site}\rightarrow\text{Res: [name]}>}(\textbf{EmpsDeptsSites})$.

The result is of type

{<Res:[name:string]>} which is a homogeneous collection.
6. Combo can be used to dispatch records to different types (*e.g.*, transforming a homogeneous collection into a heterogeneous one). The following Combo operator splits Emp's into Regular and HighPaid:

$\Sigma_{<\text{Emp/(sal}<100k)\rightarrow\text{Regular:[name, phone]} | \text{Emp/(sal}\geq 100k)\rightarrow\text{HighPaid: [name,phone]}>}(\textbf{Emps})$ The input has type {<Employee:[name, phone, salary]>}, (base types omitted) while the output has type {<Regular:[name] | HighPaid: [name, phone]>}

In general conditions that are applied to a tag may overlap. For example, employees with sal<100k may be dispatched to some type, and those with sal>50k to another type. In this case, records that satisfy both conditions will contribute to both outputs.

2.6 The Simple Combo

The semantics of combo is that tags not mentioned in the p-former are dropped from the output. The "simple" combo has a complementary semantics: only tags/labels that are to be modified need be mentioned. By default, all others are copied to the output. Moreover, the "simple" combo only does one single action, possible at some depth in the NCR.

Defn. Simple p-former:

A simple p-former is a p-former that includes only a single selection (*i.e.*, for a single tag), a single projection, renaming of a single tag or label, or an extension with a single new label. Formally, it is defined like a p-former with additional syntactic restrictions that ensure that only one action is performed (only a projection, a selection, a renaming, or an extension). The other parts of the simple p-former, that do the copying, are omitted. The simple p-former is illustrated by the following examples:

- <Emp/(sal>=50000)> this simple p-former is a selection and is equivalent to <Emp/(sal>=50000):_ | Dept:_ | Other:_>, *i.e.*, copy the other tags unchanged. Thus, to get the equivalent "real" p-former, the omitted tags Dept and Other need to be added.
- <Dept:[name, projects]> this simple p-former is a projection and is equivalent to <Emp:_ | Dept:[name:_, projects:_], Other:_>.
- <Dept:[projects:{<urgent/(deadline>="10/10/2010")>}]> this is a selection on the inner relation projects, and is equivalent to
  <Emp:_ | Dept:[name:_, floor:_, projects:{<normal:_ | urgent/(deadline>="10/10/2010"):_>}] | Other:_>.
- Omitted tags (Emp, normal) are added *and* omitted labels (name, floor) are added too.
- <Dept[projects:{<urgent:[name, team]>}]> this is a projection at a deeper level. Tags and labels are added, except where projection is done:
  <Emp:_ | Dept:[name:_, floor:_, projects:{<normal:[name:_, team:_], urgent:_>}] | Other:_>

Defn. Simple combo:

Given a simple p-former p, the simple combo operator is:

$$\Sigma^0_p(\{t\}) = \{t'\}.$$

The superscript 0 indicates that the combo is "simple" (*i.e.*, all missing tags and labels in p have to be added). The semantics is defined as follows. Given a p-former, $p::t \to t'$, (simple or not) define the completion of p to be $c(p) : t \to t''$ obtained from p by "completing" the missing tags according to the type t (*i.e.*, c(p) should actually be denoted c(p,t); it can be defined inductively; omitted). The semantics of the simple combo operator is:

$$\Sigma^0_p(x) = \Sigma_{c(p)}(x)$$

Example
Given NCR EmpsDeptsSites from above, the following are simple combos:

$\Sigma^0_{<Emp/(sal>50000):\_]>}$ (EmpsDeptsSites) is the same as:

$\Sigma_{<Emp/(sal>50000)]:\_ | Dept:\_>}$(EmpsDeptsSites)

$\Sigma^0_{<Dept:[mgr]>}$ (EmpsDeptsSites) is the same as:

$\Sigma_{<Dept\,[mgr]\,|\,Emp\_>}$ (EmpsDeptsSites)

The simple combos are strictly less powerful than combos, because they do not allow deletion of tags from the output type. For example, consider the combo $\Sigma_{<Dept:[mgr]>}$(EmpsDeptsSites). Its output type is {<Dept: [mgr]>}. It may be expressed as a sequence of simple combos:

$\Sigma^0_{<Emp/false:\_>}$ ($\Sigma^0_{<Dept:[mgr]>}$ (EmpsDeptsSites))

where the second simple combo is needed to eliminate all Emp records. But, the output type of this expression is {<Dept:[mgr] | Emp:[name, ssn, sal, phone]>}. A type checker could be modified to recognize that some conditions are (equivalent to) false and eliminate the corresponding tag from the output type. If so, combo operators could be expressed as a sequence of simple combo operators.

2.7 Match

The match operator, $\Omega_m$, generalizes the combo operator by relaxing some of its restrictions. The match operator is parameterized by an m-former, m, that is defined inductively like a p-former in Combo, with two generalizations:

1. In the record m-former:
   $[(a_{i_1} \to b_1) : p_{i_1},...,(a_{i_k} \to b_k) : p_k, c_1 : e_1,...,c_p : e_p] :: [a_1:t_1,...,a_n:t_n] \to [b_1:t_1',..., b_k:t_k', c_1:t_1'', ..., c_p:t_p'']$
   the labels $a_{i1}, ..., a_{ik}$ are not required to be distinct, and the expressions $e_1, ..., e_p$ are not restricted to be scalars. (That is the restriction (*) is dropped.) This allows data values to be copied.
   Example: $\Omega_{<Pers:[Name \to Name1, Phone, Name \to Name2]>}$, copies the Name value calling it Name1 and Name2. Such copying can be expensive, when the value being copied is a large sub-relation. This is unlike Combo where no copying is done.
2. There exists an "unnest" m-former, with no corresponding p-former:
   if m :: u → u'
   then unnest(m) :: {u} → u'
   (This is different from the set p-former, {p} : {u} → {u'}). Unnest flattens an inner relation. When two or more unnest m-formers are used in a record m-former, their result consists of a Cartesian product: again, this can be expensive.

Whenever an unnest m-former is used inside another m-former m :: t → t', the result type t' is not a legal type any more, but an "extended" type. t' can be converted back into a legal type using a mapping norm.

Defn. Match operator: if m :: t → t' is a m-former, where t is a type and t' an extended type. Then:

$\Omega_m(\{t\}) = \{\textbf{norm}(t')\}$

Example:

$\Omega_{<T:[A:unnest(\_), B:unnest(\_)]>}$ ({<T:[ A:{<T$_1$:[a:t$_{11}$,b:t$_{12}$] | T$_2$:[c:t $_{13}$, d:t$_{14}$]>},
$\qquad\qquad$ B:{<T$_3$:[e:t$_{21}$, f:t$_{22}$] | T$_4$:[g:t $_{23}$, h:t$_{24}$]>}]
$\qquad$ >}) =
{<T:[ A:<T$_1$:[a:t$_{11}$,b:t$_{12}$] | T$_2$:[c:t $_{13}$, d:t$_{14}$]>,
$\qquad$ B:<T$_3$:[e:t$_{21}$, f:t$_{22}$] | T$_4$:[g:t $_{23}$, h:t$_{24}$]>]
$\quad$ >})

The only change in the output type is that some braces {...} have been erased. The output type is technically illegal in the type system, because each record field needs to be either atomic or a set. It can be normalized by pulling out all variant types to the top level and flattening the records. The normalized type is defined to be the output type of $\Omega$. We call norm the normalization operation. The following example illustrates the normalization operation:

norm <T:[ A:<T$_1$:[a:t$_{11}$,b:t$_{12}$] | T$_2$:[c:t $_{13}$, d:t$_{14}$]>, B:<T$_3$:[e:t$_{21}$, f:t$_{22}$] | T$_4$:[g:t $_{13}$, h:t$_{14}$]>]>

= <TT$_1$T$_3$:[Aa:t$_{11}$,Ab:t$_{12}$,Be:t$_{21}$,Bf:t$_{22}$] |
$\quad$ TT$_1$T$_4$:[Aa:t$_{11}$,Ab:t$_{12}$,Bg:t$_{23}$,Bh:t$_{24}$] |
$\quad$ TT$_2$T$_3$:[Ac:t$_{13}$,Ad:t$_{14}$,Be:t$_{21}$,Bf:t$_{22}$] |
$\quad$ TT$_2$T$_4$:[Ac:t$_{13}$,Ad:t$_{14}$,Bg:t$_{23}$,Bh:t$_{24}$] >

The norm operation constructs new tag names and new field names by concatenating existing names.

Definition of norm. The symbol "$\otimes$" is used to denote the following operation between record and/or union types:

[a$_{11}$:t$_{11}$, a$_{12}$:t$_{12}$, ..., a$_{1m}$:t$_{1m}$] $\otimes$ [a$_{21}$:t$_{21}$, a$_{22}$:t$_{22}$, ..., a$_{2n}$:t$_{2n}$] =
$\quad$ [a$_{11}$:t$_{11}$, a$_{12}$:t$_{12}$, ..., a$_{1m}$:t$_{1m}$, a$_{21}$:t$_{21}$, a$_{22}$:t$_{22}$, ..., a$_{2n}$:t$_{2n}$]

r $\otimes$ <tag$_1$ : r$_1$ | tag$_2$ : r$_2$ | ... | tag$_n$:r$_n$> = <tag$_1$ : r $\otimes$ r$_1$ | tag$_2$ : r $\otimes$ r$_2$ | ... | tag$_n$:r $\otimes$ r$_n$>

<tag$_1$ : r$_1$ | tag$_2$ : r$_2$ | ... | tag$_n$:r$_n$> $\otimes$ r = <tag$_1$ : r$_1$ $\otimes$ r | tag$_2$ : r$_2$ $\otimes$ r | ... | tag$_n$:r$_n$ $\otimes$ r>

<tag$_{11}$ : r$_{11}$ | tag$_{12}$ : r$_{12}$ | ... | tag$_{1m}$:r$_{1m}$> $\otimes$ <tag$_{21}$ : r$_{21}$ | tag$_{22}$ : r$_{22}$ | ... | tag$_{2n}$:r$_{2n}$> =
$\quad$ < tag$_{1i}$tag$_{2j}$ : r$_{1i}$ $\otimes$ r$_{2j}$ | i = 1, m, j = 1,n >

In the last line tag concatenation is used. The norm operation concatenates two record types, or, if the two types are unions of m and n record types respectively, then constructs a new union type with mn record types, by considering all pairs of concatenations.

The symbol "$\oplus$" is used to denote the union of two disjoint union types:

$$<tag_{11} : r_{11} | tag_{12} : r_{12} | \ldots | tag_{1m}:r_{1m}> \oplus <tag_{21} : r_{21} | tag_{22} : r_{22} | \ldots | tag_{2n}:r_{2n}> =$$
$$<tag_{11} : r_{11} | \ldots | tag_{1m}:r_{1m} | tag_{21} : r_{21} | \ldots | tag_{2n}:r_{2n}>$$

Two functions rlabel$_a$ and ulabel$_{tag}$ are defined that add or concatenate a record label a, or a tag to a type:

rlabel$_a$(t) = [a:t]   where t is an atomic type or a set type
rlabel$_a$([a$_1$:t$_1$, a$_2$:t$_2$, ..., a$_n$:t$_n$]) = [aa$_1$:t$_1$, aa$_2$:t$_2$, ..., aa$_n$:t$_n$]
rlabel$_a$(<tag$_1$:r$_1$ | tag$_2$:r$_2$ | ... | tag$_n$:r$_n$>) =
    <tag$_1$:rlabel$_a$(r$_1$) | tag$_2$:rlabel$_a$(r$_2$) | ... | tag$_n$:rlabel$_a$(r$_n$)>
ulabel$_{tag}$(r) = <tag:r>   where r is a record type ulabel$_{tag}$(<tag$_1$:r$_1$ | tag$_2$:r$_2$ | ... | tag$_n$:r$_n$>) = <tagtag$_1$:r$_1$ | tagtag$_2$:r$_2$ | ... | tagtag$_n$:r$_n$>

For the definition of the function norm, the definition of types ("normal types") is extended to "*extended types*." These are precisely the types t' that can occur in m-formers, m :: t → t'.

t ::= b
t ::= {u}
t ::= u         /* this is an extended type and "illegal" under the normal definition */
r ::= [a$_1$:t$_1$, a$_2$:t$_2$, ..., a$_n$:t$_n$]
u ::= <tag$_1$ : r$_1$ | tag$_2$ : r$_2$ | ... | tag$_n$:r$_n$>

The norm operation is defined by:

norm(b) = b
norm({u}) = {norm(u)}
norm([a$_1$:t$_1$, a$_2$:t$_2$, ..., a$_n$:t$_n$]) = rlabel$_{a1}$(norm(t$_1$)) ⊗ ... ⊗ rlabel$_{an}$(norm(t$_n$))
norm(<tag$_1$:r$_1$ | tag$_2$:r$_2$ | ... | tag$_n$:r$_n$>) = ulabel$_{tag1}$(norm(r$_1$)) ⊕ ... ⊕ ulabel$_{tagn}$(norm(r$_n$))

The operation norm(t) results in a normal type; and if t is a normal type then norm(t) = t.

2.8 Join

Join takes a tuple from each input table and tests this combination to see if it meets a predicate; if so, it returns a combined tuple as the result. Join allows specification of a different predicate and name and a different output tag for each pair wise combination of types from the two tables. Not all pairs must have a predicate and output tag: those that do not contribute to the join.

An "inner" join is described in the following.

Defn. Conditional predicate on two tuples:

*The Join and Nest operations need conditions on two records:*

$c : r_i \times r_j \rightarrow bool$

Defn. Combined tuple:

*Join produces a combined tuple as its output. Recall the "$\otimes$" operator, which returns a new combined tuple.*

$r1 \otimes r2 = [a1_1: t1_1, a1_2:t1_2, ..., a1_n: t1_n, a2_1: t2_1, ..., a2_m: t2_m]$ where
$r1 = [a1_1: t1_1, a1_2:t1_2, ..., a1_n: t1_n], \quad r2 = [a2_1: t2_1, ..., a2_m: t2_m]$ (There is an implicit condition here that the labels in the two records are disjoint.)

Defn. j-former:

A j-former of type:

$j :: <tag1_1{:}r1_1 \mid ... \mid tag1_n{:}r1_n>, <tag2_1{.}r2_1 \mid ... \mid tag2_m{.}r2_m> \rightarrow$
$\quad\quad <tag'_1 : r1_{i_1} \otimes r2_{j_1} \mid ... \mid tag'_p : r1_{i_p} \otimes r2_{j_p} >$ is an expression of the form:

$j = <tag1_{i_1}, tag2_{j_1}/c_1 \rightarrow tag'_1 \mid ... \mid tag1_{i_p}, tag2_{j_p}/c_p \rightarrow tag'_p >$ where:

1. $i_1, ..., i_p \in \{1, ..., n\}$, $j_1, ..., j_p \in \{1, ..., m\}$ such that all pairs $(i_1, j_1), ..., (i_p, j_p)$ are distinct (hence $p \leq n^2$), and all tags $tag'_1, ..., tag'_p$ are distinct
2. $c_k : r1_{i_k} \times r2_{j_k} \rightarrow bool$, for $k = 1, ..., p$.

Defn. Join operator:

Let $j :: t1 \times t2 \rightarrow t$ be a j-former. Then the join operator is:

$\bowtie_j (\{t1\}, \{t2\}) = \{t\}$

2.8.1.1.1.1 Example

The following NCRs are used to illustrate a join of two tables:

2.8.1.1.1.1.1 Depts

| Dept: | dname | loc |
|---|---|---|
| | Payroll | HQ |
| Dept: | dname | loc |
| | Quality Ctrl | HQ |
| Dept: | dname | loc |
| | Sales | HQ |
| Dept: | dname | loc |
| | Personnel | Satellite |

2.8.1.1.1.1.2 EmpSites

| | ename | ssn | dept |
|---|---|---|---|
| Emp: | Bob | 123-45-6789 | Payroll |
| Emp: | ename | ssn | dept |
| | Marilyn | 321-54-9876 | Quality Ctrl |
| Site: | sname | city | |
| | HQ | San Jose | |
| Emp: | ename | ssn | dept |
| | Qing | 673-82-3845 | Quality Ctrl |
| Emp: | ename | ssn | dept |
| | Betsy | 233-23-6352 | Sales |
| Emp: | ename | ssn | dept |
| | Brian | 341-69-0323 | Sales |
| Emp: | ename | ssn | dept |
| | Sam | 356-02-6743 | Payroll |

A join on the two tables can be performed with one join predicate for (Dept x Emp) and another for (Dept x Site):

⋈ <Emp,Dept/($1.dept=$2.dname)→EmpLoc | Site,Dept /($1.loc=$2.sname)→FullDept> (EmpSites, Depts) returns the following NCR:

| | ename | ssn | dept | dname | loc |
|---|---|---|---|---|---|
| EmpLoc: | Bob | 123-45-6789 | Payroll | Payroll | HQ |
| EmpLoc: | ename | ssn | dept | dname | loc |
| | Marilyn | 321-54-9876 | Quality Ctrl | Quality Ctrl | HQ |
| FullDept: | sname | city | dname | loc | |
| | HQ | San Jose | Payroll | HQ | |
| FullDept: | sname | city | dname | loc | |
| | HQ | San Jose | Quality Ctrl | HQ | |
| FullDept: | sname | city | dname | loc | |
| | HQ | San Jose | Sales | HQ | |
| EmpLoc: | ename | ssn | dept | dname | loc |
| | Qing | 673-82-3845 | Quality Ctrl | Quality Ctrl | HQ |
| EmpLoc: | ename | ssn | dept | dname | loc |
| | Betsy | 233-23-6352 | Sales | Sales | HQ |
| EmpLoc: | ename | ssn | dept | dname | loc |
| | Brian | 341-69-0323 | Sales | Sales | HQ |
| EmpLoc: | ename | ssn | dept | dname | loc |
| | Sam | 356-02-6743 | Payroll | Payroll | HQ |

2.9 Outer Join

An outer join has the same syntax as an inner join, with minor additional restrictions. The semantics differs:

Defn. oj-former:

Let $t1 = <tag1_1:r1_1 \mid \ldots \mid tag1_n:r1_n>$ and $t2 = <tag2_1:r2_1 \mid \ldots \mid tag2_m:r2_m>$. An oj-former for type:

$$oj :: t1, t2 \rightarrow t1 \oplus t2 \oplus <tag'_1 : r1_{i_1} \otimes r2_{j_1} \mid \ldots \mid tag'_p : r1_{i_p} \otimes r2_{j_p}>$$

is an expression of the form:

$$oj = <tag1_{i_1}, tag2_{j_1}/c_1 \rightarrow tag'_1 \mid \ldots \mid tag1_{i_p}, tag2_{j_p}/c_p \rightarrow tag'_p>$$

where:

1. $i_1, \ldots, i_p \in \{1, \ldots, n\}$, $j_1, \ldots, j_p \in \{1, \ldots, m\}$ such that all pairs $(i_1, j_1), \ldots, (i_p, j_p)$ are distinct (hence $p \leq mn$), and all tags $tag'_1, \ldots, tag'_p$ are distinct
2. $c_k : r1_{i_k} \times r2_{j_k} \rightarrow bool$, for $k = 1, \ldots, p$.
3. all tags $tag'_1, \ldots, tag'_p$ are distinct, and they are also distinct both from $tag1_1, \ldots, tag1_n$ and from $tag2_1, \ldots, tag2_m$

Defn. Outer Join operator:

Let $oj :: t1 \times t2 \rightarrow t$ be an oj-former. The outer-join operator is:

$\square \bowtie \square$ $_{oj}(\{t1\}, \{t2\}) = \{t\}$

Example

The outer join is illustrated by a data integration scenario. There are two sources of persons' phone numbers where each source has an attribute that tells us the confidence in that piece of information:

Source1: $\{<$source1:[name1:string, phone1:int, conf1:real]$>\}$
Source2: $\{<$source2:[name2:string, phone2:int, conf2:real]$>\}$ The integration is done in two steps. First, the outer join is computed, then a selection/project that encapsulates the logic of the integration is applied. The first step results in the raw data:

rawIntegratedData = Source1 $\square \bowtie \square_{oj}$ Source2 where the oj-former is:

$oj = <$source1, source2/($1.name1=$2.name2) $\rightarrow$ integrated $>$ The type of rawIntegratedData is:

rawIntegratedData :$\{<$source1:[name1, phone1, conf1]
   $\mid$ source2:[name2, phone2, conf2]
   $\mid$ integrated: [name1,name2,phone1,phone2,conf1,conf2]$>\}$ That is, it will include all "integrated" records, as well as "dangling tuples" from each source. The second step can now apply an arbitrarily sophisticated integration logic. For example, source 1 may be trusted more than source 2, have some complex rules on how to deal with conflicting information, and drop records where the confidence is too low:

integratedData = $\Sigma_p$(rawIntegratedData)

where the p-former p encapsulates the integration logic:

$$\begin{aligned}
p = <\text{source1}/(\text{conf1} > 0.1) \quad &\to \text{certain:[name1} \to \text{name, phone1} \to \text{phone]} \\
|\ \text{source2}(\text{conf2} > 0.5) \quad &\to \text{certain:[name2} \to \text{name, phone2} \to \text{phone]} \\
|\ \text{integrated}/(\text{conf1} > 0.4) \quad &\to \text{certain:[name1} \to \text{name, phone1} \to \text{phone]} \\
|\ \text{integrated}/(\text{conf1} \leq 0.4 \text{ and conf2} > 0.7) \quad &\to \\
&\text{certain:[name1} \to \text{name, phone2} \to \text{phone]} \\
|\ \text{integrated}/(\text{conf1 in } 0.1..0.4 \text{ and conf2 in } 0.5..0.7) \quad &\to \\
&\text{uncertain:[name1} \to \text{name, phone1, phone2]} >
\end{aligned}$$

The type of integratedData is:

integratedData: {<certain:[name, phone], uncertain:[name, phone1, phone2]>} that is, in some cases both phone numbers are kept since the confidence does not favor one over the other.

2.10 Nest

The Nest operator works like a left outer join, but it nests all matching children within the tuple of each parent. Nesting is commonly done in XML-QL subqueries, and any time there is a *1:n* parent-child hierarchy in the output. Nest has left outer join semantics, rather than inner join semantics, and that it preserves the order of the parent relation. Nest can rename both the tag types for the nested tuples and for the parent tuples.

Defn. n-former.

Given n x m predicates:
    $c_{ij} = r1_i \times r2_j \to \text{bool}$
  and n new labels, $b_1, ..., b_n$.. An n-former of type:
    n :: <tag1$_1$ : r1$_1$ | ... | tag1$_n$ : r1$_n$>, <tag2$_1$: r2$_1$| ... | tag2$_m$: r2$_m$> $\to$
      <tag$_1$:r$_1$ $\otimes$ [b$_1$:{u$_2$}] | ... | tag $_n$: r$_n$ $\otimes$ [b$_n$:{u$_2$}]>
  is given by an expression:
    n = <tag$_{1i}$ : [b$_i$ : <tag$_{21}$/c$_{i1}$ | ... | tag$_{2m}$/c$_{im}$>] | i = 1, ..., n>

Defn. Nest operator:

Let n :; u$_1$, u$_2$ $\to$ u be an n-former. Then
  Nest$_n$: ({u$_1$}, {u$_2$}) = {u}

Example This example uses same Depts and EmpsSites relations of types:

Depts:{<Dept:[dname, loc]>}

EmpsSites: {<Emp: [ename, ssn, dept] | Site: [sname, city]>} and performs the operation:

Nest <Dept:[info: <Emp/($1.dname=$2.dept) | Site/($1.loc = $2.sname)>]>(Depts, EmpsSites)

The result has type:

{<Dept:[dname, loc, info:{<Emp: [ename, ssn, dept] | Site:[sname, city]>}]>} and is depicted below:

| | dname | loc | info | | | | |
|---|---|---|---|---|---|---|---|
| Dept: | Payroll | HQ | | ename | ssn | dept | |
| | | | 2.11.1.1.1.1.1.1 Emp: | Bob | 123-45-6789 | Payroll | |
| | | | | sname | city | | |
| | | | Site: | HQ | San Jose | | |
| | | | | sname | ssn | dept | |
| | | | Emp: | Sam | 356-02-6743 | Payroll | |
| | dname | loc | info | | | | |
| Dept: | Quality Ctrl | HQ | | ename | ssn | dept | |
| | | | 2.11.1.1.1.1.1.2 Emp: | Marilyn | 321-54-9876 | Quality Ctrl | |
| | | | | sname | city | | |
| | | | Site: | HQ | San Jose | | |
| | | | | sname | ssn | dept | |
| | | | 2.11.1.1.1.1.1.3 Emp: | Qing | 673-82-3845 | Quality Ctrl | |
| | dname | loc | info | | | | |
| Dept: | Sales | HQ | | sname | city | | |
| | | | | HQ | San Jose | | |
| | | | | ename | ssn | dept | |
| | | | 2.11.1.1.1.1.1.4 Emp: | Betsy | 233-23-6352 | Sales | |
| | | | | ename | ssn | dept | |
| | | | 2.11.1.1.1.1.1.5 Emp: | Brian | 341-69-0323 | Sales | |
| | dname | loc | info | | | | |
| | Personnel | Satellite | {} | | | | |

2.11 Union

The union of two union types, $u_1 \oplus u_2$, is defined to consist of all tags in both types, provided that a tag occurring in both $u_1$ and $u_2$ has identical types in $u_1$ and $u_2$.

Defn. Union operator:

$U (\{<r_{i1}, r_{i2}, ..., r_{in}>\}, \{<r_{j1}, r_{j2}, ..., r_{jm}>\}) =$
$\{<r_{i1}, r_{i2}, ..., r_{in}> \oplus <r_{j1}, r_{j2}, ..., r_{jm}>\}$

Example

The union operator is illustrated using the Depts and EmpsSites tables from the join example. The operation:

U (Depts, EmpsSites)

results in the NCR:

*Dept:*

| dname | loc |
|---|---|
| Payroll | HQ |

*Dept:*

| dname | loc |
|---|---|
| Quality Ctrl | HQ |

*Dept:*

| dname | loc |
|---|---|
| Sales | HQ |

*Dept:*

| name | loc |
|---|---|
| Personnel | Satellite |

*Emp:*

| ename | ssn | sal |
|---|---|---|
| Bob | 123-45-6789 | Payroll |

*Emp:*

| ename | ssn | sal |
|---|---|---|
| Marilyn | 321-54-9876 | Quality Ctrl |

*Site:*

| sname | city |
|---|---|
| HQ | San Jose |

*Emp:*

| ename | ssn | sal |
|---|---|---|
| Qing | 673-82-3845 | Quality Ctrl |

*Emp:*

| ename | ssn | sal |
|---|---|---|
| Betsy | 233-23-6352 | Sales |

*Emp:*

| ename | ssn | sal |
|---|---|---|
| Brian | 341-69-0323 | Sales |

*Emp:*

| ename | ssn | sal |
|---|---|---|
| Sam | 356-02-6743 | Payroll |

The expression A U B, for various types of A and B is illustrated in the following:
1. If A:{<Emp:[name, phone]>}, B:{<Dept:[name, floor]>}, then A U B has type {<Emp:[name, phone] | Dept:[name, floor]>} and denotes their disjoint union (*i.e.*, no duplicates are introduced, and duplicate elimination is not needed).
2. If A:{<Emp:[name, phone] | Mngr:[name, beeper]>} and B:{<Dept:[name, floor] | Mngr:[name, beeper]>} then A U B has type {<Emp:[name, phone] | Mngr:[name, beeper] | Dept:[name, floor]>} and means: take the disjoint union of Emp's from A and Dept's from B, and take the regular union of Mngr's from both A and B. The output type is: {<Emp:[name, phone] | Mngr:[name, beeper] | Emp:[name, phone]>}. We need to do duplicate elimination on Mngr's. If the type of Mngr in B is changed, such that the types of Mngr in A and B do not coincide any more, then A ∪ B is illegal.
3. If both A and B have the same type, say {<Emp:[name, phone] | Mngr:[name, beeper]>}, then A ∪ B is the regular union and the output type is the same.

2.11 Distinct

The distinct operator removes duplicates:

$$\textbf{distinct}: \{t\} \rightarrow \{t\}$$

2.12 Aggregates

Aggregate operators are included in the combo operator. The five aggregates in SQL and: count, sum, min, max, avg. Count is treated slightly differently. Let agg be one of sum, min, max, avg, and let b be the base type to which it applies (b can be int, real, or string when agg is min or max, int or real when agg is sum, and real only when agg is avg). Consider a union type:

$$u = <tag_1 : r_1 \mid ... \mid tag_n : r_n>$$

and let $e_1 : r_1 \rightarrow b, ..., e_n : r_n \rightarrow b$ be expressions. Then the following is an expression:

$$agg<tag_1/e_1 \mid ... tag_n/e_n> : \{u\} \rightarrow b$$

Expressions can be used in combo operators.

Example. The following example uses the NCR:

Products: {<Indigenous:[name, quantity, category], Imported:[n,q,c]>}

Where n,q,c stand also for name, quantity, category. The computation of the total quantities for all categories is performed in three steps: First, all categories are computed:

$$\textbf{Cat} = \textbf{distinct}(\Sigma_{<\textbf{Indigenous} \rightarrow \textbf{Cat [category} \rightarrow \textbf{c] | Imported} \rightarrow \textbf{Cat: [c]}>}(\textbf{Products}))$$

The type is {<Cat:[c]>}. Second, the products are nested by categories:

$$\textbf{Groups} = \textbf{Nest}_{<\textbf{Cat:[Prods:}<\textbf{Indigenous}/(\$1.c = \$2.category) \mid \textbf{Imported}/(\$1.c=\$2.c)>}(\textbf{Cat, Products})$$

The type is {<Cat:[c,Prods:{<Indigenous:[...], Imported:[...]>}]>}.

Third, the sum of all quantities is computed:

Answer = $\Sigma_{<Cat:[c,\ total:sum<Indigenous/quantity\ |\ Imported/q>(Prods)]>}(\textbf{Groups})$ The type is {<Cat:[c, total]>}.

3 NCR-QL

The following illustrates how XML-QL could be mapped into the algebra. However, XML-QL works over XML data, not NCRs, so an NCR version is defined of XML-QL ("NCR-QL"), that works on NCRs.

The analogy between XML-QL and NCR-QL is the following:

XML-QL:  where-construct

NCR-QL:  from-case-where-construct

3.1 Query 1

EmpsDeptsSites is the relation defined earlier containing tuples about Employees, Departments, and Sites. HOwnersCities is a relation containing tuples about HomeOwners and Cities. The following NCR-QL query performs some join between the two:

From EmpsDeptsSites, HOwnersCities
Case (Emp:[name: $X, ssn: $Y, sal: $Z, phone: $U], HOwner:[lastname:$V, zip:$W]) :
    (Where $X=$V AND $Z > 100000
    Construct EHO:[name:$X,ssn:Y,zip$W])
| (Dept:[name:$X, loc: $Y, mgr: $Z], HOwner:[lastname:$V, zip:$W]) :
    (Where $Z=$V
    Construct DHO:[name:$Z, dept:$X, zip:$W]
| (Dept:[name:$X, loc:$Y, mgr:$Z], City:[cityname:$V, place:$W]):
    (Where $Y = $W
    Construct DC:[name:$X,city:$V])

All combinations of tags from EmpsDeptsSites (defined above) and HOwnersCities (some other NCR) listed in the Case statement are inspected, and in each case a different output tag is produced. The corresponding algebra expression is:

$\Sigma_p$(EmpSites $\bowtie_j$ Depts)
where:
j = <Emp,HOwner/(name=lastname AND sal > 100000)→EHO
  | Dept,HOwner /(mgr=lastname)→DHO
  | Dept, City / (loc=place) → DC> p = <EHO:[name,ssn,zip], DHO:[mgr→name, name→dept,zip], DC:[name,cityname→city]>

3.2 Query 2

This query illustrates patterns over sets and how they are translated into the algebra. It roughly corresponds to the XML-QL pattern:

```
<products> <product> <name> $n </>
       <orders> <order> <date> $d </> </>
       </product>
</products> IN Products
``` where <orders> is a set. The NCR-QL query is more powerful since it handles heterogeneous collections of products and orders.

From Products
Case (SeattleProduct:[name:$n, price:$p, orders:$x]):
    Construct
      (From $x
        Case (order:[customer:$c, date:$d]): Where $p<100
                                    Construct usProductDate:[name:$n,date:$d])
  | (ParisProduct:[nome:$n,prix:$p,orders:$x]):
    Construct
      (From $x
        Case (euOrder:[country:$c,date:$d]): Where $p>35
                Construct euProductDate:[name:$n, date:$d]
        | (usOrder:[city:$c,date:$d]):      Construct importProductDate:[name:$n,date:$d])

Here Product has type (base types omitted):

{<SeattleProduct:[name,price,orders:{<order:[customer,date]>}] |
     ParisProduct:  [nome,prix,orders:{<euOrder:[country,date] |
     importOrder:[city,date]>}]>}

While XML-QL had a single pattern, nested patterns in NCR-QL are needed to match over nested sets. The NCR-QL query is translated into the algebra using a match operator:

$\Sigma_p (\Omega_m(\text{Products}))$ where:

m = <SeattleProduct:[name:_, price:_, orders:unnest{<order:[customer:_, date:_]>}]
  | ParisProduct: [nome:_, prix:_, orders: unnest{<euOrder:[country:_, date:_]
                | usOrder:[city:_, date:_]>}]>

Note that $\Omega_m$(Products) has type:

{<SeattleProduct:[name,price,orders:<order:[customer,date]>] |

ParisProduct: [nome,prix,orders:<euOrder:[country,date] | importOrder:[city,date]>]}

Which is the same type as for Products, with inner braces erased. It normalizes to:

{<SeattleProduct.order:[name, price, orders.customer, orders.date]
  | ParisProduct.euOrder:[nome, prix, orders.country, orders.date]
  | ParisProduct.importOrder:[orders.city, orders.date] >}

Hence, p is:

<SeattleProduct.order/price<100 → UsProductDate: [name → name, orders.date → date]
 | ParisProduct.euOrder/prix>35 → EuProductDate: [name → name, orders.date → date]
 | ParisProduct.importOrder → ImportProductDate: [name → name, orders.date → date]>

3.3 Query 3

The nesting in NCR-QL is illustrated using subqueries.
From Products
Case (product: [id:$x, name:$n, price:$p]:
    (Where $p<100
    Construct ProductWithOrders:[name:$n,
                          orders: From Orders
                              Case (order:[pid:$y, quantity:$q, date:$d]):
                              Where $x=$y AND $q>5555
                              Construct order:[date:$d]
               ]
)

The types are (with base types omitted):

Products: {<product:[id, name, price]>}    Orders:{<order:[pid,quantity,date]>}

The algebra expression equivalent to Query 3 is:

$\Sigma_p(\text{Nest}_n(\text{Products}, \text{Orders}))$ where n is:

n = <product: [orders: <order/id=pid>]> and p is:

p=<(product/price<100 → ProductWithOrders): [name, orders:{<order/quantity>5555:[date]>}]>

Notice that $\text{Nest}_n(\text{Products}, \text{Orders})$ has type:

$Nest_n(Products, Orders) : \{<product:[id, name, price, orders: \{<order: [pid, quantity, date]>\}]>\}$

3.4 General Form of Queries

A general form of algebra expressions for NCR-QL (and, hence, XML-QL) queries is:

$\Sigma_p(Nest_{n1}(Join_1, Nest_{n2}(Join_2, \ldots Nest_{nk-1}(Join_{k-1}, Join_k)\ldots)))$
where:
$Join_1 = \Omega_{m11}(R_{11}) \bowtie_{j11} \Omega_{m12}(R_{12}) \bowtie_{j11} \ldots$
$Join_2 = \Omega_{m21}(R_{21}) \bowtie_{j21} \Omega_{m22}(R_{22}) \bowtie_{j21} \ldots$
$\ldots$
$Join_k = \Omega_{mk1}(R_{k1}) \bowtie_{jk1} \Omega_{mk2}(R_{k2}) \bowtie_{jk1} \ldots$

4 Algebraic Laws

The following three kinds of algebraic laws are formed:

- Push selections and projections down. Selections and projections are captured by the Combo operator, $\Sigma_p$, hence laws are needed that commute Combo with other operators
- Join reordering: associativity, commutativity.
- Join-nest associativity.

4.1 Laws that Push Combo (=Selections and Projections) Down

4.1.1 The Combo-Combo Law

Let $p : t1 \to t2$, and $q : t2 \to t3$ be two p-formers. Then:

$\Sigma_q(\Sigma_p(R)) = \Sigma_r(R)$  (the combo-combo law)

Here r is a new p-former defined as r=ppcompose(q,p), by induction on q first, and, where needed, by induction on p second.

/* q = identity */
ppcompose(_, p) = p
/* q = record p-former */
ppcompose$([(b_{i_1} \to c_1):q_1, \ldots, (b_{i_k} \to c_k):q_k, c_{k+1}:e_1, c_{k+2}:e_2, \ldots, c_r:e_{r-k}], \_) = [(b_{i_1} \to c_1):q_1,$
$\ldots, (b_{i_k} \to c_k):q_k, c_{k+1}:e_1, c_{k+2}:e_2, \ldots, c_r:e_{r-k}]$ ppcompose$([(b_{i_1} \to c_1):q_1, \ldots, (b_{i_k} \to c_k):q_k, c_{k+1}:e_1, c_{k+2}:e_2, \ldots, c_r:e_{r-k}], [(a_{j_1} \to b_1):p_1, \ldots,$
$(a_{j_m} \to b_s):p_s, b_{s+1}:f_1, c_{s+2}:f_2, \ldots, b_m:f_{m-s}] =$ $[(a_{j_1} \to c_1):\textbf{ppcompose}(q_1, p_{i_1}), \ldots, (a_{j_k} \to c_k): \textbf{ppcompose}(q_k, p_{i_k}),$ $c_{t+1}:f_{i_{t+1}-s}, c_{t+2}:f_{i_{t+2}-s}, \ldots, c_k:f_{i_k-s},$ $c_{k+1}: e_1 \circ p, c_{k+2}: e_2 \circ p, \ldots, c_r: e_{r-k} \circ p$ ]
/* here $\{j_1, \ldots, j_m\} \subseteq \{1, 2, \ldots, n\}$ and $\{i_1, \ldots, i_k\} \subseteq \{1, 2, \ldots, m\}$, with $i_1 < i_2 < \ldots < i_t <= s < i_{t+1} < \ldots < i_k <= m$,
      p is the second p-former, p = [( $a_{j_1} \to b_1):p_1, \ldots, (a_{j_m} \to b_s):p_s$,
$b_{s+1}:f_1, c_{s+2}:f_2, \ldots, b_m:f_{m-s}$],
      and $e \circ p$ means "apply the p-former p first, then e" and is defined below */
/* q = variant p-former */
ppcompose((tag'/c' $\to$ tag"):q, _) = (tag/c $\to$ tag'):q
ppcompose((tag'/c' $\to$ tag"):q, (tag/c $\to$ tag'):p) =
(tag/(c and c'$\circ$p)$\to$ tag'):ppcompose(q,p)
/* here c'$\circ$p is defined below and means: apply p first, then check c' */
/* q = union p-former */
ppcompose(<$q_1$ | ... | $q_k$>, _) = <$q_1$ | ... | $q_k$>
ppcompose(<$q_1$ | ... | $q_k$>, <$p_1$ | ... | $p_m$>) = <... | ppcompose($q_i$, $p_j$) | ... >
/* here each $q_i$ is paired with all those $p_j$ that have an output tag that matches
the input tag in $q_i$ : according to the definitions there could be one ore more */
/* q = set p-former */
ppcompose({q}, _) = {q}
ppcompose({q}, {p}) = {ppcompose(q,p)}

Composition of a p former with an expression, $e \circ p$, and a p-former with a condition, $c \circ p$, are defined. In both cases, the expression (e) and the condition (c) have a single record argument. (*i.e.*, only use $1, which, by convention, may be omitted), while p is a record p-former, $p = [(a_{i_1} \to b_1) : p_{i_1}, \ldots, (a_{i_k} \to b_k) : p_k, c_1 : e_1, \ldots, c_p : e_p]$.

epcompose($1.b_j$, p) = $1.$a_{i_j}$ epcompose($1.c_j$, p) = $e_j$
epcompose(e op e', p) = epcompose(e,p) op epcompose(e',p)     where p is +, -, *, /,
...
epcompose(f($e_1, e_2, \ldots$), p) = f(epcompose($e_1$,p), epcompose($e_2$,p), ...)

cpcompose(e op e', p) = epcompose(e, p) op epcompose(e',p)     where op is <, >, <=, >=, ...
cpcompose(<tag:[$a_1:e_1, \ldots, a_n:e_n$]> IN e, p) = <tag:[$a_1$:epcompose($e_1$,p), ..., $a_n$: epcompose($e_n$,p)]> IN epcompose(e,p)
cpcompose(exists(e), p) = exists(epcompose(e,p))
cpcompose(true, p) = true,  cpcompose(false, p) = false
cpcompose($c_1$ and $c_2$, p) = cpcompose($c_1$, p) and cpcompose($c_2$,p)     same for or, not

Example. Let p = <Emp/(sal>50000)$\to$HighEarner:[name$\to$richName:_] |
        Dept/(mgr= "Betsy")$\to$BetsyManages:[name$\to$name:_] |
      Site/(true)$\to$Site:[name$\to$name:_,city$\to$city:_]>
Define R= $\Sigma_p$(EmpsDeptsSites)

Let q = <HighEarner/(like(richName,"%Smith%")→HighEarner:[richName → name:_] |

BetsyManages/true → Betsy [name → name:_] |
Site/(city="Seattle") → HighEarner:[name → name:_]>

And define R' = $\Sigma_q(R)$ = $\Sigma_q(\Sigma_p(\textbf{EmpsDeptsSites}))$.

Then R' = $\Sigma_{ppcompose(q,p)}(\textbf{EmpsDeptsSites})$, where:

ppcompose(q,p) =
<Emp/(sal>50000 and like(name,"%Smith%")) → HighEarner:[name → name:_] |
Dept/(mgr="Betsy" and true) → Betsy: [name → name: _] |
Site/(true and city="Seattle") → HighEarner:[name → name: _ ]>

4.1.2 Applications of the combo-combo law

1. Commuting order of selections. Consider an example with simple combo operators:

$\Sigma^0_{<Emp/(sal=20000)>}(\Sigma^0_{<Dept/(mgr="Smith")>}(R))$ =
   $\Sigma^0_{<Dept/(mgr="Smith")>}(\Sigma^0_{<Emp/(sal=20000)>}(R))$ To prove that we expand the simple combos into combos, then apply the combo-combo rule. The left hand side becomes:

$\Sigma^0_{<Emp/(sal=20000)>}(\Sigma^0_{<Dept/(mgr="Smith")>}(R))$ =

= $\Sigma_{<Emp/(sal=20000) | Dept:\_ | Other:\_>}(\Sigma_{<Emp:\_ | Dept/(mgr="Smith") | Other:\_>}(R))$ = $\Sigma_{<Emp/(sal=20000) | Dept:/(mgr="Smith") | Other:\_>}(R)$ The right hand side is similarly:

$\Sigma^0_{<Dept/(mgr="Smith")>}(\Sigma^0_{<Emp/(sal=20000)>}(R))$ =

= $\Sigma_{<Emp:\_ | Dept/(mgr="Smith") | Other:\_>}(\Sigma_{<Emp/(sal=20000) | Dept:\_ | Other:\_>}(R))$ = $\Sigma_{<Emp/(sal=20000) | Dept:/(mgr="Smith") | Other:\_>}(R)$ Hence the two are equal.

2. Commuting inner selections.

$\Sigma^0_{<Dept:[project:\{<urgent/(deadline>="10/10/2010") >\}]>}(\Sigma^0_{<Dept:[project:\{<urgent/(budget<=10000) >\}]>}(R))$ =

= $\Sigma^0_{<Dept:[project:\{<urgent/ budget<=10000)>\}]>}(\Sigma^0_{<Dept:[project:\{<urgent/(deadline>="10/10/2010") >\}]>}(R))$ Indeed, take the left hand side and expand the simple combos into combos, then apply the combo-combo law $\Sigma^0_{<Dept:[project:\{<urgent/(deadline>="10/10/2010") >\}]>}(\Sigma^0_{<Dept:[project:\{<urgent/(budget<=10000) >\}]>}(R))$ =

= $\Sigma_{<Emp:\_ | Dept:[name:\_, mgr:\_, project:\{<urgent/(deadline>="10/10/2010") | normal:\_>\}]>}(\Sigma_{<Emp:\_ | Dept:[name:\_, mgr:\_, project:\{<urgent/(budget<=10000):\_ | normal:\_>\}]>}(R))$ =

= $\Sigma_{<Emp:\_ | Dept:[name:\_, mgr:\_, project:\{<urgent/(deadline>="10/10/2010" \text{ and } budget<= 10000) | normal:\_>\}]>}$ The right hand side is treated similarly and results in the same expression, hence they are equal.

3. Pushing predicates to sources. Consider a selection on the predicate (name like "Smith%"). The source supports some predicates, but not this one. Suppose it supports the predicate (name like "%Smith%"). The predicate is:

$$c = (\textbf{name like "Smith\%"})$$

the source predicate is:

$$c_s = (\textbf{name like "\%Smith\%"})$$

The optimizer knows the following implication:

$$c \Rightarrow c_s$$

which is equivalent to:

$$c = c \textbf{ and } c_s$$

Hence it can perform the following optimization:

$$\Sigma^0_{<Emp/(name\ like\ "Smith\%")>}(R) = \Sigma^0_{<Emp/(c)>}(R) = \Sigma^0_{<Emp/(c\ and\ cs)>}(R)$$
$$= \Sigma^0_{<Emp/(c)>}(\Sigma^0_{<Emp/(cs)>}(R))$$
$$= \Sigma^0_{<Emp/(name\ like\ "Smith\%")>}(\Sigma^0_{<Emp/(name\ like\ "\%Smith\%")>}(R))$$

4.1.3 The Combo-Nest Law

Let $n :: u_1, u_2 \to u$ be an n-former and $p :: u \to u'$ be a p-former. Then the following holds:

$$\Sigma_p(\text{Nest}_n(R, S)) = \Sigma_{p3}(\text{Nest}_{n'}(\Sigma_{p1}(R), \Sigma_{p2}(S))) \quad \text{(generic combo-nest law)}$$

where p1, p2, p3 are p-formers and n' is an n-former to be described next. The following can be chosen: p3=p, n'=n, and p1=p2=_, and the identity holds. But, p1 and p2 are chosen to do as much as possible of the work that p does.

Let $u_1 = <tag_{1i}:r_{11} | \ldots tag_{1n}:r_{1n}>$, $u_2 = <tag_{2i}:r_{21} | \ldots tag_{2m}:r_{2m}>$.

The n-former n has the form:

$$n = <tag_{1i} : [b_i : <tag_{2l}/c_{i1} | \ldots | tag_{2m}/c_{im}>] | i = 1, \ldots, n>$$

The p-former p has the form:

$$p = <p_1 | \ldots | p_k>$$
$$\text{where: } p_i = tag_{1j_i} / c_i' \to tag_{3i}:q_i, \quad c_i' : r_{1j_i} \otimes [b_{j_i} : \{u_2\}] \to \text{bool}, \quad i = 1, .., k,$$
$$\text{where } \{j_1, \ldots, j_k\} \subseteq \{1, 2, \ldots, n\}$$

Combo-nest law 1: Assume that, for some $i=1,\ldots,k$, the predicate $c_i'$ ignores the nested part (formally: $1.b_{j_i}$ does not occur in $c_i'$), and that $q_i$ is the identity p-former. That is:

$p_i = tag_{1j_i} / c_i' \rightarrow tag_{3i}:\_$

Define:

$p_i' = tag_{1j_i} / c_i' \rightarrow tag_{1j_i}:\_$  /* i.e., $tag_{1j_i}$ replaces $tag_{3i}$ in $p_i$ */
$p1 = <p_i'>$
$p3 = <p_1 | \ldots | p_{i-1} | tag_{1j_i} \rightarrow tag_{3i}:\_ | p_{i+1} | \ldots p_n>$ The combo-nest law is:

$$\Sigma_p(Nest_n(R, S)) = \Sigma_{p3}(Nest_n(\Sigma_{p1}(R), S)) \text{ (combo-nest law 1)}$$

Here n'=n and p2 = _.

Combo-nest law 2: Assume that, for every i=1,...,k, the predicate $c_i'$ only depends on its first argument (i.e., it ignores the nested part, $b_{j_i}$), and that $q_i$ leaves all fields unchanged except for $b_{j_i}$ where it applies a selection, and that, moreover, that selection is the same for all i=1,...,k. More precisely:

$q_i = [\ldots, b_{j_i} \rightarrow b_{j_i} :r]$ where ... contains only identity p-formers, i.e., a→a:_ for attributes a, and where:

$r = <tag_{21}/c_{i1}'' | \ldots | tag_{2m}/c_{im}''>$ is a selection that is the same for every i=1,...,k. Define:

$p_i' = tag_{1j_i} / c_i' \rightarrow tag_{1j_i} :\_$    for i = 1, ..., k
/* i.e., _ replaces $q_i$ and $tag_{1j_i}$ replaces $tag_{3i}$ in $p_i$ */
$p1 = <p_1' | \ldots | p_n'>$
$p2 = r$
$p3 = < tag_{1j1} \rightarrow tag_{i31} :\_ | \ldots | tag_{1jk} \rightarrow tag_{i3k} :\_ >$
The combo-nest law is:

$$\Sigma_p(Nest_n(R, S)) = \Sigma_{p3}(Nest_n(\Sigma_{p1}(R), \Sigma_{p2}(S))) \text{ (combo-nest law 2)}$$

4.1.4 The Combo-Join Law

Let $j :: u1, u2 \to u$ be a j-former and $p :: u \to u'$ be a p-former. Then the following holds:

$$\Sigma_p(R \bowtie_j S) = \Sigma_{p3}(\Sigma_{p1}(R) \bowtie_j \Sigma_{p2}(S)) \quad \text{(the combo-join law)}$$

where p1, p2, p3 are defined below.

Notations:

$$j = <tag1_i, tag2_j / c_{ij} \to tag_{ij}' \mid i = 1, ..., n, j = 1, ..., m>$$
$$p = <tag_{ij}'/c_{ij}' \to tag_{ij}'' : q_{ij} \mid i = 1, ..., n, j = 1, ..., m>$$

Here $c_{ij} : r_{1i} \times r_{2j} \to bool$ is the join condition, while $c_{ij}': r_{1i} \times r_{2j} \to bool$ is a selection predicate. Not all combinations of tags $tag_{ij}'$ must occur in p, but to simplify notations they are included. Assume that $c_{ij}'(x,y) = d_{ij}(x)$ AND $e_{ij}(y)$ AND $f_{ij}(x,y)$. That is $d_{ij}(x)$ contains all conditions that only inspect only values from the left join operand, $e_{ij}(y)$ those conditions that only inspect values from the right join operand, while $f_{ij}(x,y)$ contains conditions that inspect values from both operands and cannot be separated. The conditions on the left operand are independent of j, i.e.,:

$$d_{i1}(x) = d_{i2}(x) = ... = d_{im}(x) = d_i(x) \quad \text{for } i=1, ..., n$$

and similarly:

$$e_{1j}(x) = e_{2j}(x) = ... = e_{nj}(x) = e_j(x) \quad \text{for } j=1, ..., m$$

This can often be achieved, by manipulating boolean conditions, factoring out the common parts and pushing the specific parts into $f_{ij}(x,y)$. Then define:

$$p1 = <tag1_1 / d_1 \to tag1_1, ..., tag1_n / d_n \to tag1_n>$$
$$p2 = <tag2_1 / e_1 \to tag2_1, ..., tag2_m / e_m \to tag2_m>$$
$$p3 = <tag_{ij}'/f_{ij} \to tag_{ij}'' : q_{ij} \mid i = 1, ..., n, j = 1, ..., m>$$

4.2 Laws that commute joins and nests

4.2.1 Join Associativity and Commutativity

Join commutativity holds:

$$\bowtie \quad \bowtie$$

$$R \bowtie_j S = S \bowtie_j R \qquad \text{(join commutativity law)}$$

Join associativity:

$$(R \bowtie_{j1} S) \bowtie_{j2} T = R \bowtie_{j3} (S \bowtie_{j4} T) \qquad \text{(join associativity law)}$$

holds for various choices of the j-formers j3 and j4.

In $R \bowtie_{j1} S$ only a subset of all pairs of tags need to have join conditions. To simplify notations, however, each join considers all pairs of tags. Hence:

$$j1 = \langle tag_{1i}, tag_{2j} \,/\, c_{1ij} \rightarrow tag_{4ij} \mid i = 1,\ldots, n, j = 1, \ldots, m \rangle$$
$$j2 = \langle tag_{4ij}, tag_{3k} \,/\, c_{2ijk} \rightarrow tag_{ijk} \mid i = 1,\ldots, n, j = 1, \ldots, m, k = 1,\ldots, p \rangle$$

The condition $c_{2ijk}$ looks at three records: x from R, y from S, and z from T. Decomposing it into two pieces:

$$c_{2ijk}(x,y,z) = c_{3ijk}(x,y,z) \text{ AND } c_{4jk}(y,z)$$

such that the part inspecting only y and z is the same for all i=1,...,n. That is, in order to define $c_{4jk}(y,z)$ we inspect each condition $c_{21jk}(x,y,z)$, ..., $c_{2njk}(x,y,z)$ and factor out what all of them do in common with y and z. Then define:

$$j4 = \langle tag_{2j}, tag_{3k} \,/\, c_{4jk} \rightarrow tag_{5jk} \mid j=1,\ldots,m, k = 1,\ldots,p \rangle$$
$$j3 = \langle tag_{1i}, tag_{5jk} \,/\, c_{3ijk} \rightarrow tag_{ijk} \mid i=1,\ldots,n, j=1,\ldots,m, k=1,\ldots,p \rangle$$

4.2.2 The Join-Nest Rule

The following holds:

$$R \bowtie_{j1} (Nest_{n1}(S, T)) = Nest_{n2}((R \bowtie_{j2} S), T) \qquad \text{(join-nest law)}$$

provided that j1 looks only at the S-component in $Nest_{n1}(S, T)$. In that case, j2 is "the same" as j1, except that it does not get to see the nested attribute, which j1 did not use anyway. Similarly, n2 is "the same" as n1, except that now it gets to see an R component, which it ignores.

Various disclosed embodiments also relate to an apparatus such as a computer for performing the disclosed operations. The computer may include one or more processors and one or more memories. Still further, various disclosed embodiments relate to machine-readable media on which are stored program instructions for performing operations on a computer or computer system. The computer readable medium can be any data storage device that can store data which can thereafter be read by a computer system. Examples of the computer readable medium include read-only memory, random-access memory, CD-ROMs, magnetic tape, and optical data storage devices.

From the above description, it will be appreciated that although the specific embodiments of the technology have been described for purposes of illustration, various modifications may be made without deviating from the scope of the invention. Accordingly, the invention is not limited except by the appended claims.

We claim:

1. A computer-readable medium storing thereon computer-readable instructions, the computer-readable medium storing thereon a data structure, the data structure comprising:
   a plurality of rows;
   a type column adapted for storing a row type for each of the plurality of rows of the data structure, each row type indicating a structure of the corresponding row, wherein the structure includes a set of columns, the row type being selectable from a set of row types such that the row type indicates an identity of each of the set of columns, thereby enabling the structure for each of the plurality of rows to vary based upon the row type for that row, wherein the type column is separate from the set of columns of the structure identified by each row type stored in the type column;
   computer-readable instructions for storing data retrieved from two or more data stores in the set of columns for the plurality of rows; and
   computer-readable instructions for storing a row type for each of the plurality of rows of the data structure in the type column, wherein the row type for a corresponding one of the plurality of rows indicates an identity of the set of columns of the structure storing data for the corresponding row;
   wherein the two or more data stores include a first data store and a second data store, wherein the first data store stores data in a different format from data stored in the second data store, thereby enabling data retrieved from data stores storing data in different formats to be stored in a single data structure.

2. The computer-readable medium of claim 1 wherein the data structure is a nested conditional relation data structure.

3. The computer-readable medium of claim 1 wherein at least two rows of the data structure contain different row types in the type column.

4. The computer-readable medium of claim 1 wherein the row type for each of the plurality of rows identifies a schema for a type.

5. The computer-readable medium as recited in claim 1, the data structure further comprising:
   a nested data structure in a column of one of the plurality of rows of the data structure, the nested data structure including sub-rows and a type sub-column, each of the sub-rows having an associated row type in the type sub-column, each row type in the type sub-column indicating a structure of the corresponding sub-row, wherein the structure of the corresponding sub-row includes a set of one or more sub-columns of the nested data structure associated with the corresponding sub-row, the row type in the type sub-column being selectable such that the sub-row type indicates an identity of each of the set of sub-columns, thereby enabling the set of sub-columns for each of the plurality of sub-rows to vary based upon the row type for that sub-row, wherein the type sub-column is separate from the set of sub-columns identified by the row types stored in the type sub-column.

6. The computer-readable medium of claim 5 wherein a sub-column of one of the sub-rows of the nested data structure includes a further nested data structure.

7. The computer-readable medium of claim 5 wherein at least two sub-rows of the data structure contain different row types in the type sub-column.

8. The computer-readable medium as recited in claim 1, wherein the row types stored in the type column are not data elements and the columns identified by the row types are adapted for storing data elements.

9. The computer-readable medium as recited in claim 1, wherein data is stored in the columns for each of the plurality of rows, thereby enabling the data to be retrieved from the columns indicated by the row type for that row.

10. The computer-readable medium as recited in claim 9, further comprising:
    computer-readable instructions for retrieving data from one or more of the plurality of rows of the data structure, where the retrieved data is obtained from one or more of the columns indicated by the row type for that row.

11. The computer-readable medium as recited in claim 1, further comprising:
    computer-readable instructions for retrieving data from one or more of the plurality of rows of the data structure, where the retrieved data is obtained from one or more of the columns indicated by the row type for that row.

12. The computer-readable medium as recited in claim 1, further comprising:
    computer-readable instructions for receiving a query directed to multiple data stores including a first data store and a second data store, wherein the query is in the second format, the first data store is in the first format and the second data store is in the third format;
    computer-readable instructions for generating a first query directed to the first data store based on the first format using the received query and a mapping between the first format and the second format;
    computer-readable instructions for generating a second query directed to the second data store based on the third format using the received query and a mapping between the third format and the second format;
    computer-readable instructions for executing the first generated query based on the first format against the first data store in the first format to generate first data wherein the generated first data is stored in the data structure; and
    computer-readable instructions for executing the second generated query based on the third format against the second data store in the third format to generate second data wherein the generated second data is stored in the data structure.

13. The computer-readable medium as recited in claim 1, wherein the row type indicates a type of record storing the corresponding row.

14. The computer-readable medium as recited in claim 1, wherein the structure is a record and wherein the row types indicates a record type of the record.

15. A computer-readable medium for storing data in a data structure, comprising:
- instructions for retrieving data from two or more data stores, wherein the two or more data stores include a first data store and a second data store, wherein the first data store stores data in a different format from data stored in the second data store;
- instructions for identifying a row type corresponding to data to be stored in each of the plurality of rows of the data structure, each row type indicating a structure of the corresponding row, wherein the structure includes a set of columns, the row type being selectable from a set of row types such that the row type indicates an identity of each of the set of columns, thereby enabling the set of columns for each of the plurality of rows to vary based upon the row type for that row;
- instructions for storing the row type for each of the plurality of rows of the data structure in a type column of the data structure, thereby enabling the structure for each of the plurality of rows to vary based upon the row type for that row, wherein the type column is separate from the set of columns identified by the row types stored in the type column; and
- instructions for storing the data retrieved from the two or more data stores in the set of columns for the plurality of rows, thereby enabling data retrieved from data stores storing data in different formats to be stored in a single data structure.

16. The computer-readable medium of claim 15 wherein the data structure is a nested conditional relation data structure.

17. The method as recited in claim 16, further comprising:
- converting first data from a first format to a nested conditional relation prior to storing the data;
- wherein storing the data includes storing the converted first data.

18. The method as recited in claim 17, further comprising:
- converting second data from a second format to a nested conditional relation prior to storing the data;
- wherein storing the data further includes storing the converted second data.

19. The computer-readable medium of claim 15 wherein at least two rows of the data structure contain different row types in the type column.

20. The computer-readable medium of claim 15 wherein the row type for each of the plurality of rows identifies a schema for a type.

21. The computer-readable medium of claim 15, further comprising:
- instructions for obtaining a query directed to multiple data stores including a first data store and a second data store, wherein the query is in the second format, the first data store is in the first format and the second data store is in the third format;
- instructions for generating a first query directed to the first data store based on the first format using the received query and a mapping between the first format and the second format;
- instructions for generating a second query directed to the second data store based on the third format using the received query and a mapping between the third format and the second format;
- instructions for executing the first generated query based on the first format against the first data store in the first format to generate first data wherein the generated first data is stored in the data structure; and
- instructions for executing the second generated query based on the third format against the second data store in the third format to generate second data wherein the generated second data is stored in the data structure.

22. The computer-readable medium of claim 21, further comprising instructions for converting the data of the created data structure into data in the second format.

23. The computer-readable medium of claim 21 wherein the second format is an XML format.

24. The computer-readable medium as recited in claim 15, wherein the data structure further comprises:
- a nested data structure in a column of one of the plurality of rows of the data structure, the nested data structure including sub-rows and a type sub-column, each of the sub-rows having a row type stored in the type sub-column, each row type in the type sub-column indicating a structure of the corresponding sub-row, wherein the structure of the corresponding sub-row includes a set of one or more sub-columns of the nested data structure associated with the corresponding sub-row, the row type in the type sub-column being selectable such that the sub-row type indicates an identity of each of the set of sub-columns, thereby enabling the set of sub-columns for each of the plurality of sub-rows to vary based upon the row type for that sub-row, wherein the type sub-column is separate from the set of sub-columns identified by the row types stored in the type sub-column.

25. The computer-readable medium of claim 24 wherein a sub-column of a sub-row of the nested data structure includes a further nested data structure.

26. The computer-readable medium of claim 24 wherein at least two sub-rows of the nested data structure contain different row types in the type column.

27. The computer-readable medium as recited in claim 15, wherein the row types stored in the type column are not data elements and the columns identified by the row types are adapted for storing data elements.

28. The computer-readable medium as recited in claim 15, wherein the data stored in each of the columns is a primitive type or a nested conditional relation.

29. The computer-readable medium as recited in claim 15, further comprising:
- instructions for retrieving data from one or more of the plurality of rows of the data structure, where the retrieved data is obtained from one or more of the columns indicated by the row type for that row.

30. A computer system for storing data in a data structure having a plurality of rows, comprising:
- a processor; and
- a memory, at least one of the processor or the memory being for:
- retrieving data from two or more data stores, wherein the two or more data stores include a first data store and a second data store, wherein the first data store stores data in a different format from data stored in the second data store;
- identifying a row type corresponding to data to be stored in each of the plurality of rows of the data structure, each row type indicating a structure of the corresponding row, wherein the structure includes a set of columns, the row type being selectable from a set of row types such that the row type indicates an identity of each of the set of columns, thereby enabling the set of columns for each of the plurality of rows to vary based upon the row type for that row;
- storing the row type for each of the plurality of rows of the data structure in a type column of the data structure, thereby enabling the structure for each of the plurality of rows to vary based upon the row type for that row, wherein the type column is separate from the set of columns identified by the row types stored in the type column; and storing the data retrieved from the two or more data stores in the set of columns for the plurality of rows, thereby enabling data retrieved from data stores storing data in different formats to be stored in a single data structure.

31. The computer system of claim 30 wherein the data structure is a nested conditional relation data structure.

32. The computer system of claim 30 wherein at least two rows of the data structure contain different row types in the type column.

33. The computer system of claim 30 wherein the row type for each of the plurality of rows identifies a schema for a type.

34. The computer system of claim 30, at least one of the processor or the memory being for:

providing a mapping of a first format to a second format;

providing a mapping of a third format to the second format;

receiving a query directed to multiple data stores including a first data store and a second data store, wherein the query is in the second format, the first data store is in the first format and the second data store is in the third format;

generating a first query directed to the first data store based on the first format using the received query and the mapping between the first format and the second format;

generating a second query directed to the second data store based on the third format using the received query and the mapping between the third format and the second format;

executing the first generated query based on the first format against the first data store in the first format to generate first data wherein the generated first data is stored in the data structure; and executing the second generated query based on the third format against the second data store in the third format to generate second data wherein the generated second data is stored in the data structure.

35. The computer system of claim 34 including converting the data of the created structure into data in the second format.

36. The computer system of claim 34 wherein the second format is an XML format.

37. The computer system as recited in claim 30, wherein the data structure further comprises:

a nested data structure in a column of one of the plurality of rows of the data structure, the nested data structure including sub-rows and a type sub-column, each of the sub-rows having a row type stored in the type sub-column, each row type in the type sub-column indicating a structure of the corresponding sub-row, wherein the structure of the corresponding sub-row includes a set of one or more sub-columns of the nested data structure associated with the corresponding sub-row, the row type in the type sub-column being selectable such that the sub-row type indicates an identity of each of the set of sub-columns, thereby enabling the sub-columns for each of the plurality of sub-rows to vary based upon the row type for that sub-row, wherein the type sub-column is separate from the set of sub-columns identified by the row types stored in the type sub-column.

38. The computer system of claim 37 wherein a sub-column of a one of the sub-rows of the nested data structure includes a further nested data structure.

39. The computer system of claim 37 wherein at least two sub-rows of the nested data structure contain different row types in the type sub-column.

40. The computer system as recited in claim 30, wherein the row types stored in the type column are not data elements and the columns identified by the row types are adapted for storing data elements.

* * * * *